United States Statutory Invention Registration [19]

[11] Reg. Number: H851

Naruse et al. [43] Published: Nov. 6, 1990

[54] SILVER HALIDE COLOR PHOTOGRAPHIC MATERIAL CONTAINING A MAGENTA COUPLER AND A STAIN INHIBITOR

[75] Inventors: Hideaki Naruse; Masakazu Morigaki; Nobuo Seto, all of Kanagawa, Japan

[73] Assignee: Fuji Photo Film Co., Ltd., Kanagawa, Japan

[21] Appl. No.: 281,373

[22] Filed: Dec. 8, 1988

[30] Foreign Application Priority Data

Dec. 9, 1987 [JP] Japan ..... 62-309497

[51] Int. Cl.[5] ..... G03C 1/08; G03C 7/26; G03C 11/00; G03C 7/46

[52] U.S. Cl. ..... 430/551; 430/372; 430/386; 430/387; 430/558

[58] Field of Search ..... 430/558, 551, 371, 386, 430/387

[56] References Cited

U.S. PATENT DOCUMENTS

| | | | |
|---|---|---|---|
| 4,639,415 | 1/1987 | Kaneko et al. | 430/558 |
| 4,795,696 | 1/1989 | Sasaki et al. | 430/551 |
| 4,857,444 | 8/1989 | Hirose et al. | 430/552 |
| 4,863,842 | 9/1989 | Kaneko et al. | 430/551 |

FOREIGN PATENT DOCUMENTS

| | | | |
|---|---|---|---|
| 0218266 | 4/1987 | European Pat. Off. . | |
| 0226849 | 7/1987 | European Pat. Off. . | |
| 0234783 | 9/1987 | European Pat. Off. . | |
| 2229146 | 10/1987 | Japan | 430/558 |
| 2275259 | 11/1987 | Japan | 430/558 |

*Primary Examiner*—John S. Maples
*Assistant Examiner*—Philip Tucker
*Attorney, Agent, or Firm*—Sughrue, Mion, Zinn, Macpeak & Seas

[57] ABSTRACT

A silver halide color photographic material which contains at least one coupler represented by the general formula (I) or (II-A) and at least one compound represented by the following general formula (III) in the same light-sensitive silver halide layer:

(I)

(II-A)

wherein $R_1$ represents an alkyl group, an aryl group, or a heterocyclic group; $R_2$ represents a hydrogen atom, or a substituent group; and X represents a hydrogen atom, or a coupling-off group;

(III)

wherein R represents a hydrogen atom, an alkyl group, an alkenyl group, an alkynyl group, an oxy radical, or a hydroxyl group; $R_3$, $R_4$, $R_5$ and $R_6$, which may be the same or different, each represents a hydrogn atom, or an alkyl group; and A represents a nonmetallic atomic group necessary for forming a 5-, 6- or 7-membered ring; provided that $R_3$ may be linked with $R_4$, $R_5$ may be linked with $R_6$, R may be linked with $R_3$, or $R_3$ may be linked with A to form a 5- or 6-membered ring.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIAL CONTAINING A MAGENTA COUPLER AND A STAIN INHIBITOR

FIELD OF THE INVENTION

The present invention relates to a silver halide color photographic material, and, more particularly, to a light-sensitive material which has excellent color reproducibility and high color developability, and shows a considerably suppressed increase in density of the unexposed part after photographic processing.

BACKGROUND OF THE INVENTION

Color images are well known to be formed by reacting couplers with oxidized color developing agents of the primary amine type, which have been oxidized using optically exposed silver halides as an oxidizing agent, to produce indophenol, indoaniline, indamine, azomethine, phenoxazine, phenazine and their analogous dyes.

In order to form magenta color images, couplers of 5-pyrazolone, cyanoacetophenone, indazolone, pyrazolobenzimidazole and pyrazolotriazole types have been employed.

Most of the magenta color image-forming couplers which have been studied and widely used up to the present are 5-pyrazolones. However, dyes produced from 5-pyrazolone type couplers show an undesired absorption having a yellow component in the neighborhood of 430 nm, which is responsible for color turbidity.

As nuclei of magenta color image-forming couplers which reduce the aforesaid yellow component, there have been proposed pyrazolobenzimidazole nuclei in British Patent No. 1,047,612, indazolone nuclei in U.S. Pat. No. 3,770,447, and pyrazolo[5,1-c]-1,2,4-triazole nuclei in U.S. Pat. No. 3,725,067.

However, magenta couplers disclosed in the above-cited patents remain unsatisfactory. For instance, when these couplers are mixed with a silver halide emulsion dispersed in a hydrophilic protective colloid like gelatin, color images produced therefrom are unsatisfactory; their solubilities in high boiling organic solvents are low; they are difficult to synthesize; they have no more than comparatively low coupling activities in ordinary developers; and dyes produced therefrom have extremely low fastness to light.

As a result of searching for magenta couplers without subsidiary absorption in the neighborhood of 430 nm, which is the most serious defect of 5-pyrazolone type couplers in respect of hue, the present inventors found that 1H-pyrazolo[1,5-b]-1,2,4-triazole type magenta couplers showed no subsidiary absorption in the short wavelength region, produced color images of high fastness and were synthesized with ease, and disclosed them in JP-A-No. 59-171956 (the term "JP-A" as used herein means an "unexamined published Japanese patent application") and U.S. Pat. No. 4,540,654. These couplers further have advantages in that they are excellent in color reproducibility and synthesizing facility, and can be converted to two-equivalent couplers by introducing a splitting-off group to the coupling active site, to reduce the amount of silver to be used.

However, these couplers had low color developability, and the photographic properties of the magenta images produced therefrom were greatly changed with fluctuation in concentrations of ingredients contained in processing baths (e.g., sulfite ion and a hydroxylamine derivative added to a developer as an oxidation inhibitor for a color developing agent) under running processing.

As a means for overcoming these defects, introduction of an alkyloxy group or an aryloxy group in the 6-position of the foregoing 1H-pyrazolo[1,5-b]-1,2,4-triazole type magenta couplers has been disclosed in JP-A-No. 62-209457. Though successful in enhancing color developability and considerably depressing the changes in photographic properties under running processing, this coupler had a problem of the generation of stain (increase in density of unexposed areas) with the lapse of time after photographic processing.

Stains caused in a silver halide color photographic material are undesirable, since they not only degrade the quality of white areas of the image but also aggravate the turbidity in colored areas of the image and spoil the visual sharpness of the image. In particular, the reflection density of stains in reflex materials (e.g., color paper) is, in theory, emphasized several times over the transmission density. Therefore, only slight stains spoil the image quality and result in a serious problem. Although the incorporation of the compounds described in JP-A-No. 62-96944 and JP-A-No. 62-92945 into sensitive materials was disclosed for the purpose of suppressing the generation of stains, those compounds still cannot produce sufficient effects upon the couplers in question.

On the other hand, the art of using hindered amines and pyrazolotriazole type couplers in combination is disclosed in European Patent No. 218,266. However, the patent does not have any examples in which the pyrazolotriazole type couplers substituted by an alkyloxy group, an aryloxy group or a heterocyclyl group at the 6-position are used. Therefore, it is not easy to analogize the effects of the present invention from the above-cited patent.

Under these circumstances, a new method of lessening the influences of fluctuation in processing conditions and depressing the increase of stain is greatly desired.

SUMMARY OF THE INVENTION

An object of the present invention is to provide a light-sensitive material which has sufficiently high color developability and excellent color reproducibility, and without an increase in density of the unexposed part with the lapse of time.

It has now been found that this and other objects of the present invention is attained with a silver halide color photographic material which contains at least one coupler represented by the following general formula (I) or (II-A), and at least one compound represented by the following general formula (III) in the same layer:

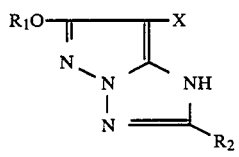

(I)

-continued

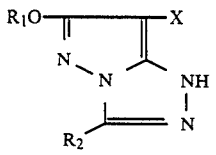

(II-A)

wherein $R_1$ represents an alkyl group, an aryl group, or a heterocyclic group; $R_2$ represents a hydrogen atom, or a substituent group; and X represents a hydrogen atom, or a coupling-off group:

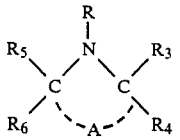

(III)

wherein R represents a hydrogen atom, an alkyl group, an alkenyl group, an alkynyl group, an oxy radical, or a hydroxyl group; $R_3$, $R_4$, $R_5$ and $R_6$, which may be the same or different, each represents a hydrogen atom or an alkyl group; and A represents a nonmetalic atomic group necessary for forming a 5-, 6- or 7-membered ring; provided that $R_3$ may be linked with $R_4$, $R_5$ may be linked with $R_6$, R may be linked with $R_3$, or $R_3$ may be linked with A to form a 5- or 6-membered ring.

DETAILED DESCRIPTION OF THE INVENTION

It is preferred that at least one light-sensitive silver halide layer contains at least one coupler represented by formula (I) or (II-B) in combination with at least one compound represented by formula (III) above:

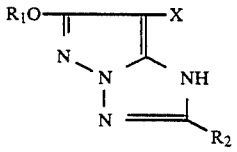

(I)

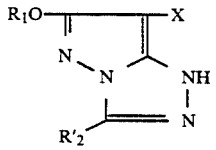

(II-B)

wherein $R_1$ represents an alkyl group, an aryl group or a heterocyclic group; $R_2$ represents hydrogen, a halogen, an alkyl group, an aryl group, a heterocyclic group, a cyano group, an alkoxy group, an aryloxy group, an acylamino group, an anilino group, a ureido group, a sulfamoylamino group, an alkylthio group, an arylthio group, an alkoxycarbonylamino group, a sulfonamido group, a carbamoyl group, a sulfamoyl group, a sulfonyl group, or an alkoxycarbonyl group; X represents hydrogen or a coupling-off group; when $R_1$ represents an alkyl group, $R'_2$ represents an alkyl group, an aryl group, an alkylthio group, an arylthio group or a heterocyclic thio group; and when $R_1$ represents an aryl group or a heterocyclic group, $R'_2$ represents hydrogen or an alkyl group, an aryl group, an alkylthio group, an arylthio group or a heterocyclic thio group, an alkoxycarbonyl group, a sulfinyl group, or a carbonyl group.

The magenta couplers represented by the foregoing general formulae (I) and (II-A) are described in detail below.

$R_1$ represents a substituted or unsubstituted alkyl group such as methyl, ethyl, isopropyl, t-butyl, trifluoromethyl, phenylmethyl, methoxyethyl, 2-phenoxyethyl, 2-methylsulfonylethyl, 2-hydroxyethyl, 3,3,3-trifluoropropyl, 2-fluoroethyl, 2-chloroethyl, 2-bromoethyl, 2-cyanoethyl, 3-oxobutyl, or 3-oxobutyl; a substituted or unsubstituted aryl group such as phenyl, 4-methylphenyl, 4-t-butylphenyl, 4-acylaminophenyl, 4-halogenophenyl, or 4-alkoxyphenyl; or a substituted or unsubstituted heterocyclic group such as 2-furyl, 2-thienyl, 2-pyrimidinyl, 2-benzothiazolyl, 2-pyridyl, or 4-pyridyl; a phenyl group substituted by an alkoxy group at the ortho position is preferred.

$R_2$ represents hydrogen, a halogen atom (e.g., chlorine, bromine); a substituted alkyl group, such as a sulfonamido-substituted alkyl group (e.g., sulfonamidomethyl, 1-sulfonamidoethyl, 2-sulfonamidoethyl, 1-methyl-2-sulfonamidoethyl, 3-sulfonamidopropyl), an acylamino-substituted alkyl group (e.g., acylaminomethyl, 1-acylaminoethyl, 2-acylaminoethyl, 1-methyl-2-acylaminoethyl, 3-acylaminopropyl), a sulfonamido-substituted phenylalkyl group (e.g., p-sulfonamidophenylmethyl, p-sulfonamidophenylethyl, 1-(p-sulfonamidophenyl)ethyl, p-sulfonamidophenylpropyl), an acylamino-substituted phenylalkyl group (e.g., p-acylaminophenylmethyl, p-acylaminophenylethyl, 1-(p-acylaminophenyl)ethyl, p-acylaminophenylpropyl), an alkylsulfonyl-substituted alkyl group (e.g., 2-dodecylsulfonylethyl, 1-methyl-2-pentadecylsulfonylethyl, octadecylsulfonylpropyl), or a phenylsulfonyl-substituted alkyl group (e.g., 3-(2-butyl-5-t-octylphenylsulfonyl)propyl, 2-(4-dodecyloxyphenylsulfonyl-)ethyl); an unsubstituted alkyl group (e.g., methyl, ethyl, hexyl, dodecyl); an aryl group (e.g., a substituted aryl group such as sulfonamidophenyl, acylaminophenyl, alkoxyphenyl, aryloxyphenyl, substituted alkylphenyl, sulfonamidonaphthyl, or acylaminonaphthyl and an unsubstituted aryl group such as phenyl, and naphthyl); a heterocyclic group (e.g., 2-furyl, 2-thienyl, 2-pyrimidinyl, 2-benzothiazolyl); a cyano group; an alkoxy group (e.g., methoxy, ethoxy, 2-methoxyethoxy, 2-dodecylethoxy, 2-methanesulfonylethoxy); an aryloxy group (e.g., phenoxy, 2-methylphenoxy, 4-t-butylphenoxy); an acylamino (e.g., acetamido, benzamido, tetradecanamido, α-(2,4-di-tamylphenoxy)butylamido, γ-(3-t-butyl-4-hydroxyphenoxy)butylamido, α-[4-(4-hydroxyphenylsulfonyl)phenoxy]decanamido); an anilino group (e.g., phenylamino, 2-chloroanilino, 2-chloro-5-tetradecanamidoanilino, 2-chloro-5-dodecyloxycarbonylanilino, N-acetylanilino, 2-chloro-5-[α-(3-t-butyl-4-hydroxyphenoxy)-dodecanamido]anilino); a ureido group (e.g., phenylureido, methylureido, N,N-dibutylureido); a sulfamoylamino group (e.g., N,N-dipropylsulfamoylamino, N-methyl-N-decylsulfamoylamino); an alkylthio group (e.g., methylthio, octylthio, tetradecylthio, 2-phenoxyethylthio, 3-phenoxypropylthio, 3-(4-t-butylphenoxy)propylthio); an arylthio group e.g., phenylthio, 2-butoxy-5-t-octylphenylthio, 3-pentadecylphenylthio, 2-carboxyphenylthio, 4-tetradecanamidophenylthio); an alkoxycarbonylamino group (e.g., methoxycarbonylamino, tetradecyloxycarbonylamino); a sulfonamido group (e.g., methanesulfonamido, hexadecanesulfonamido, benzenesulfonamido, p-toluenesulfonamido, octadecanesulfonamido, 2-methyloxy-5-t-butylbenzenesulfonamido); a carbamoyl group (e.g., N-ethylcarbamoyl, N,N-dibutylcarbamoyl, N-(2-dodecyloxyethyl)carbamoyl, N-methyl-N-dodecylcarbamoyl, N-[3-(2,4-di-t-amylphenoxy)-propyl]carbamoyl); a sulfamoyl group (e.g., N-ethylsulfamoyl, N,N-dipropylsulfamoyl, N-(2-dodecyloxyethyl)sulfamoyl, N-ethyl-N-dodecylsulfamoyl, N,N-diethylsulfamoyl); a sulfonyl group (e.g., methanesulfonyl, octanesulfonyl, benzenesulfonyl, toluenesulfonyl); or an alkoxycarbonyl group (e.g., methoxycarbonyl, butyloxycarbonyl, dodecylcarbonyl, octadecylcarbonyl). Of these groups, an alkyl group, an aryl group, an alkylthio group and an arylthio group are preferred as $R_2$. In particular, an alkyl group and an aryl group are more preferred.

In particular, when the couplers are represented by the general formula (II-A), and therein $R_1$ represents an alkyl group, it is desirable that $R_2$ represents an alkyl group, an aryl group, an alkylthio group, an arylthio group, a heterocyclicthio group, an alkoxycarbonyl group, a sulfinyl group or a carbamoyl group.

X represents hydrogen or a coupling-off group, e.g., a halogen atom (e.g., chlorine, bromine, iodine); a carboxyl group; a group connected to the coupling active site via an oxygen atom (e.g., acetoxy, propanoyloxy, benzoyloxy, 2,4-dichlorobenzoyloxy, ethoxyoxaloyloxy, pyruvinyloxy, cinnamoyloxy, phenoxy, 4-cyanophenoxy, 4-methanesulfonamidophenoxy, 4-methanesulfonylphenoxy, α-naphthoxy, 3-pentadecylphenoxy, benzyloxycarbonyloxy, ethoxy, 2-cyanoethoxy, benzyloxy, 2-phenethyloxy, 2-phenoxyethoxy, 5-phenyltetrazolyloxy, 2-benzothiazolyloxy); a group connected to the coupling active site via a nitrogen atom (e.g., benzenesulfonamido, N-ethyltoluenesulfonamido, heptafluorobutanamido, 2,3,4,5,6-pentafluorobenzamido, octanesulfonamido, p-cyanophenylureido, N,N-diethylsulfamoylamino, 1-pyperidyl, 5,5-dimethyl-2,4-dioxo-3-oxazolidinyl, 1-benzylethoxy-3-hydantoinyl, 2N-1,1-dioxo- 3(2H)-oxo-1,2-benzoisothiazolyl, 2-oxo-1,2-dihydro-1-pyridinyl, imidazolyl, pyrazolyl, 3,5-diethyl-1,2,4-triazol-1-yl, 5- or 6-bromobenzotriazol-1-yl, 5-methyl-1,2,3,4-tetrazol-1-yl, benzimidazolyl); or a group connected to the coupling active site via a sulfur atom (e.g., phenylthio, 2-carboxyphenylthio, 2-methoxy-5-t-octylphenylthio, 4-methanesulfonylphenylthio, 4-octanesulfonamidophenylthio, benzylthio, 2-cyanoethylthio, 1-ethoxycarbonyltridecylthio, 5-phenyl-2,3,4,5-tetrazolylthio, 2-benzothiazolyl). Preferably, the coupling-off group is connected to the coupling active site by a sulfur atom.

$R_1$, $R_2$, or X may be a divalent group via which the magenta coupler of formula (I) or (II-A) forms a bis compound, $R_1$ or $R_2$ represents a substituted or unsubstituted alkylene group (e.g., methylene, ethylene, 1,10-decylene, $—CH_2CH_2—O—CH_2CH_2—$), or a substituted or unsubstituted phenylene group (e.g., 1,4-phenylene, 1,3-phenylene,

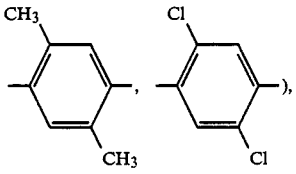

while X represents a divalent group derived from any of the above-cited monovalent groups.

When the moiety represented by formula (I) or (II-A) is contained in a vinyl monomer, a linkage group represented by $R_1$ or $R_2$ includes those formed by combining two or more divalent groups selected from among substituted or unsubstituted alkylene groups (e.g., methylene, ethylene, 1,10-decylene, $—CH_2CH_2OCH_2CH_2—$), substituted or unsubstituted phenylene groups (e.g., 1,4-phenylene, 1,3-phenylene,

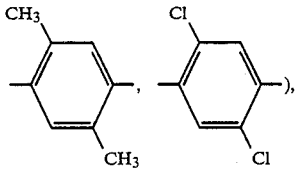

—NHCO—, —CONH—, —O—, —OCO—, and substituted or unsubstituted aralkylene groups (e.g.,

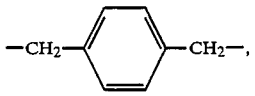

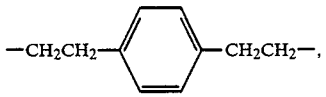

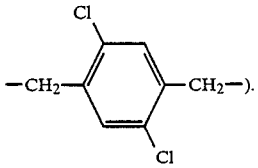

Specifically,

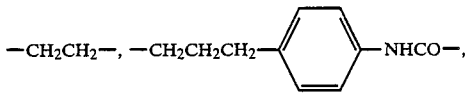

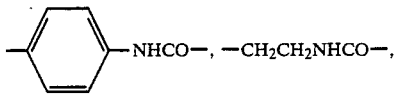

$—CH_2CH_2OCO—$, $—CH_2CH_2OCH_2CH_2NHCO—$, and

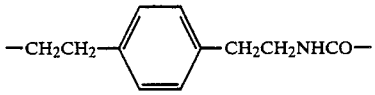

are preferred as the combined linkage group.

The vinyl group in such a vinyl monomer may contain a substituent group in addition to the moiety represented by formula (I) or (II-A). Preferred substituent groups include hydrogen, chlorine, or a lower alkyl group having from 1 to 4 carbon atoms (e.g., methyl, ethyl).

The monomer containing the coupler moiety represented by the general formula (I) or (II-A) may form a copolymer together with an ethylenically unsaturated monomer incapable of undergoing a coupling reaction with the oxidation product of an aromatic primary amine developing agent, and therefore, which cannot produce a color.

Specific examples of such non-color-producing ethylenically unsaturated monomers include acrylic acid, α-chloroacrylic acid, α-alkylacrylic acid (e.g., methacrylic acid), and esters or amides derived from these acrylic acids (e.g., acrylamide, n-butylacrylamide, t-butylacrylamide, diacetone acrylamide, methacrylamide, methyl acrylate, ethyl acrylate, n-propyl acrylate, n-butyl acrylate, t-butyl acrylate, iso-butyl acrylate, 2-ethylhexyl acrylate, n-octyl acrylate, lauryl acrylate, methyl methacrylate, ethyl methacrylate, n-butyl methacrylate, β-hydroxymethacrylate), methylenedibisacrylamide, vinyl esters (e.g., vinyl acetate, vinyl propionate, vinyl laurate), acrylonitrile, methacrylonitrile, aromatic vinyl compounds (e.g., styrene and derivatives thereof, vinyltoluene, divinyl benzene, vinylacetophenone, sulfostyrene), itaconic acid, citraconic acid, crotonic acid, vinylidene chloride, vinyl alkyl ethers (e.g., vinyl ethyl ether), maleic acid, maleic anhydride, maleic acid esters, N-vinyl-2-pyrrolidone, N-vinylpyridine, and 2- and 4-vinylpyridine. Two or more non-color-producing ethylenically unsaturated monomers can be used together. For example, a combination of n-butyl acrylate with methyl acrylate, of styrene with methacrylic acid, of methacrylic acid with acrylamide, and of methyl acrylate with diacetone acrylamide can be used.

As is well-known in the field of polymer color couplers, non-color-producing ethylenically unsaturated monomers to be copolymerized with a solid water insoluble coupler monomer can be selected so as to produce desirable physical and/or chemical properties of the resulting copolymers, for example, solubility, compatibility with a binder (such as gelatin) contained in a photographic colloidal composition, flexibility, thermal stability, and so on.

Polymer couplers to be used in the present invention may be either soluble or insoluble in water, and are particularly preferably in the form of a latex.

Specific examples of representative magenta couplers to be used in the present invention are illustrated below. However, the invention is not to be construed as being limited to these examples. Additionally, all ratios herein of constitutional repeating units of polymer couplers are by weight.

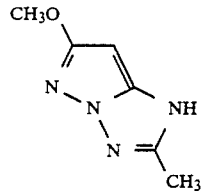

(1)

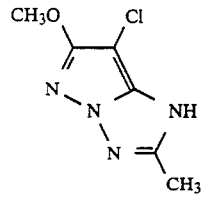

(2)

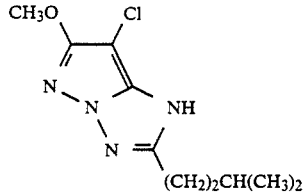

(3)

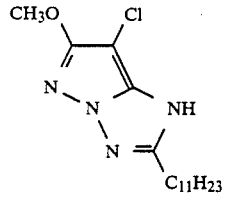

(4)

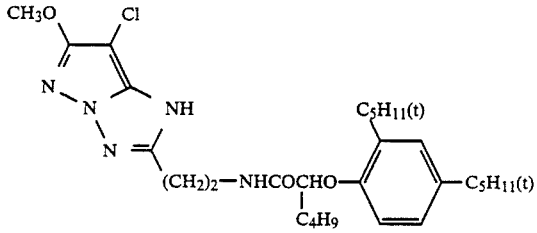

(5)

-continued
(6)
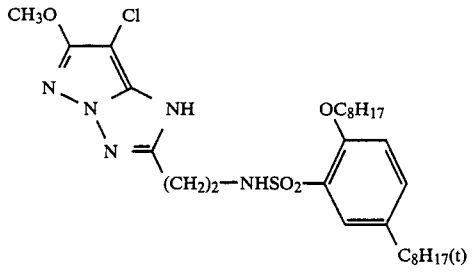
(7)
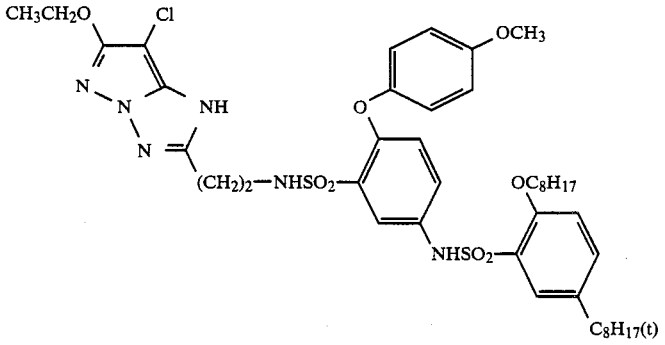
(8)
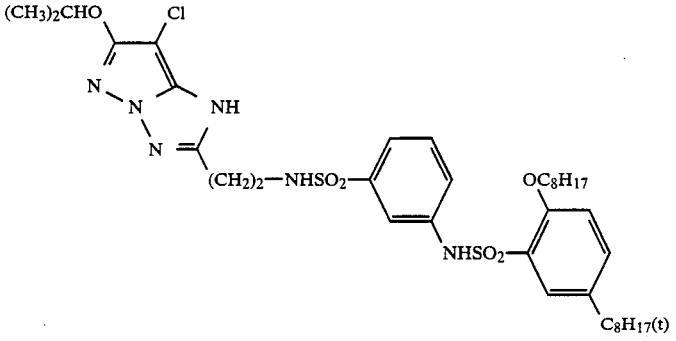
(9)
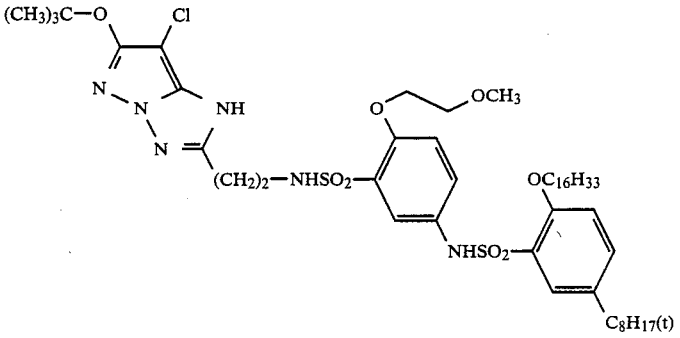
(10)
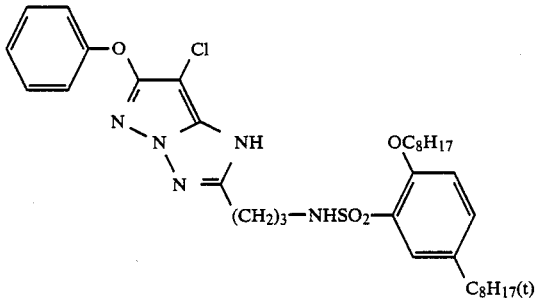

-continued
(11)
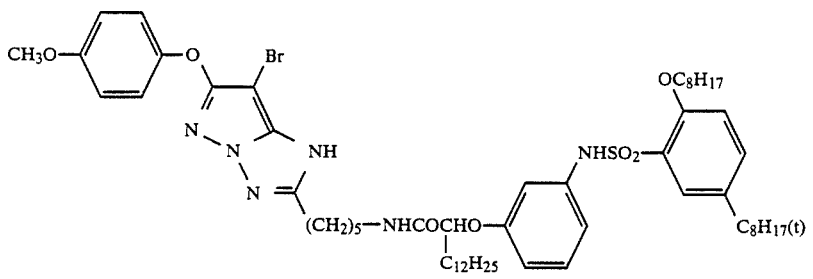
(12)
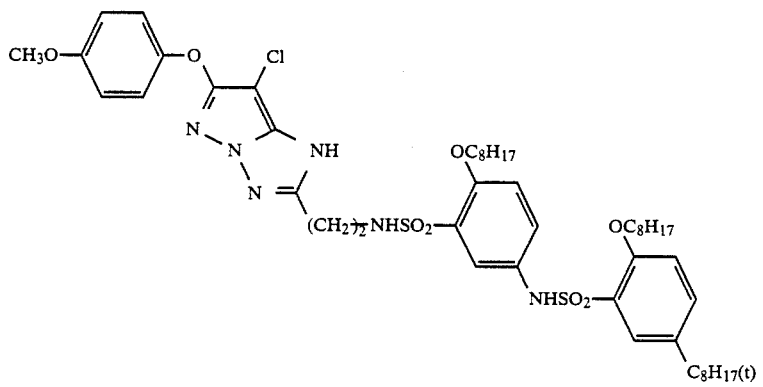
(13)
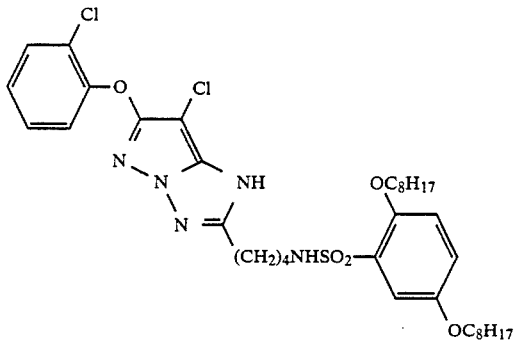
(14)
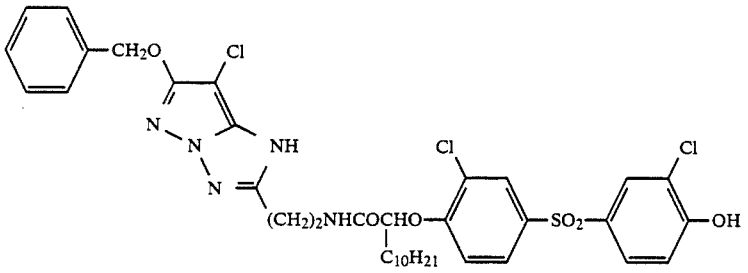

-continued
(15)
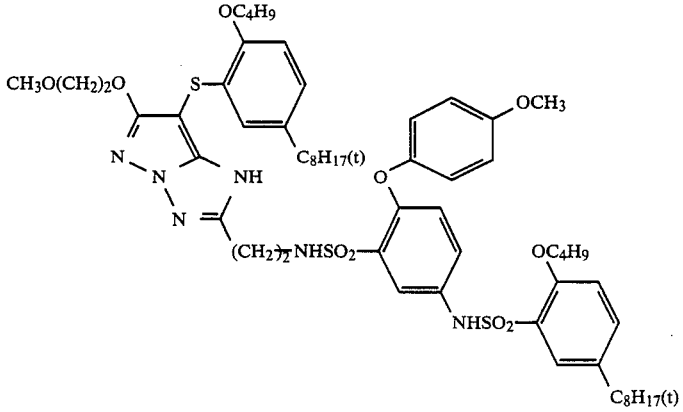
(16)
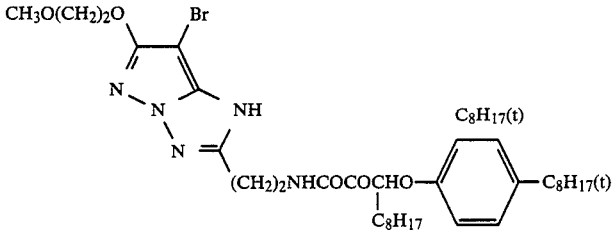
(17)
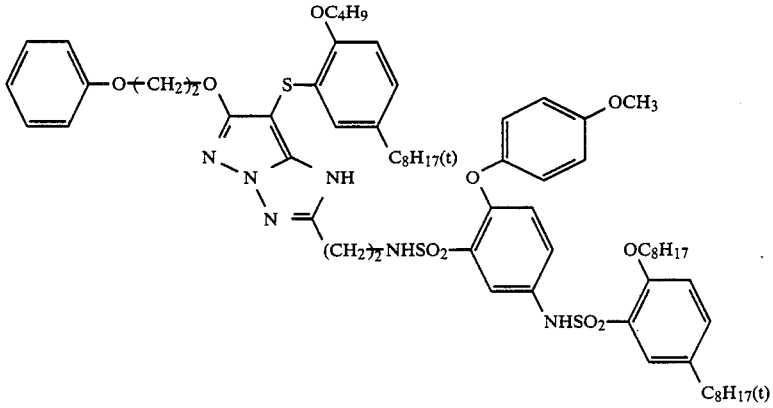
(18)
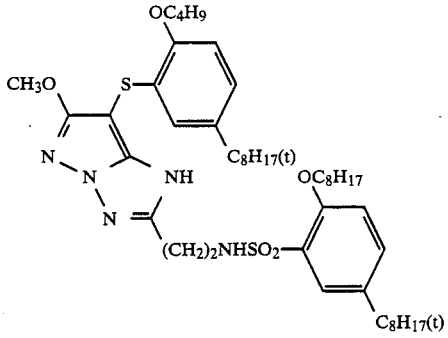

-continued
(19)
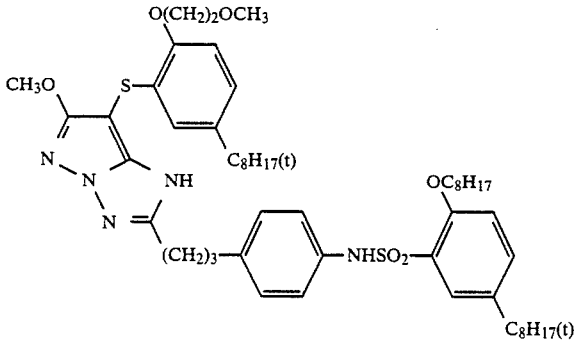
(20)
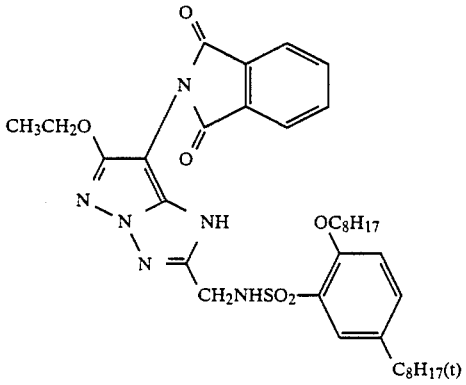
(21)
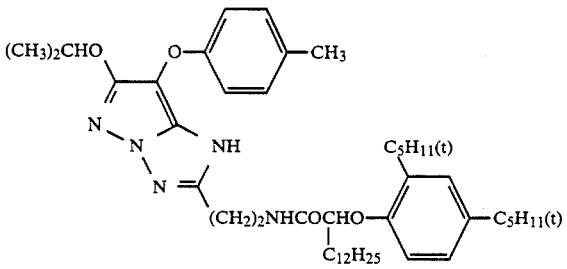
(22)
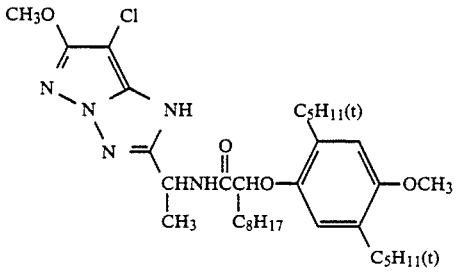

-continued
(23)
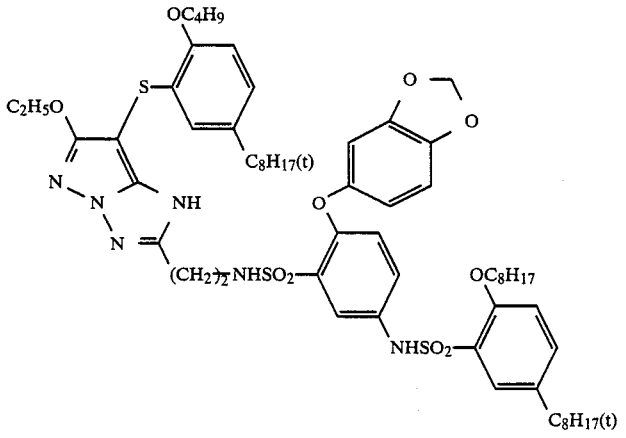
(24)
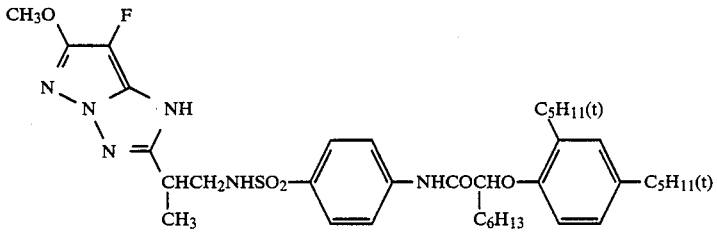
(25)
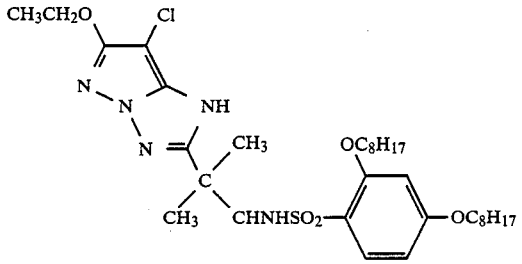
(26)
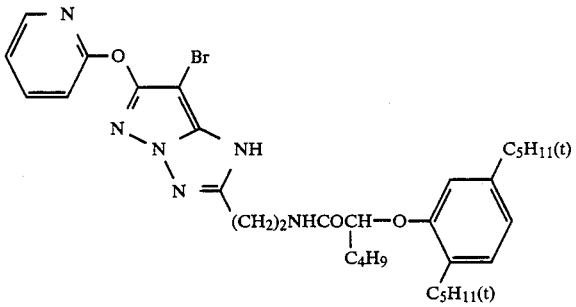
(27)
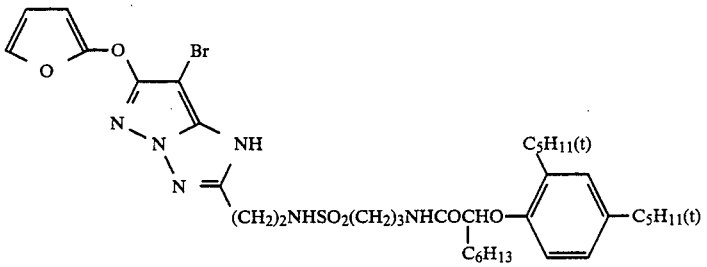

-continued
(28)
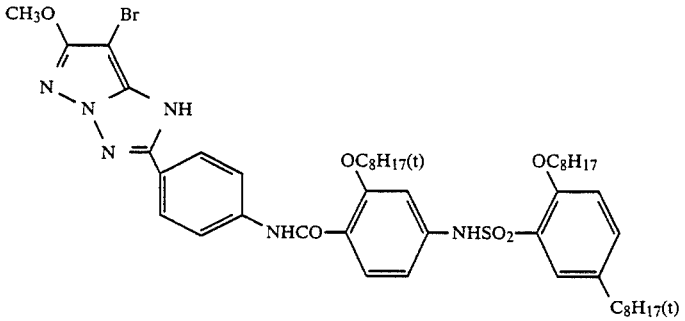
(29)
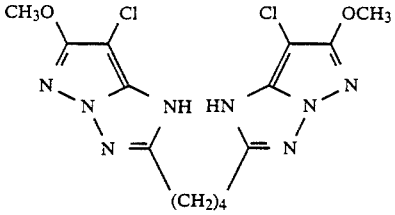
(30)
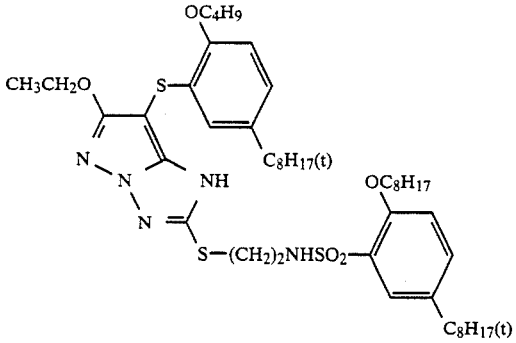
(31)
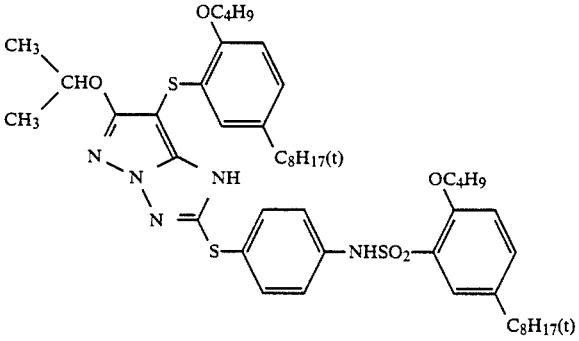
(32)
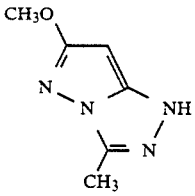
(33)
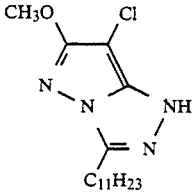

-continued
(34)
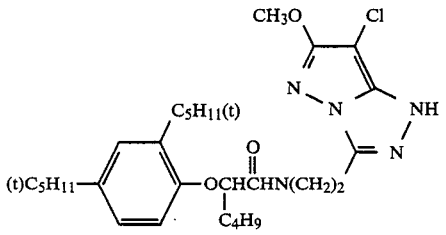
(35)
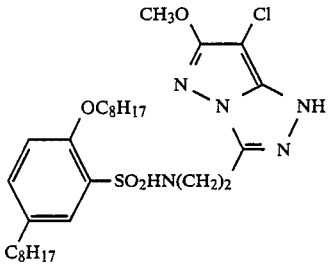
(36)
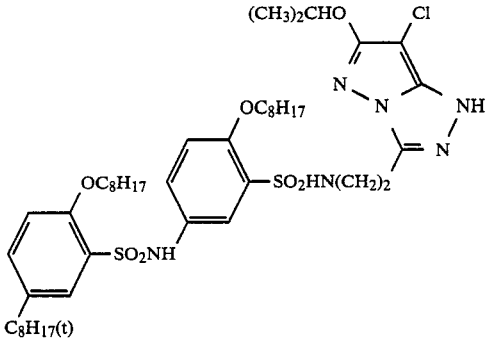
(37)
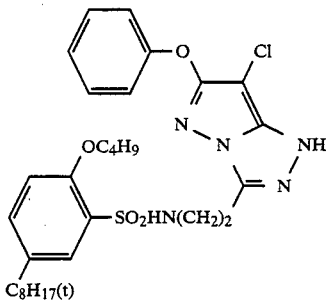
(38)
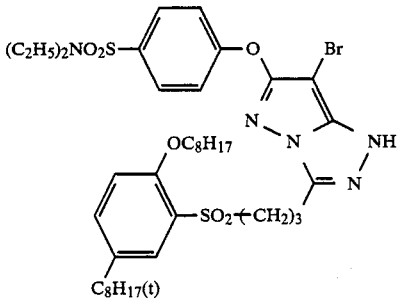

-continued
(39)
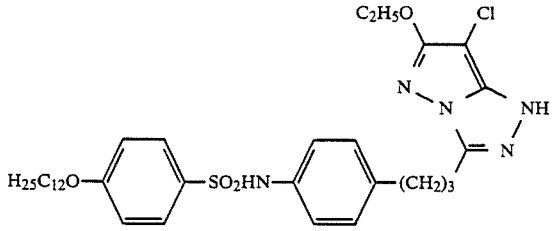
(40)
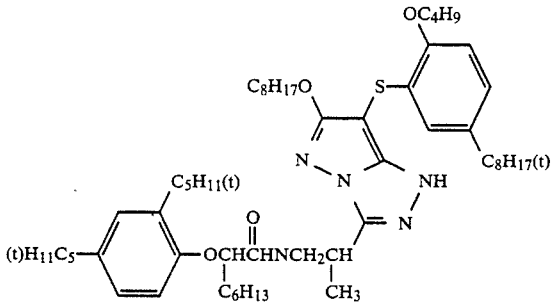
(41)
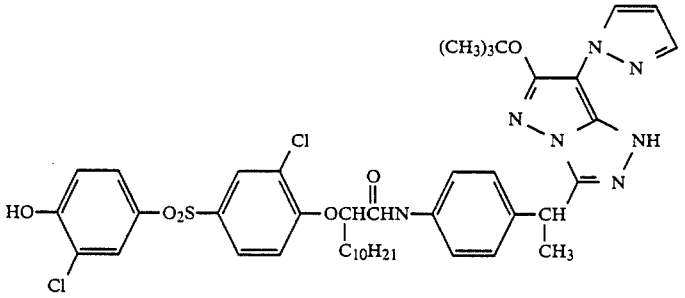
(42)
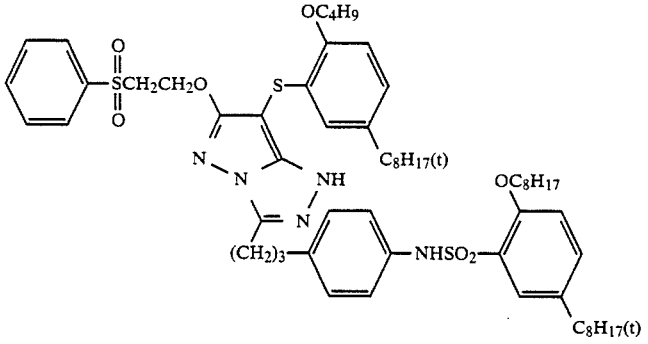
(43)
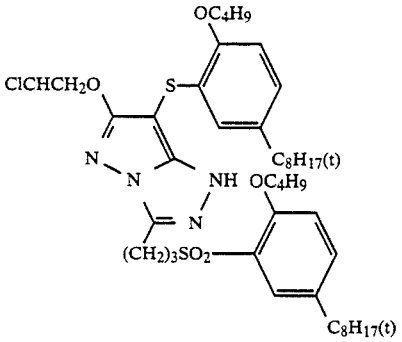

-continued
(44)
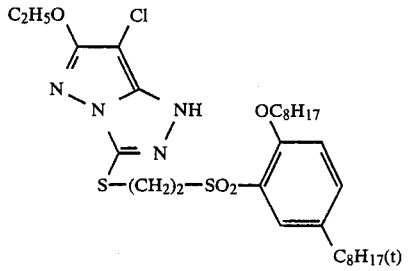
(45)
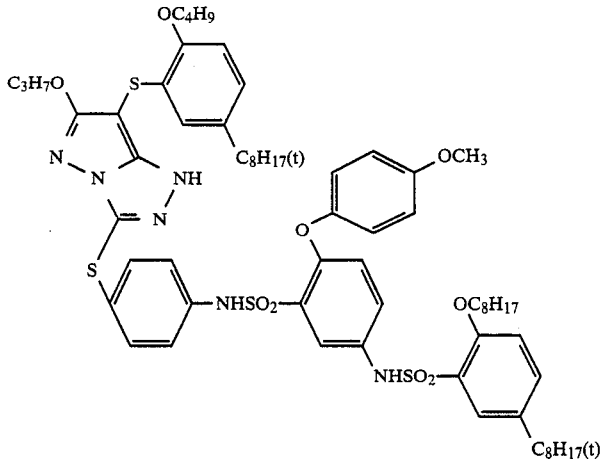
(46)
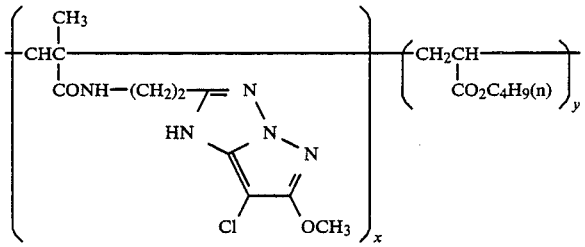
x:y = 50:50 (by weight, hereinafter the same)
(47)
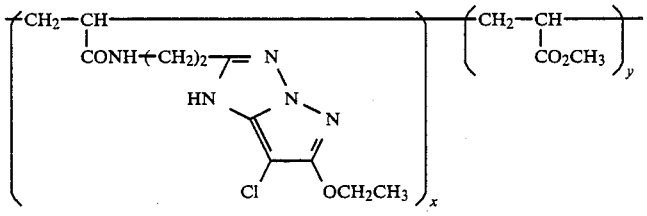
x:y = 45:55
(48)
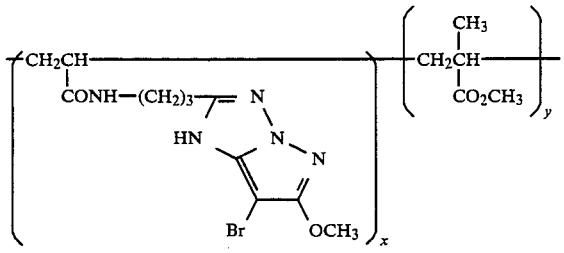
x:y = 45:55

-continued
(49)
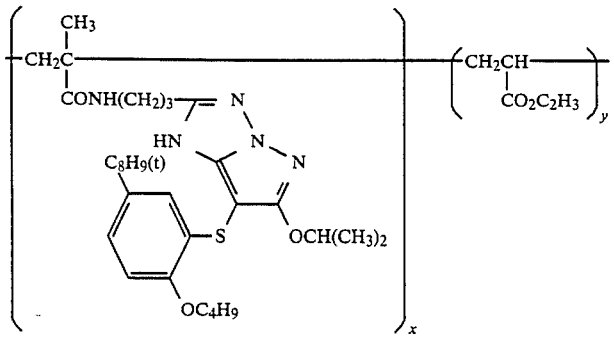
x:y = 50:50
(50)
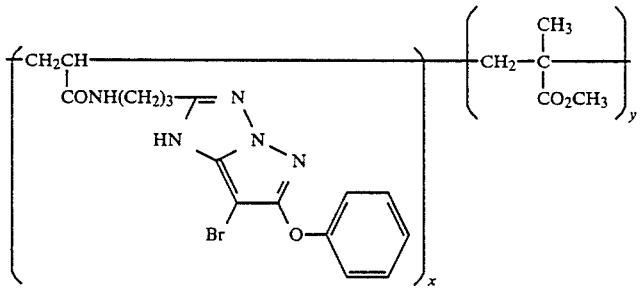
x:y = 45:55
(51)
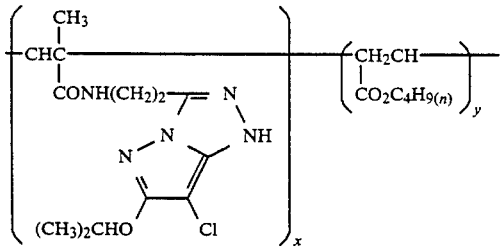
x:y = 50:50
(52)
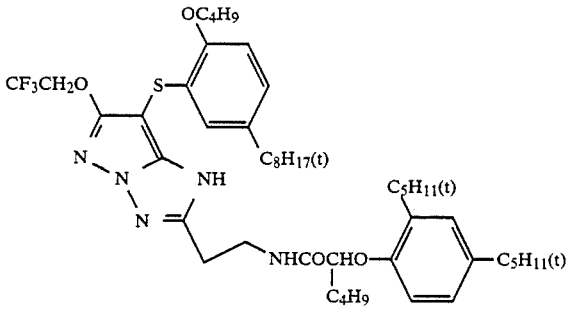
(53)
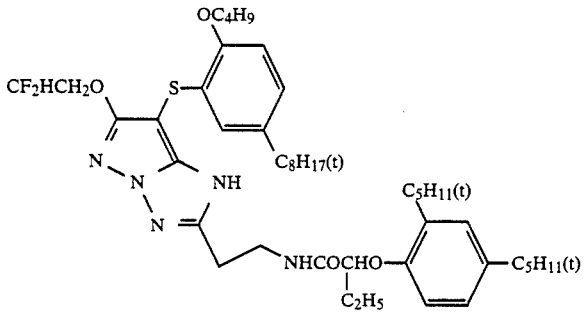

-continued
(54)
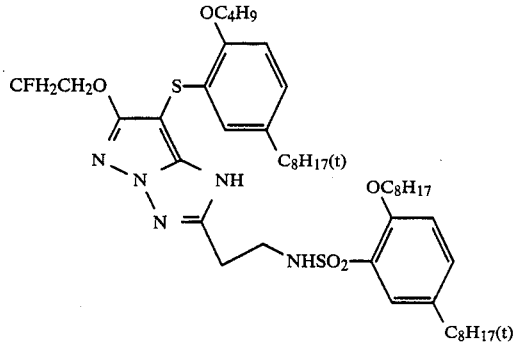
(55)
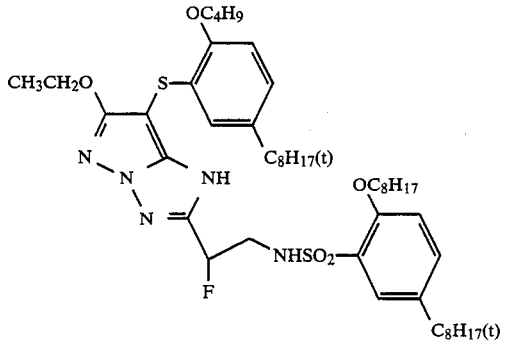
(56)
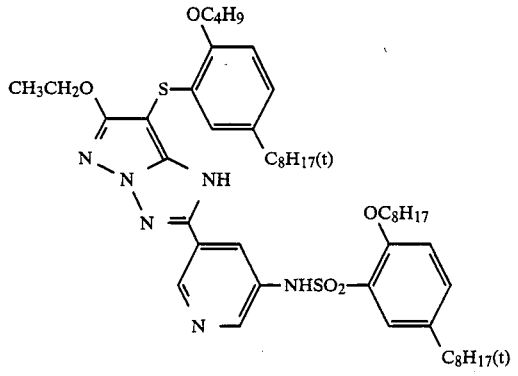
(57)
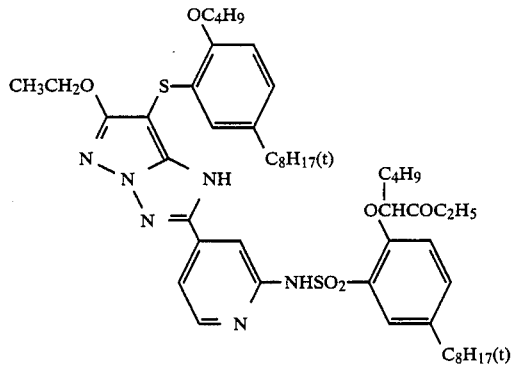

-continued
(58)
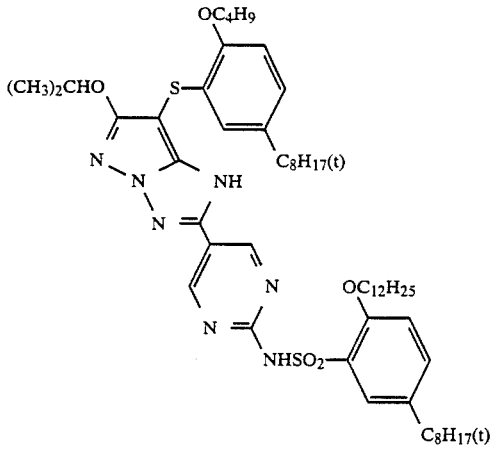
(59)
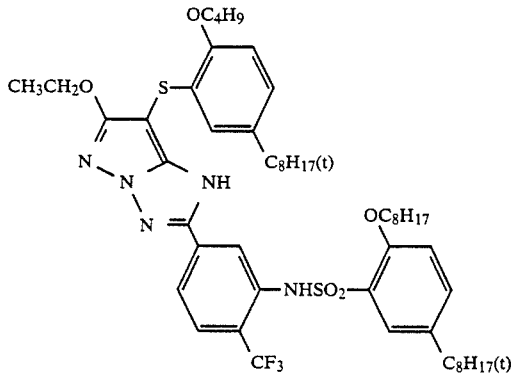
(60)
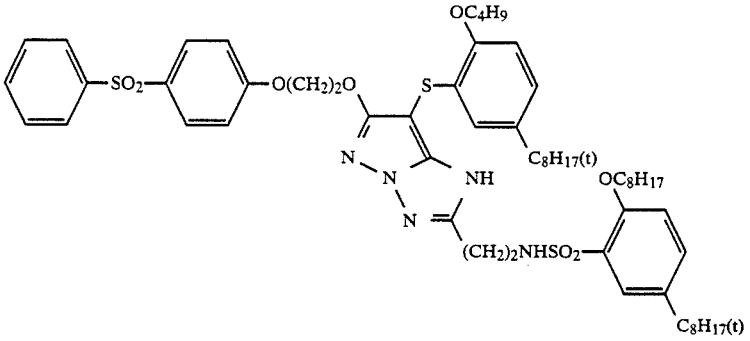
(61)
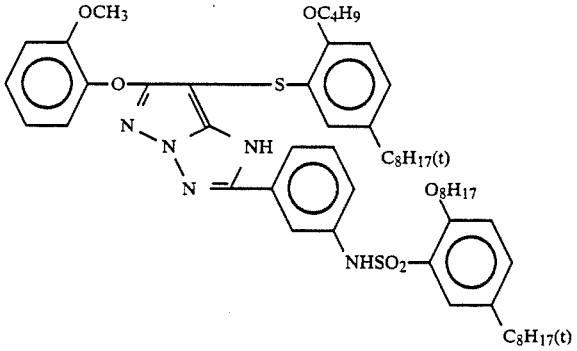

-continued
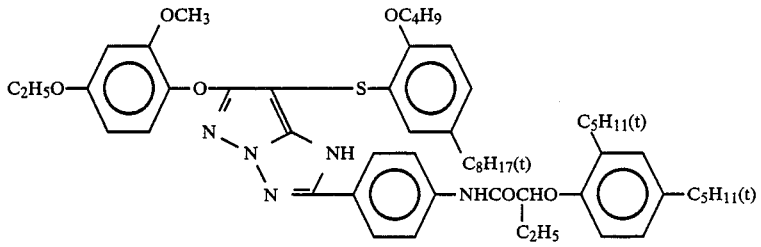
(62)
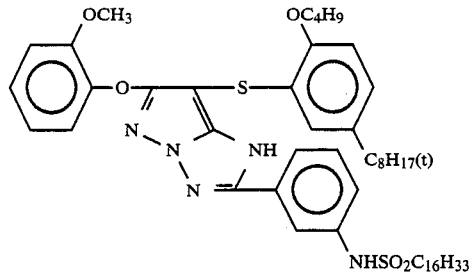
(63)
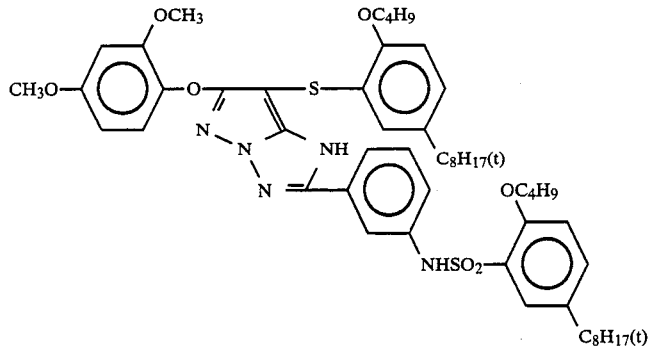
(64)
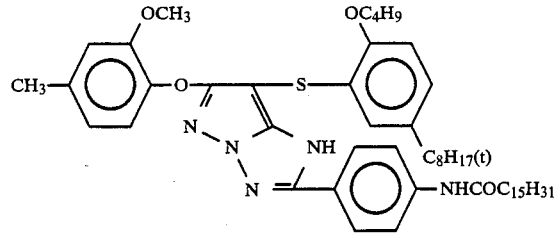
(65)
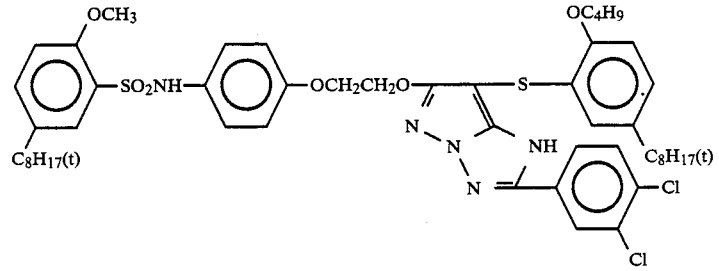
(66)

-continued
(67)
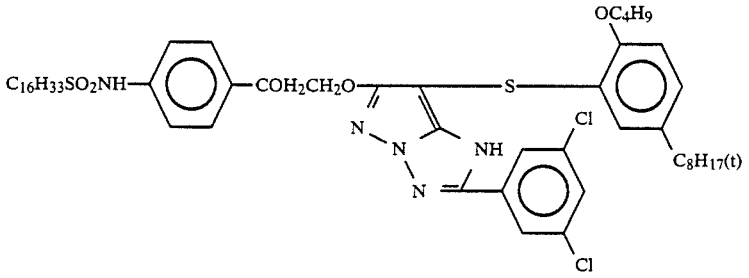
(68)
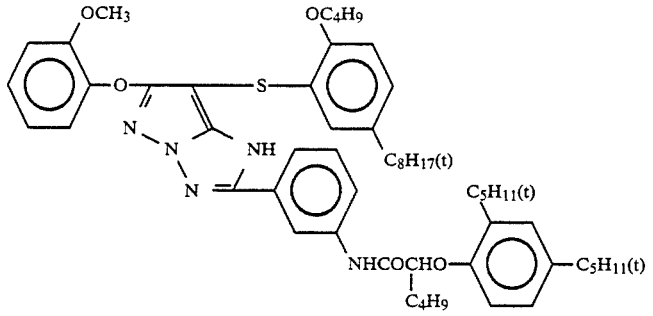
(69)
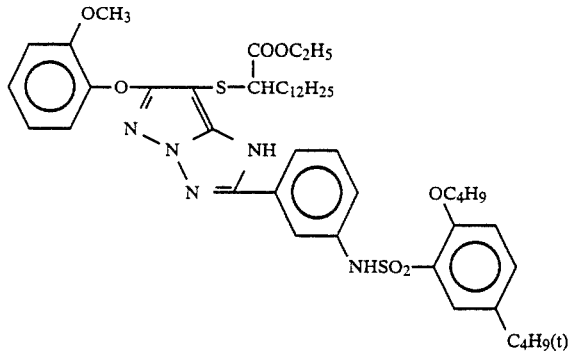
(70)
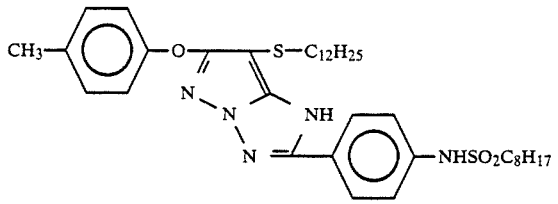
(71)
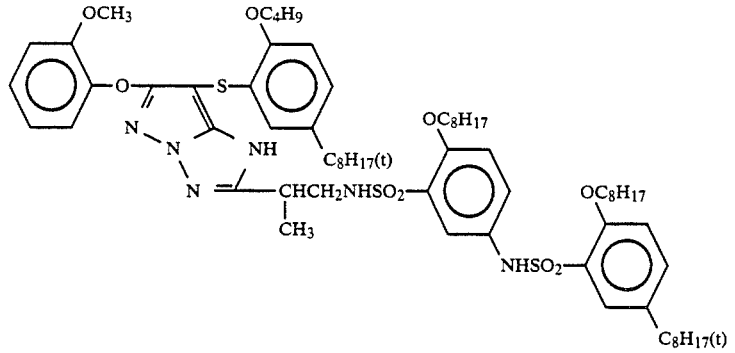

-continued
(72)
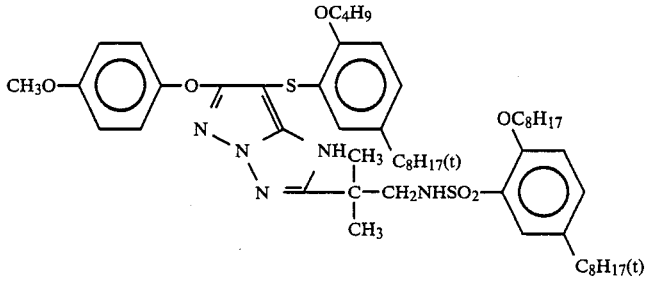
(73)
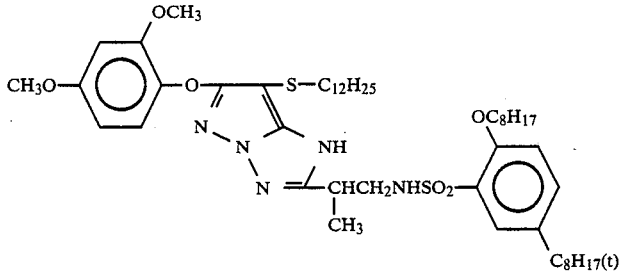
(74)
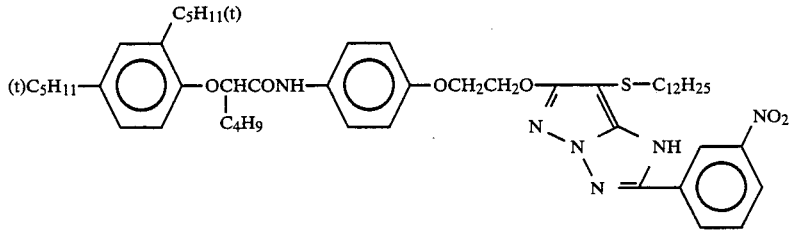
(75)
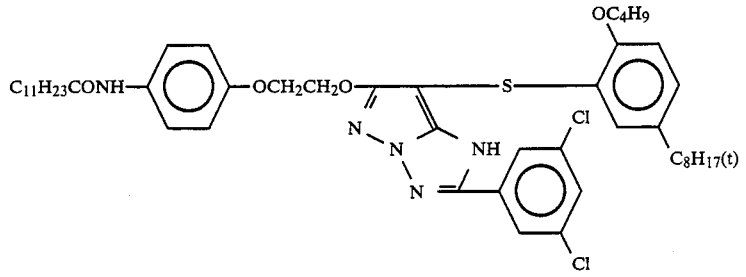
(76)
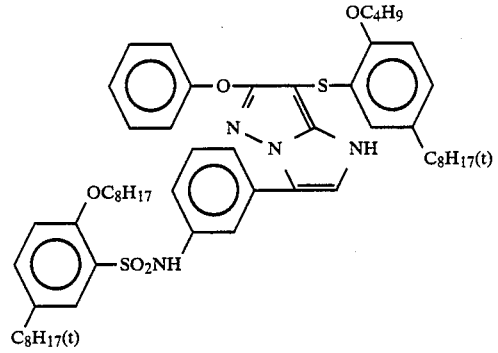

-continued
(77)
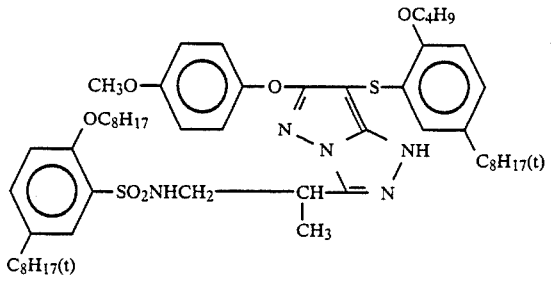
(78)
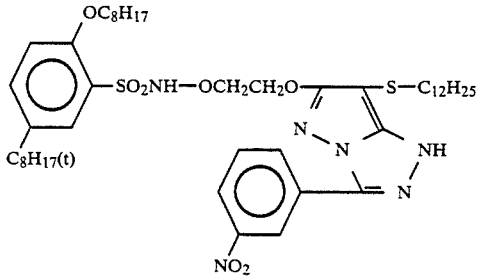
(79)
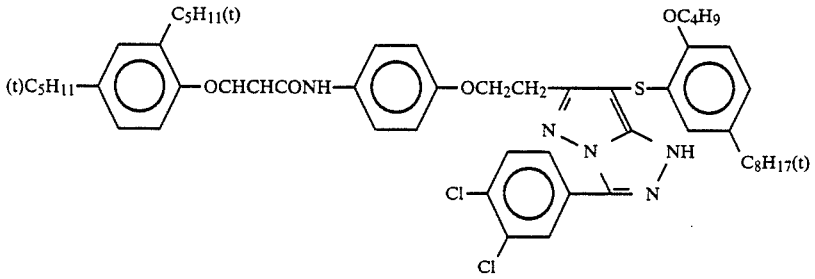
(80)
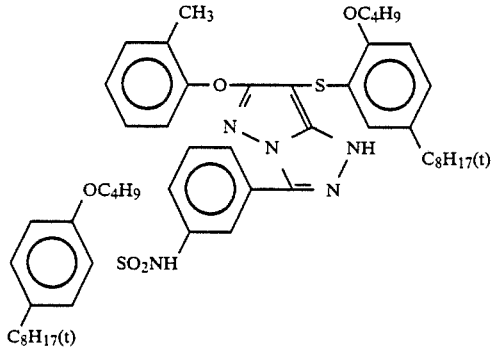
(81)
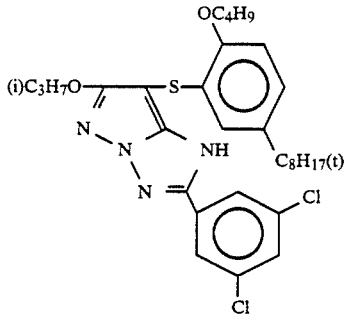

-continued (82)

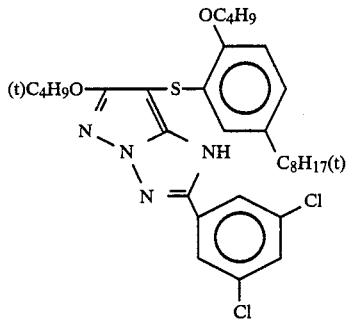

Of the couplers represented by the foregoing general formulae (I) and (II-A), those containing an aryl group, especially a substituted phenyl group (e.g., a phenyl substituted by an alkoxy group at the α-position), as $R_1$ are preferred over others.

General methods for synthesizing the couplers of the present invention are described below.

The synthesis methods for 1H-pyrazolo[1,5-b]-1,2,4-triazoles having a hydrogen atom and an alkyl group at their respective 6-positions are described in JP-A-No. 60-197688. Basically, the couplers of the present invention (represented by the general formulae (I) and (II-A)), though differing in starting materials, can be synthesized by the same methods as cited above. The synthesis scheme is shown below. Details of other synthesis methods are described in Japanese Patent Application No. 62-175515, pp. 37 to 50.

The coupler represented by formula (I) or (II-A) is added in an amount of from $2\times10^{-3}$ to 1 mol/Agmol, preferably from $1\times10^{-2}$ to $5\times10^{-1}$ mol/Agmol, to the light-sensitive silver halide layer.

(Synthetic Scheme)

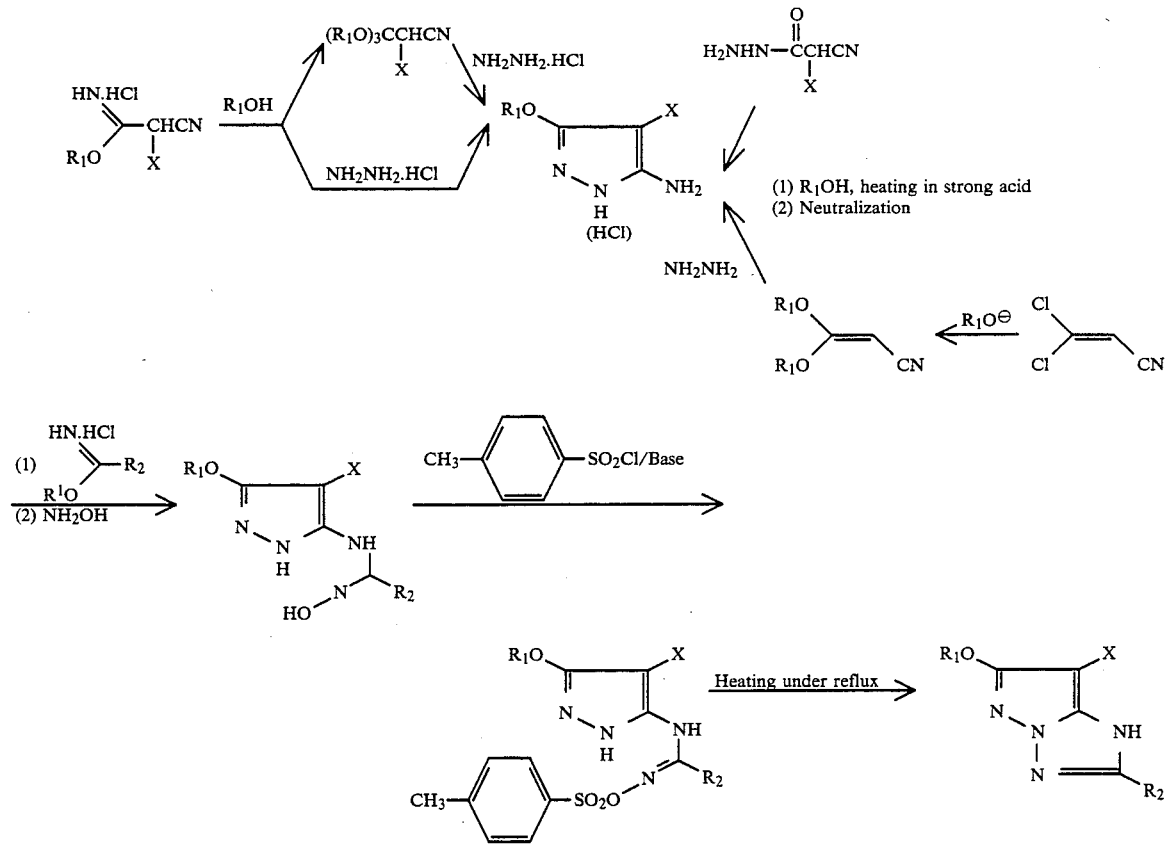

The compound represented by formula (III) is described in more detail below.

R represents hydrogen, an alkyl group (e.g., methyl, ethyl, butyl, isoamyl, octyl, hexadecyl), an alkenyl group (e.g., vinyl, allyl, 5-methyl-1-hexenyl, 1-octadecenyl), an alkynyl group (e.g., propynyl, 4-methyl-2-pentynyl, 5-tridecynyl, 1-octadecynyl), an oxy radical or hydroxyl. In particular, hydrogen is preferred as R.

$R_3$, $R_4$, $R_5$ and $R_6$ may be the same or different, and each represents hydrogen, or an alkyl group (e.g., methyl, ethyl, propyl, octyl, hexadecyl).

A represents a nonmetallic atomic necessary for forming a 5-, 6- or 7-membered ring, with specific examples including $—CH_2CH_2—$, $—CH_2CH_2CH_2—$, $—CH_2\underset{\underset{O}{\|}}{C}—CH_2—$, $—CH_2OCH_2—$, $—CH_2SO_2—CH_2—$, $—CH_2\underset{\underset{O}{\|}}{O}C—$, $—CH_2—\underset{\underset{OR_7}{|}}{C}HCH_2—$, $—CH_2—\underset{\underset{OR_7}{|}}{\underset{\underset{OR_8}{|}}{C}}—CH_2—$, and

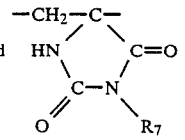

(wherein $R_7$ and $R_8$ may be the same or different, and each represents hydrogen, an alkyl group, an acyl group, a sulfonyl group, a sulfinyl group, or an alkoxycarbonyl group). Further, a 5- or 6-membered ring (e.g., cyclopentyl, cyclohexyl, cyclohexyl, pyran, piperazine, piperidine, morpholine) may be formed by combining $R_3$ with $R_4$, $R_5$ with $R_6$, R with $R_3$, or $R_3$ with A.

As for A, a nonmetallic atomic group forming a 5- or 6-membered ring, particularly those forming a piperidine ring, are preferred. As for $R_3$, $R_4$, $R_5$ and $R_6$, it is desirable that at least two of them, more preferably all of them, are an alkyl group. As for R, hydrogen or an alkyl group is preferred, and hydrogen is particularly preferred.

Specific examples of the compounds represented by the formula (III) are illustrated below. However, the invention is not to be construed as being limited to these examples.

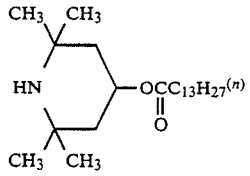

III-1

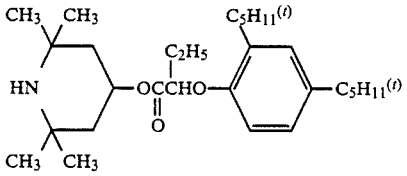

III-2

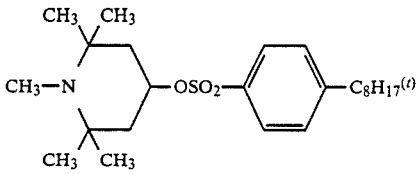

III-3

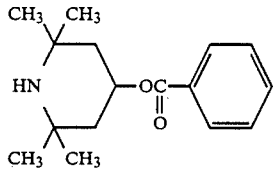

III-4

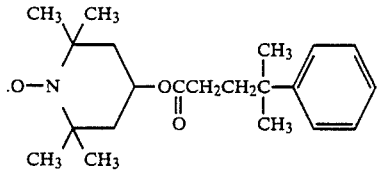

III-5

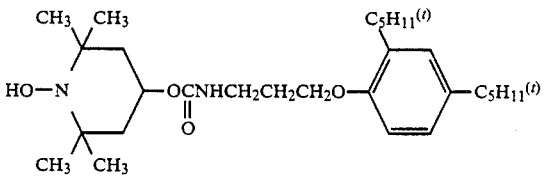

III-6

-continued
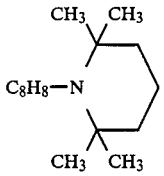
III-7
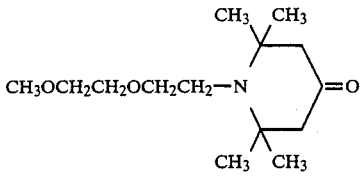
III-8
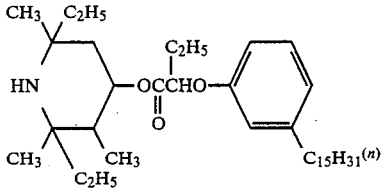
III-9
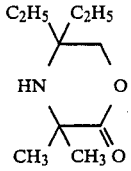
III-10
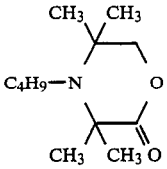
III-11
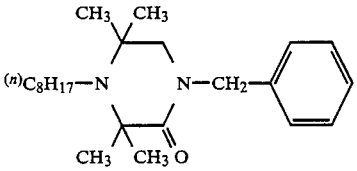
III-12
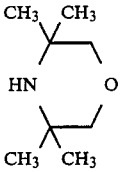
III-13
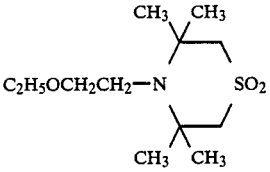
III-14
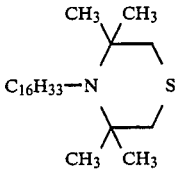
III-15

-continued
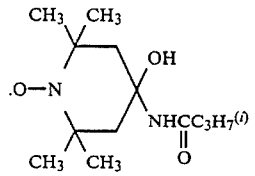
III-16
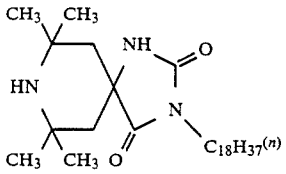
III-17
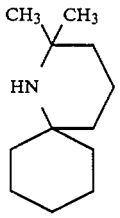
III-18
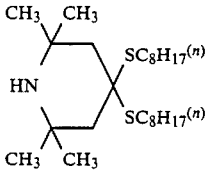
III-19
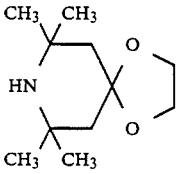
III-20
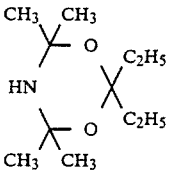
III-21
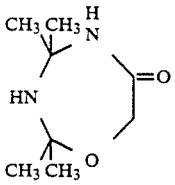
III-22
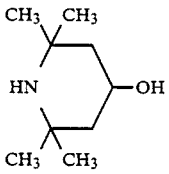
III-23

-continued
III-24
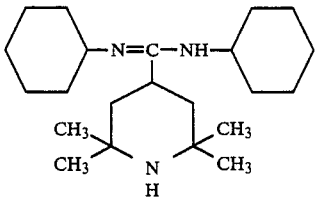
III-25
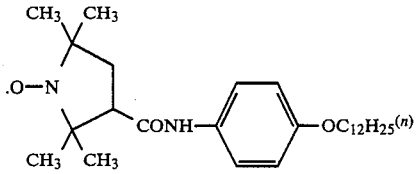
III-26
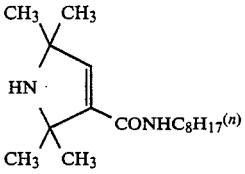
III-27
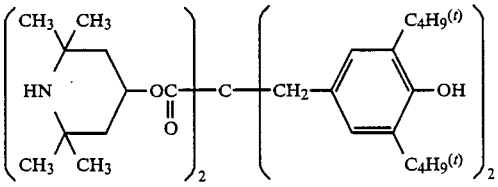
III-28
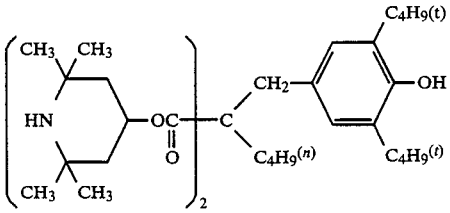
III-29
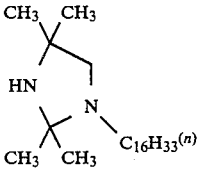
III-30
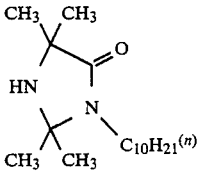
III-31
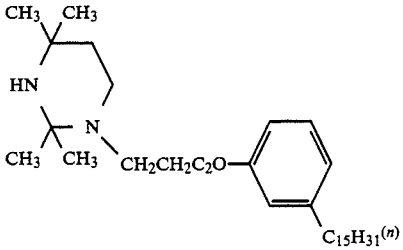

-continued
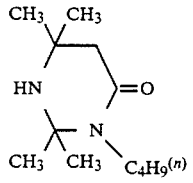
III-32
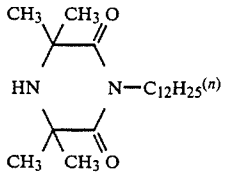
III-33
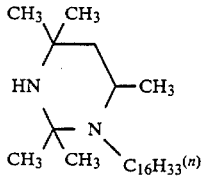
III-34
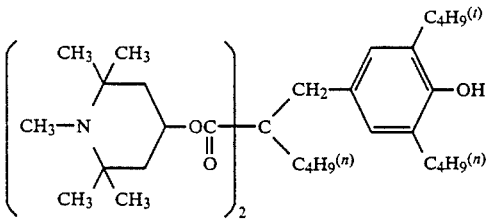
III-35
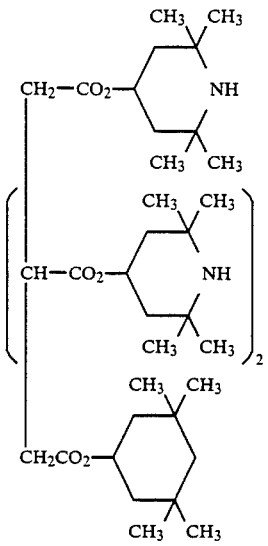
III-36

-continued
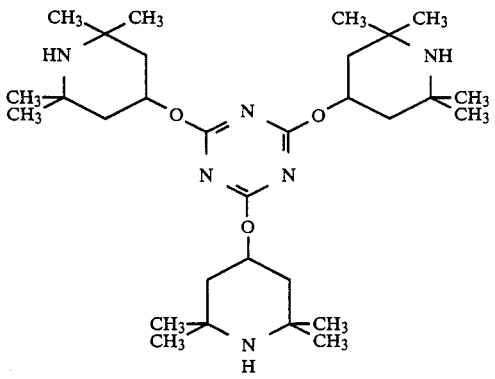
III-37
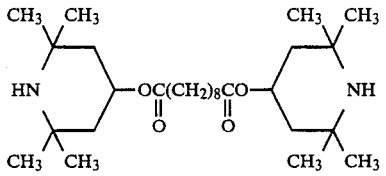
III-38
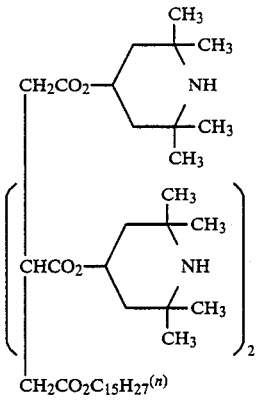
III-39
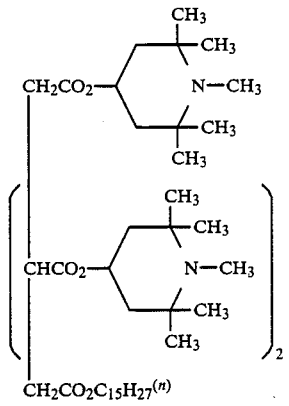
III-40
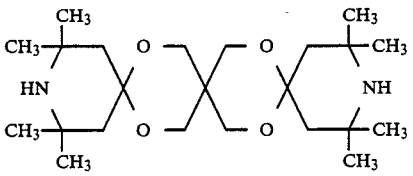
III-41

-continued
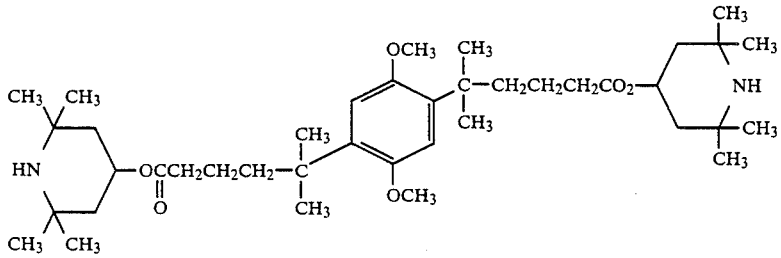
III-42
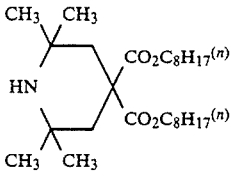
III-43
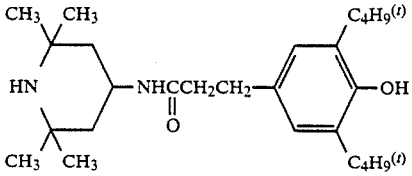
III-44
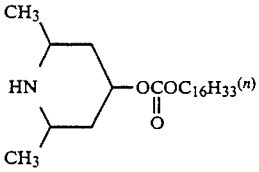
III-45
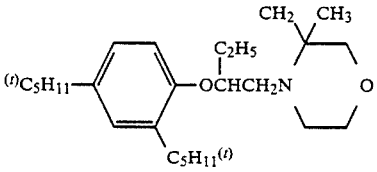
III-46
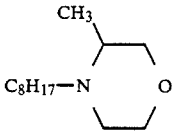
III-47
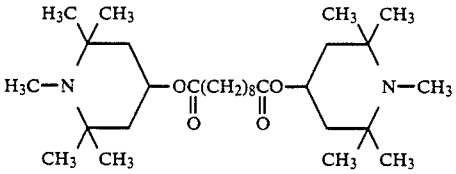
(III-48)

-continued (III-49)

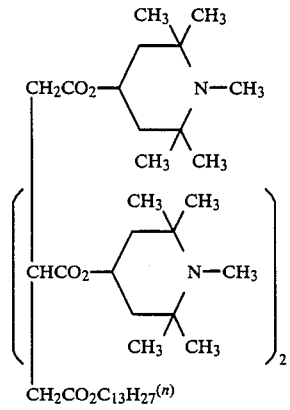

(III-50)

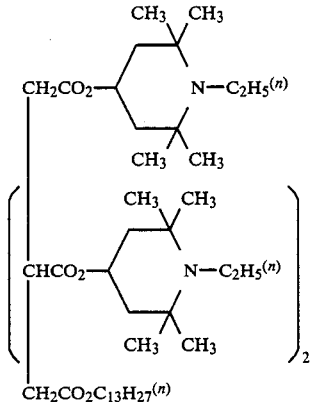

(III-51)

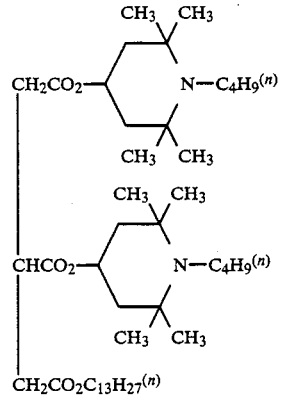

(III-52)

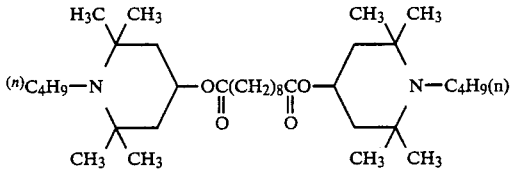

These compounds can be synthesized in accordance with the methods described in JP-A-No. 49-53572, JP-A-No. 49-53573, JP-A-No. 49-53574, JP-A-No. 49-53575, JP-A-No. 49-7180, JP-B-No. 51-1420 (the term "JP-B" as used herein means an "examined Japanese patent publication"), British Patent Nos. 1,326,889, 1,354,313 and 1,410,846, and U.S. Pat. Nos. 4,268,593 and 4,452,884.

These compounds are added in a proportion of 5 to 200 mol %, preferably 10 to 50 mol %, to the coupler.

Image stabilizers which are preferably used together with the compounds of the present invention, include compounds represented by the general formula (IV), and metal complexes.

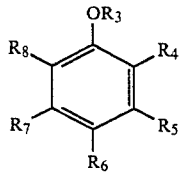

(IV)

In the foregoing formula, $R_3$ represents hydrogen, an alkyl group, an alkenyl group, an aryl group, a heterocyclic group, or

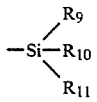

(wherein $R_9$, $R_{10}$ and $R_{11}$ may be the same or different, and each represents an alkyl group, an alkenyl group, an aryl group, an alkoxy group, an alkenoxy group or an aryloxy group). $R_4$, $R_5$, $R_6$, $R_7$ and $R_8$ may be the same or different, and each represents hydrogen, an alkyl group, an alkenyl group, an aryl group, an acylamino group, an alkylamino group, an alkylthio group, an arylthio group, an alkoxycarbonyl group, an aryloxycarbonyl group, a halogen atom or —O—$R_3'$, wherein $R_3'$ has the same meaning as $R_3$. $R_3$ and $R_4$ may combine with each other to form a 5-membered ring, a 6-membered ring or a spiro ring. Also, $R_4$ and $R_5$, or $R_5$ and $R_6$ may combine with each other to form a 5-membered ring, a 6-membered ring or a spiro ring.

More detailed descriptions of $R_4$, $R_5$, $R_6$, $R_7$ and $R_8$ are given below.

$R_4$, $R_5$, $R_6$, $R_7$ and $R_8$ may be the same or different, and each represents hydrogen, an alkyl group (e.g., methyl, n-butyl, n-octyl, sec dodecyl, t-butyl, t-amyl, t-hexyl, t-octyl, t-octadecyl, α,α-dimethylbenzyl, 1,1,-dimethyl-4-hexyloxycarbonylbutyl), an alkenyl group (e.g., vinyl, allyl), an aryl group (e.g., phenyl, naphthyl, p-methoxyphenyl, 2,4-t-butylphenyl), an acylamino group (e.g., acetylamino, propionylamino, benzamino), an alkylamino group (e.g., N-methylamino, N,N-dimethylamino, N,N-dihexylamino, piperidino, N-cyclohexylamino, N-(t-butyl)amino), an alkylthio group (e.g., methylthio, n-butylthio, sec-butylthio, t-butylthio, dodecylthio), an arylthio group (e.g., phenylthio, naphthylthio), an alkoxycarbonyl group (e.g., methoxycarbonyl, n-octyloxycarbonyl), an aryloxycarbonyl group (e.g., phenyloxycarbonyl, naphthyloxycarbonyl, 4-methoxy-2-t-butylphenoxycarbonyl, 2,4-di-t-butylphenyloxycarbonyl), a halogen atom (e.g., chlorine, bromine), or —O—$R_3'$, wherein $R_3'$ represents the same group as $R_3$. $R_3$ may combine with $R_4$ or $R_5$ to form a 5-membered, 6-membered or spiro ring. Specific examples of a ring formed by combining $R_3$ with $R_4$ include a chroman ring, a coumarane ring, and methylenedioxybenzene. Also, $R_4$ and $R_5$, or $R_5$ and $R_6$ may combine with each other to form a 5-membered, 6-membered or spiro ring, including an indane ring and a spiroindane ring.

Of the compounds represented by the general formula (IV), those represented by the following general formulae (IV-1) to (IV-5) are preferred.

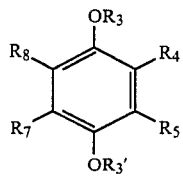

(IV-1)

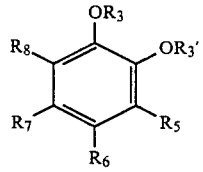

(IV-2)

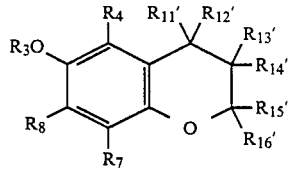

(IV-3)

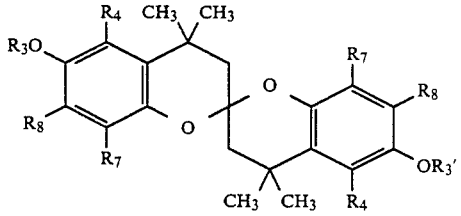

(IV-4)

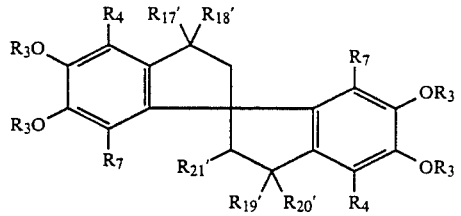

(IV-5)

In the general formulae (IV-1) to (IV-5), $R_3$, $R_3'$, $R_4$, $R_5$, $R_6$, $R_7$ and $R_8$ have the same meanings as those in formula (IV), respectively. $R_{11}'$ through $R_{21}$, may be the same or different, and each represents hydrogen, an alkyl group or an aryl group.

Of the compounds represented by the general formulae (IV-1) to (IV-5), those having alkyl groups or aryl groups, especially alkyl groups, as $R_3$ and $R_3'$, are preferred. Further, it is desirable that $R_4$ to $R_8$ should be those selected from hydrogen, alkyl groups and aryl groups.

Also, it is preferred that the compound of the present invention should be used together with metal complexes. Metal complexes which can be used in the present invention are compounds containing copper, cobalt, nickel, palladium or platinum as the central metal, and at least one bidentate or higher organic ligand. As for the central metal, nickel is particularly preferred. As for the coordination atoms which are coordinately bonded to the central metal, nitrogen, sulfur, oxygen and phosphorus are preferred.

Structures of metal complexes which are particularly preferred in the present invention are represented by the following general formulae (V-1) to (V-4).

(V-1)

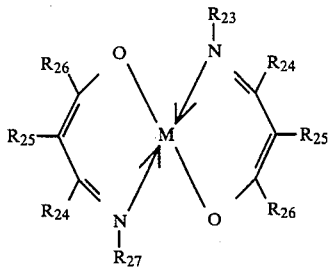

(V-2)

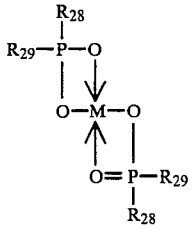

(V-3)

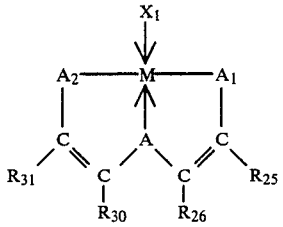

(V-4)

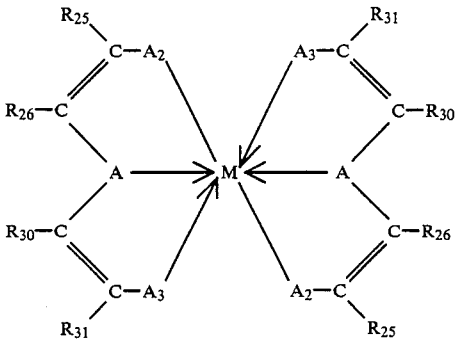

In the foregoing general formulae (V-1) to (V-4), M represents Cu, Co, Ni, Pd, or Pt. $R_{23}$ and $R_{27}$ may be the same or different, and each represents hydrogen, an alkyl group, an aryl group, or a hydroxyl group.

Further, $R_{23}$ and $R_{27}$ be linked, $R_{24}$ represents hydrogen, an alkyl group, or an aryl group. $R_{25}$ and $R_{26}$ may be the same or different, and each represents hydrogen, an alkyl group, or an aryl group. Further, $R_{25}$ and $R_{26}$ may be linked to form an aromatic ring or a 5- to 8-membered ring. $R_{30}$ and $R_{31}$ have the same meanings as $R_{25}$ and $R_{26}$. $R_{28}$ and $R_{29}$, which may be the same or different, each represents an alkyl group, an aryl group, an alkylthio group, an arylthio group, an alkoxy group, an aryloxy group, an alkylamino group, or an arylamino group. Of the substituent groups present in the general formulae (V-1) to (V-4), those having an alkyl moiety or an aryl moiety may be further substituted by a substituent group.

$X_1$ represents a compound capable of coordinately bonding to M. Specific examples of such compound include $H_2O$ and organic or inorganic amines (e.g., pyridine, triethylamine, ammonia). A represents oxygen, sulfur or —$NR_{110}$—, wherein $R_{110}$ represents hydrogen, an alkyl group, an aryl group, a hydroxyl group, or an alkoxy group. $A_1$ and $A_2$, which may be the same or different, each represents oxygen, sulfur, or an amine group. $A_3$ represents a hydroxyl group, an alkoxy group, an alkylthio group, or —$NR_{120}R_{130}$, wherein $R_{120}$ and $R_{130}$ may be the same or different, and each represents hydrogen or an alkyl group.

Of the metal complexes represented by formulae (V-1) to (V-4), those represented by formula (V-1) are preferred.

Specific examples of the compounds represented by formula (IV), and those of the metal complexes are illustrated below. However, the invention is not to be construed as being limited to these examples.

A-1

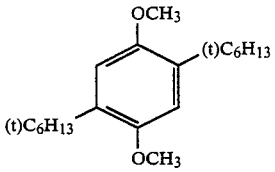

A-2

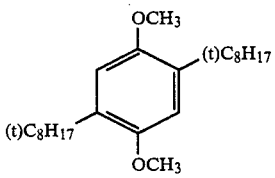

-continued
A-3
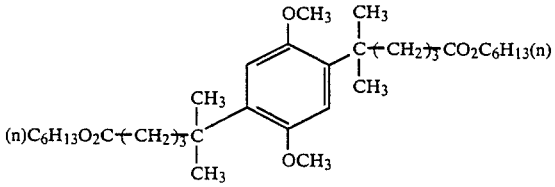
A-4
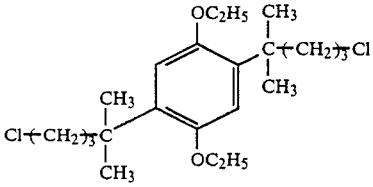
A-5
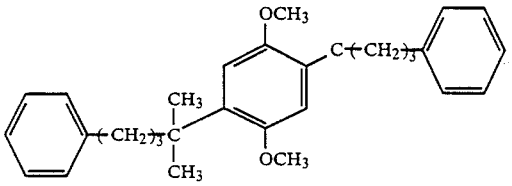
A-6
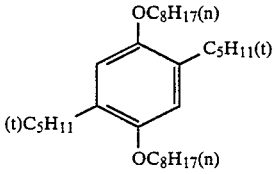
A-7
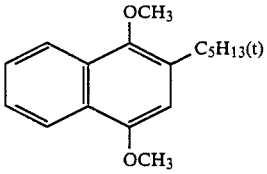
A-8
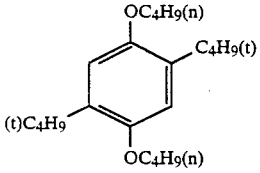
A-9
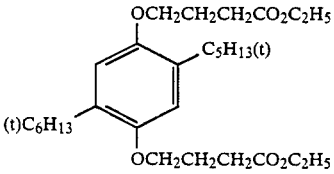
A-10
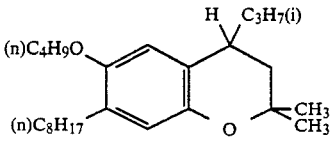
A-11
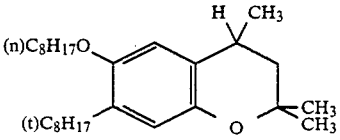

-continued
A-12
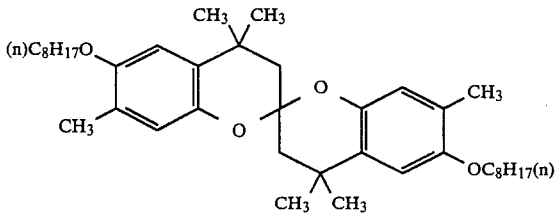
A-13
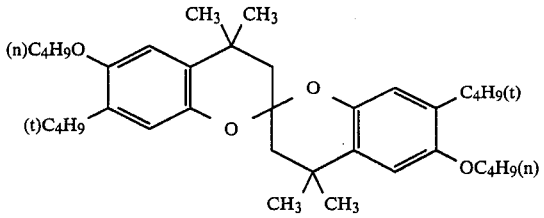
A-14
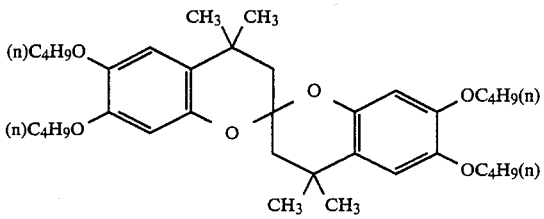
A-15
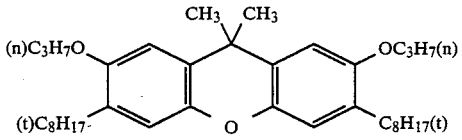
A-16
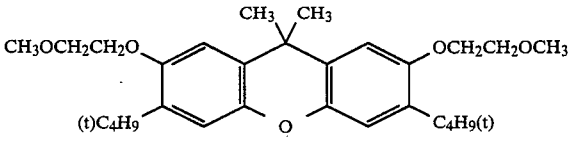
A-17
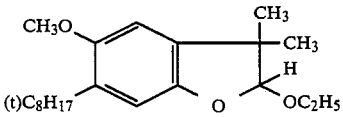
A-18
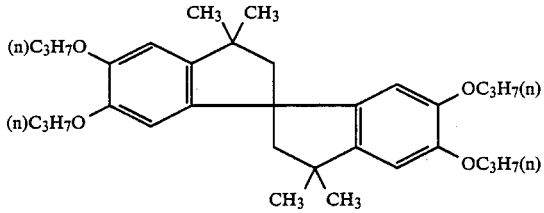
A-19
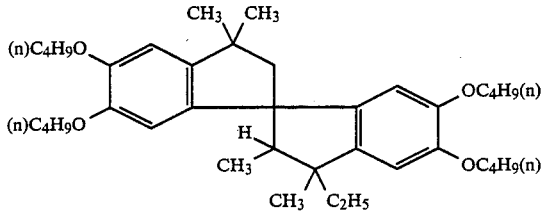

-continued
A-20
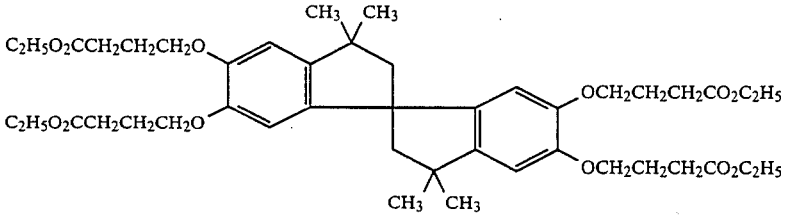
A-21
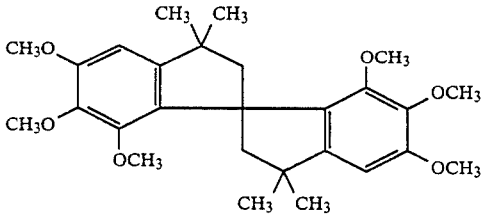
A-22
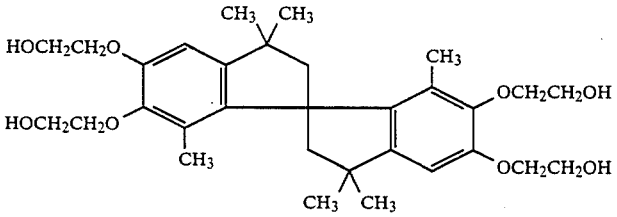
A-23
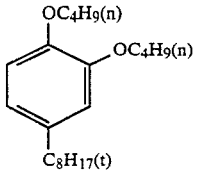
A-24
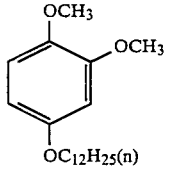
A-25
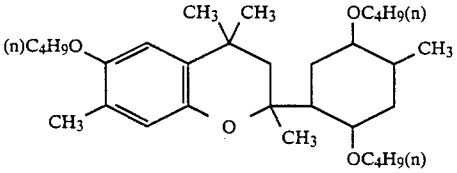
A-26
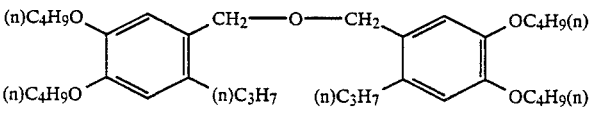
A-27
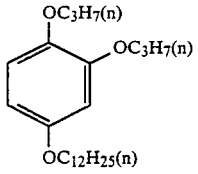
A-28
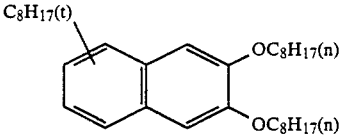

-continued
A-29
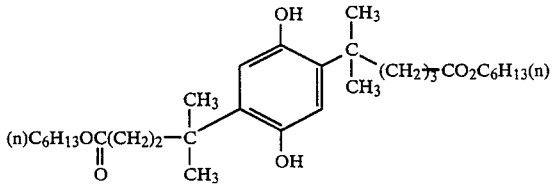
A-30
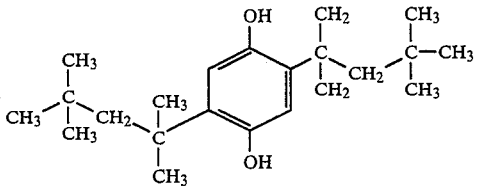
A-31
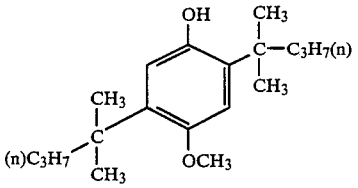
A-32
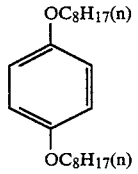
A-33
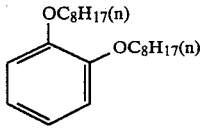
A-34
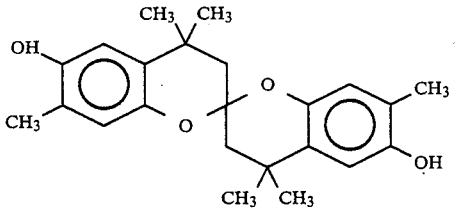
A-35
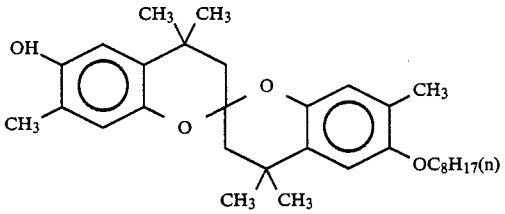
A-36
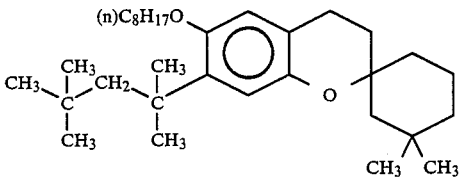

-continued
A-37
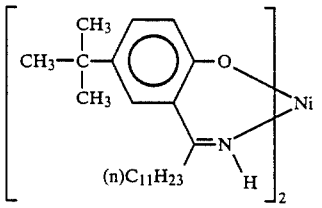
A-38
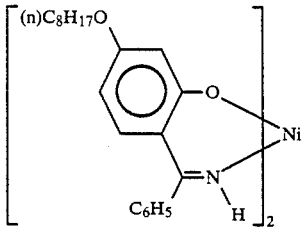
A-39
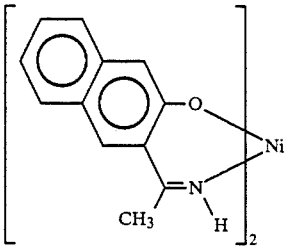
A-40
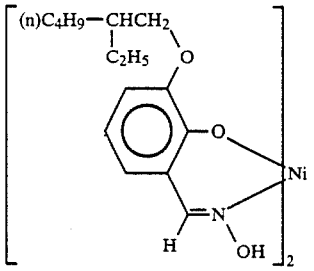
A-41
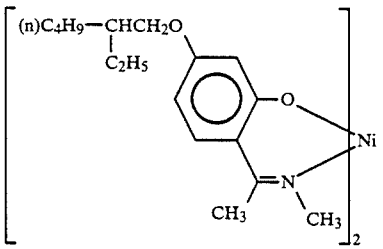
A-42
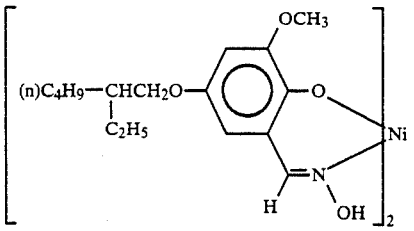

-continued
A-43
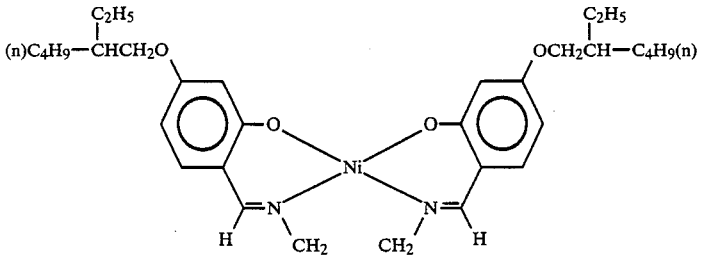
A-44
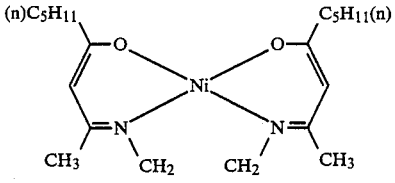
A-45
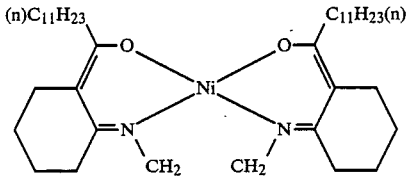
A-46
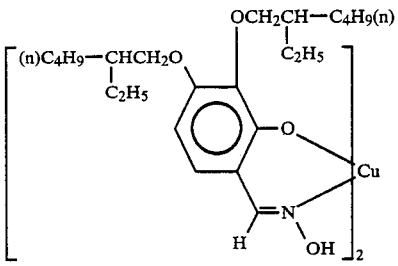
A-47
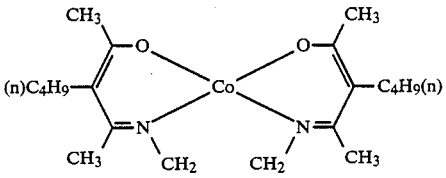
A-48
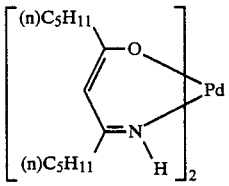
A-49
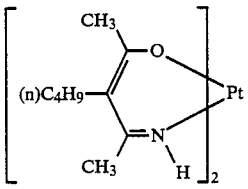

-continued

A-50

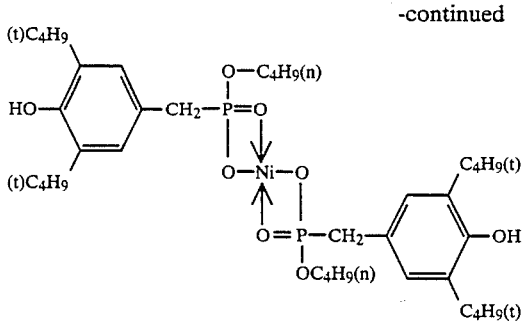

A-51

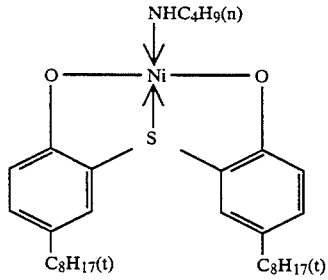

A-52

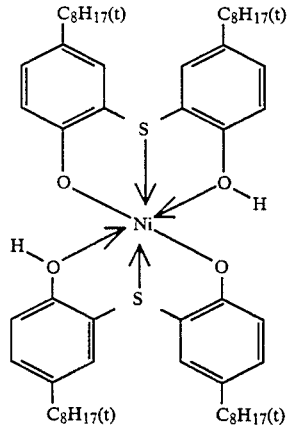

The compounds exemplified above can be prepared using or following the methods described in U.S. Pat. Nos. 3,336,135, 3,432,300, 3,573,050, 3,574,627, 3,700,455, 3,764,337, 3,935,016, 3,982,944, 4,254,216 and 4,279,990, British Patent Nos. 1,347,556, 2,062,888, 2,066,975 and 2,077,455, JP-A-No. 58-205378, JP-A-No. 52-152225, JP-A-No. 53-17729, JP-A-No. 53-20327, JP-A-No. 54-145530, JP-A-No. 55-6321, JP-A-No. 55-21004, JP-A-No. 58-24141, JP-A-No. 59-10539, JP-B-No. 48-31625, and JP-B-No. 54-12337.

The compound represented by formulae (IV) is added in a proportion of from 10 to 400 mol %, preferably from 30 to 300 mol %, to the coupler represented by the general formula (I) or (II-A). The metal complex of formulae (V-1) to (V-4) is added in a proportion of from 1 to 100 mol %, preferably from 3 to 40 mol %, to the coupler represented by the general formula (I) or (II-A).

In incorporating the magenta coupler relating to the present invention and a discoloration inhibitor into a photographic light-sensitive layer, they are first dissolved in a high boiling organic solvent, and then dispersed into at least one hydrophilic organic colloid to constitute the photographic light-sensitive layer.

Introduction of couplers into silver halide emulsion layers is generally effected by using known methods as described, e.g., in U.S. Pat. No. 2,322,027.

It is preferred that the compound of the present invention is incorporated into a hydrophilic colloid contained in the sensitive material at the stage of the production of the sensitive material. In general, the incorporation is effected by dissolving the compound in a high boiling organic solvent with a boiling point of 170° C. or above under atmospheric pressure, or a mixed solvent composed of the foregoing oil and a low boiling solvent, and then emulsifying and dispersing the resulting solution in a water solution of a hydrophilic colloid such as gelatin.

Of the compounds of the present invention, those soluble in high boiling solvents (oil) are advantageous. This emulsified dispersion is not particularly restricted as to particle size of oil droplets containing the compounds of the present invention, but the particle size ranges preferably from 0.05 to 0.5 μm, more preferably from 0.1 to 0.3 μm.

Specific examples of the foregoing oils include phthalic acid alkyl esters (e.g., dibutyl phthalate, dioctyl phthalate, diisodecyl phthalate, dimethoxyethyl phthalate), phosphoric acid esters (e.g., diphenyl phosphate, triphenyl phosphate, tricresyl phosphate, dioctyl butyl phosphate, monophenyl-p-t-butylphenylphosphate), citric acid esters (e.g., tributyl acetylcitrate), benzoic acid esters (e.g., octyl benzoate), alkylamides (e.g., diethyllaurylamide, dibutyllaurylamide), fatty acid esters (e.g., dibutoxyethyl succinate, diethyl azelate), trimesic acid esters (e.g., tributyl trimesate), compounds containing an epoxy ring (e.g., compounds described in U.S. Pat. No. 4,540,657), phenols

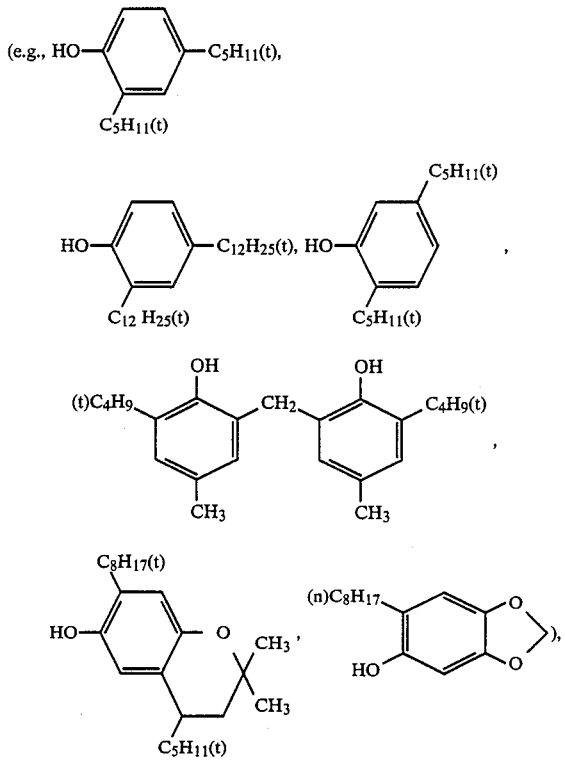

and ethers (e.g., phenoxyethanol, diethylene glycol monophenyl ether). Low boiling solvents used as auxiliary solvents are those having a boiling point ranging from about 30° C. to 150° C. under atmospheric pressure, with specific examples including lower alkyl acetates such as ethyl acetate, isopropyl acetate and butyl acetate, ethyl propionate, methanol, ethanol, secondary butyl alcohol, cyclohexanol, fluorinated alcohol, methyl isobutyl ketone, β-ethoxyethylacetate, methyl cellosolve acetate, acetone, methyl acetone, acetonitrile, dioxane, dimethylformamide, dimethyl sulfoxide, chloroform, and cyclohexane.

Instead of using high boiling organic solvents, not only oily solvents for additives such as couplers (including those which are solid at room temperature, such as waxes) but also latex polymers can be employed. In addition, the additives themselves, e.g., couplers, color stain inhibitors, ultraviolet absorbents and so on, may serve as oily solvents, too.

As for the latex polymers, those prepared using monomers, such as acrylic acids, methacrylic acids and their esters (e.g., methyl acrylate, ethyl acrylate, butyl methacrylate), acrylamide, t-butylacrylamide, methacrylamide, vinyl esters (e.g., vinyl acetate, vinyl propionate), acrylonitrile, styrene, divinylbenzene, vinyl alkyl ethers (e.g., vinyl ethyl ether), maleic acid esters (e.g., methyl maleate), N-vinyl-2-pyrrolidone, N-vinylpyridine, 1- and 4-vinylpyridines and so on, independently or in combination of two or more thereof can be employed.

Examples of a surface active agent used in dispersing an oily solution, in which the compound of the general formula (I), (II-A), (III) or (IV) is dissolved alone or together with a coupler, into an aqueous protective colloid solution in the present invention, include saponin, sodium alkylsulfosuccinates, and sodium alkylbenzenesulfonates.

Preferably anionic surface active agents having a sulfo group, e.g.,

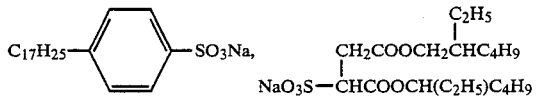

are used independently or in combination thereof.

The present invention is not particularly restricted as to other couplers to be used in the color photographic light-sensitive material, and the following couplers can be used.

(a) Yellow Coupler:

Couplers represented by formulae (Y-I) and (Y-II), respectively.

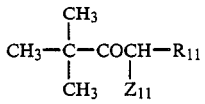

(Y-I)

wherein $R_{11}$ represents a substituted or unsubstituted N-phenylcarbamoyl group, and $Z_{11}$ represents a group capable of splitting off upon the reaction with the oxidation product of an aromatic primary amine developing agent:

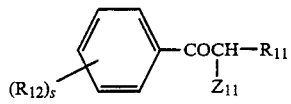

(Y-II)

wherein $R_{11}$ represents a substituted or unsubstituted N-phenylcarbamoyl group, $Z_{11}$ represents a group capable of splitting off in the reaction with the oxidation product of an aromatic primary amine developing agent, $R_{12}$ represents hydrogen or a substituent group, and s is an integer of 1 to 5.

Representative chemical structures of the yellow couplers represented by formulae (Y-I) and (Y-II) include those illustrated in the U.S. Pat. Nos. 3,894,875 (1-2), 3,408,194 (2-3), 4,404,274 (3-17), 4,022,620 (3-7), 4,057,432 (1-4) wherein the figures in the parentheses indicate the numbers of the columns wherein the foregoing chemical structures are described in detail.

(b) Cyan coupler:

Cyan couplers represented by formula (C-I):

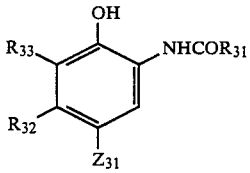

(C-I)

wherein $R_{31}$ represents an alkyl group, a cycloalkyl group, an aryl group, an amino group, or a heterocyclic group; $R_{32}$ represents an acylamino group, or an alkyl group; $R_{33}$ represents hydrogen, halogen, an alkyl group or an alkoxy group, or $R_{33}$ may be linked with $R_{32}$ to form a ring; and $Z_{31}$ represents hydrogen atom, halogen, or a group capable of splitting off in the reaction with the oxidation product of an aromatic primary amine developing agent.

Representative chemical structures of the cyan couples represented by the general formula (C-I) include those illustrated in U.S. Pat. Nos. 2,920,961 (1), 3,772,002 (1-3), 3,864,366 (2-6), 4,124,396 (2), 4,333,996 (2-8), 4,565,777 (3-5), 4,564,586 (2-4), wherein the figures in the parentheses indicate the numbers of the columns in which the foregoing chemical structures are described in detail.

Each of the foregoing couplers may assume the form of a polymer, including a dimer.

Specific examples of these couplers are illustrated below, but the present invention is not to be construed as being limited to the following examples.

(Y-1)

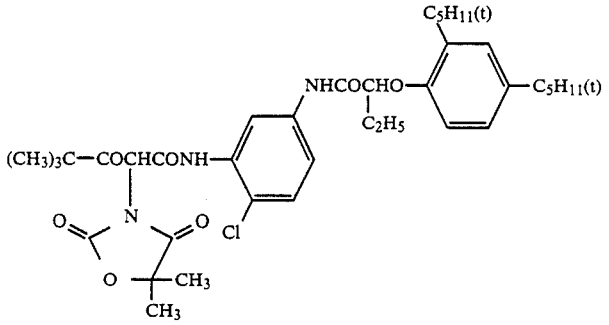

(Y-2)

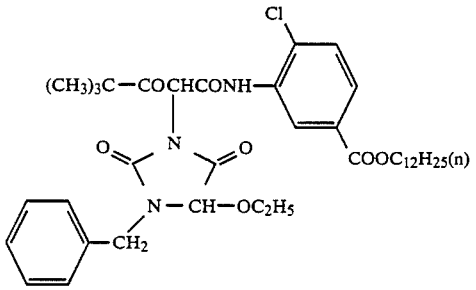

(Y-3)

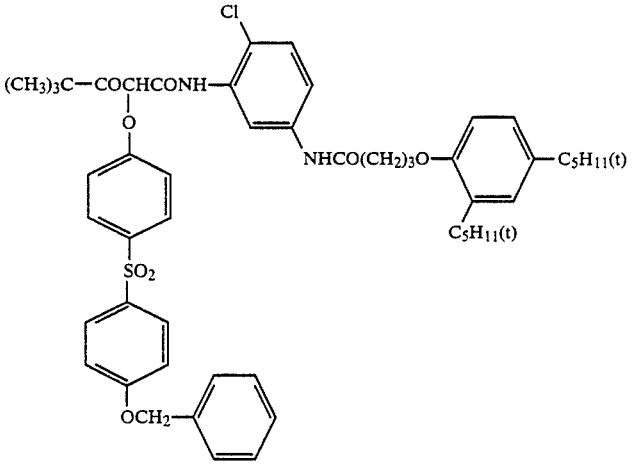

(Y-4)

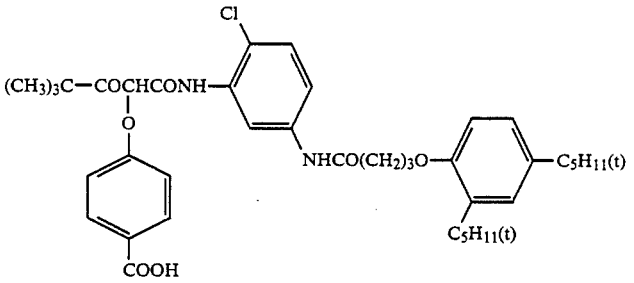

-continued
(Y-5)
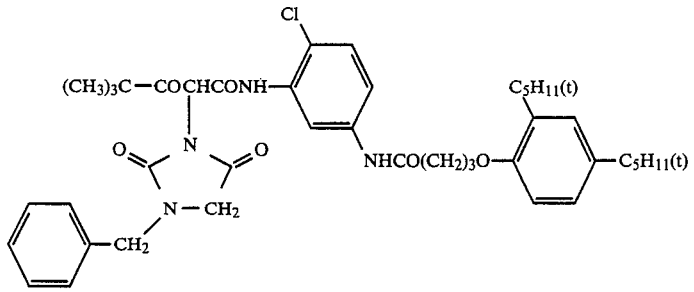
(Y-6)
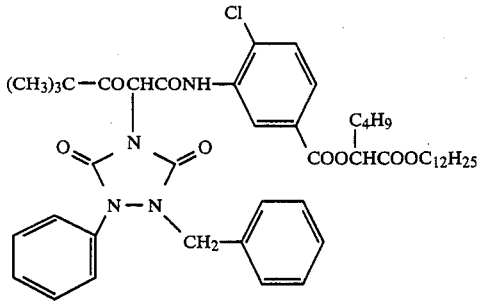
(Y-7)
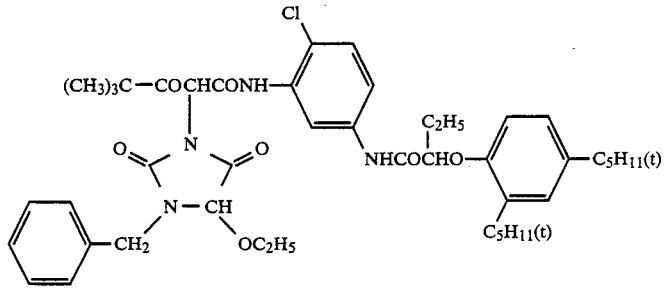
(Y-8)
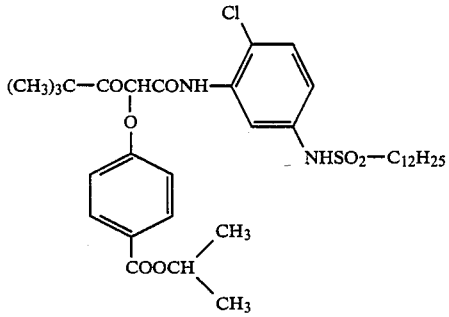
(Y-9)
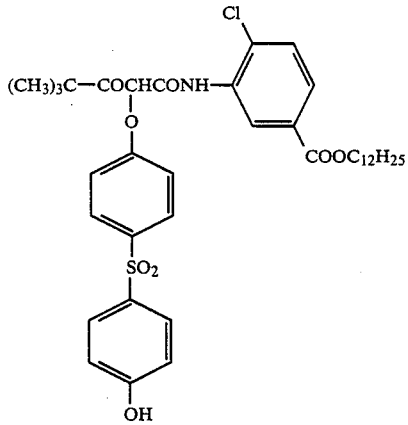

-continued
(Y-10)
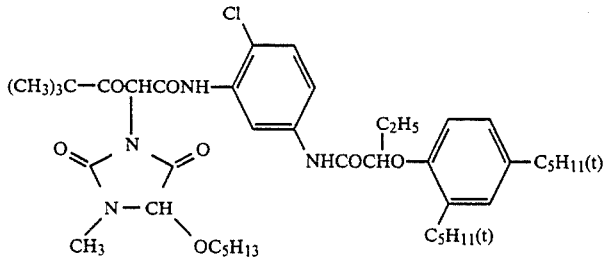
(Y-11)
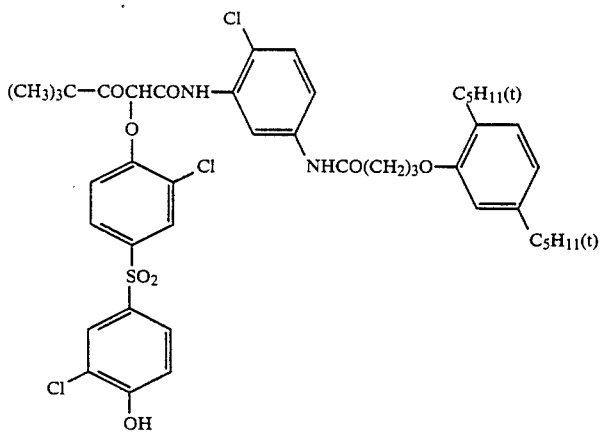
(Y-12)
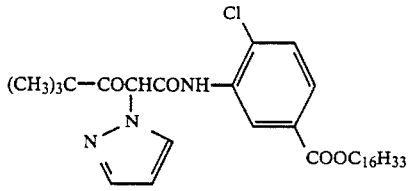
(Y-13)
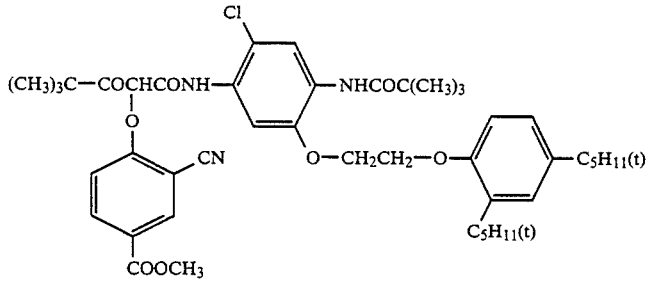
(Y-14)
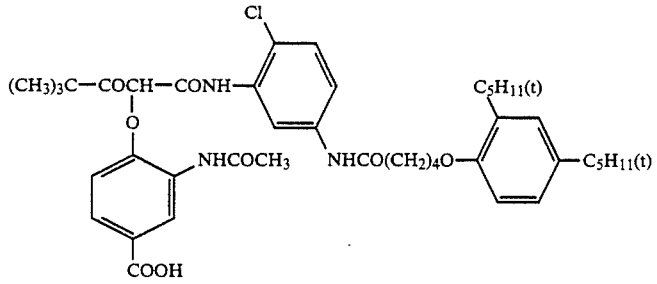

-continued
(Y-15)
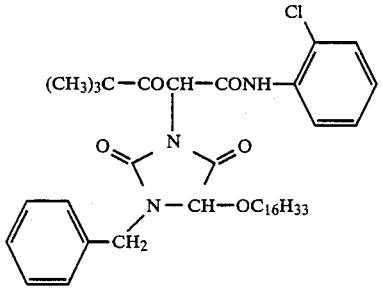
(Y-16)
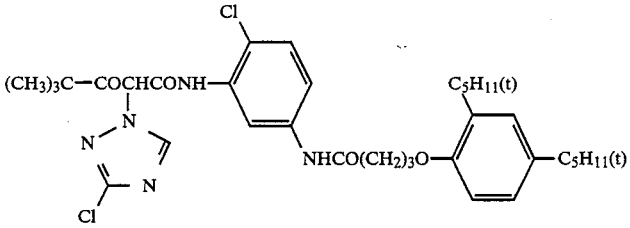
(Y-17)
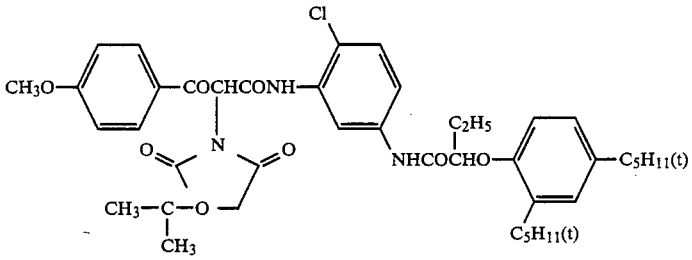
(Y-18)
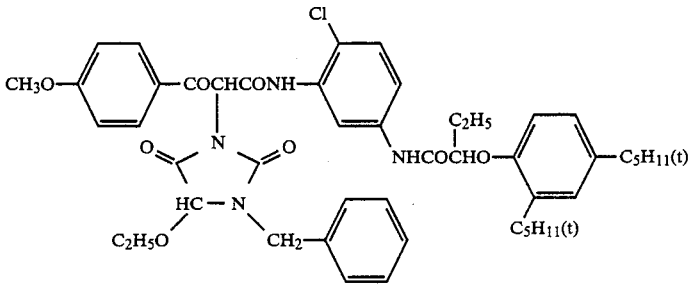
(Y-19)
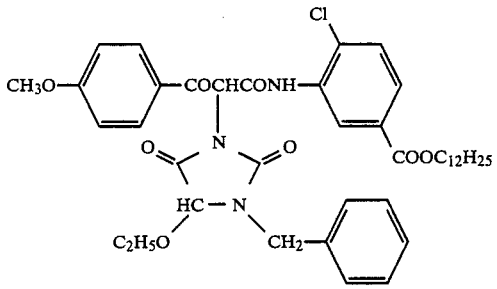
(Y-20)
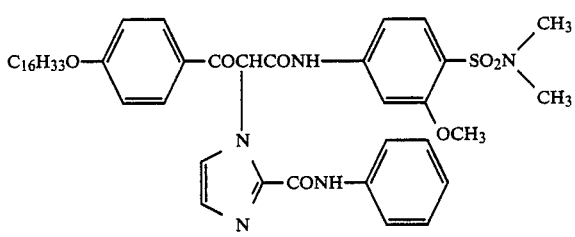

-continued
(Y-21)
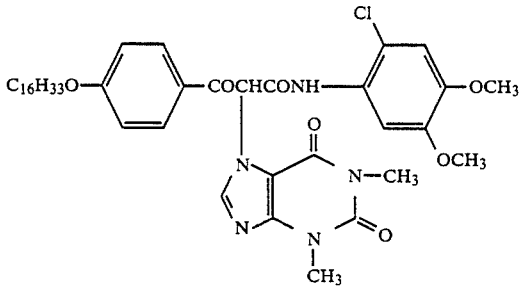
(Y-22)
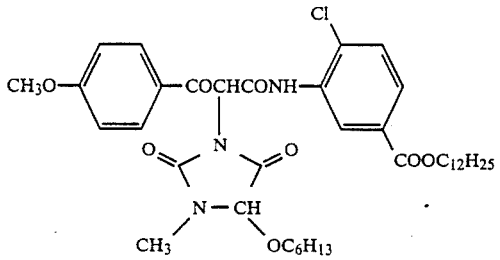
(Y-23)
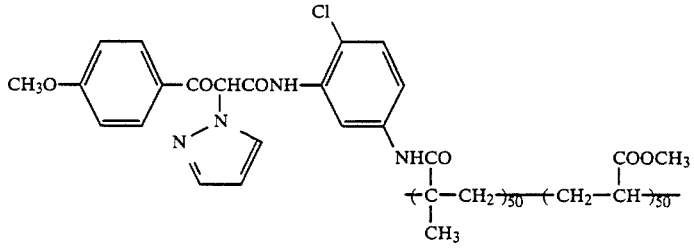
(Molecular Weight: 30,000)
(Y-24)
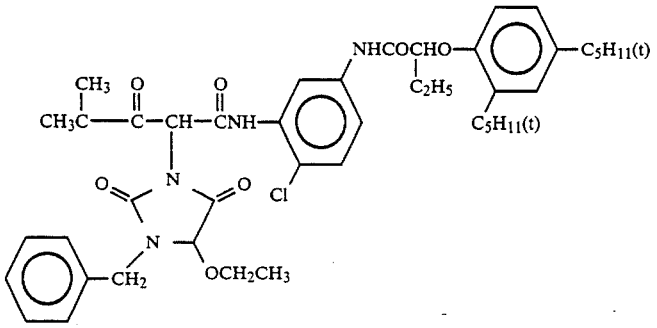
(C-1)
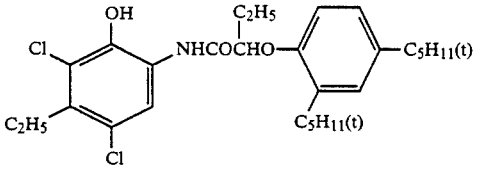
(C-2)
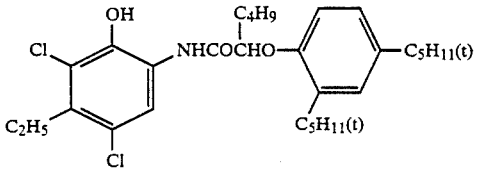

-continued
(C-3)
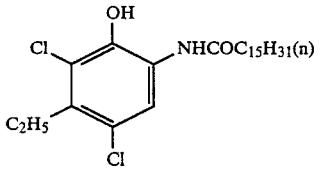
(C-4)
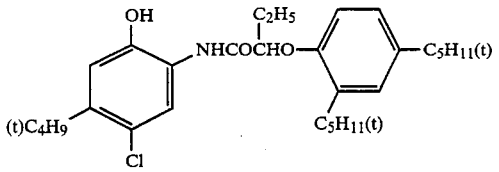
(C-5)
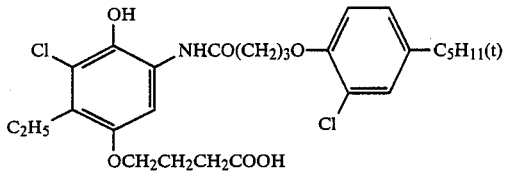
(C-6)
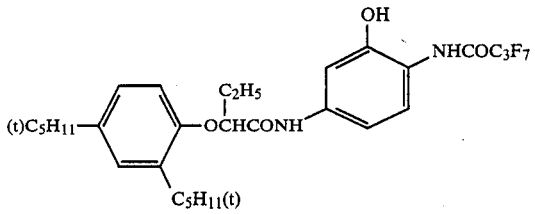
(C-7)
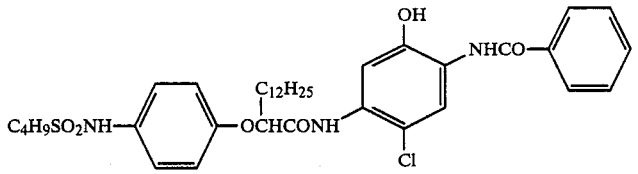
(C-8)
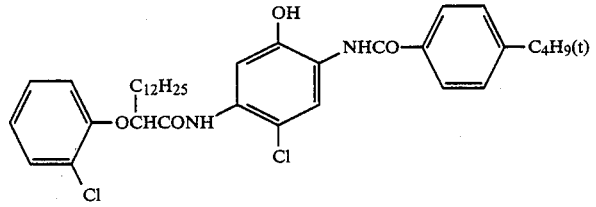
(C-9)
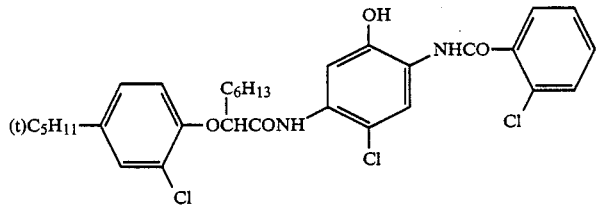
(C-10)
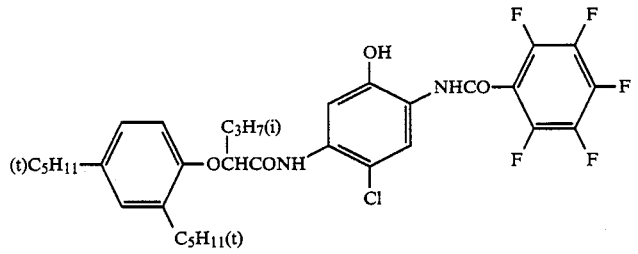

-continued
(C-11)
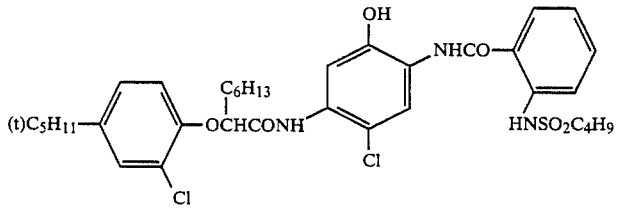
(C-12)
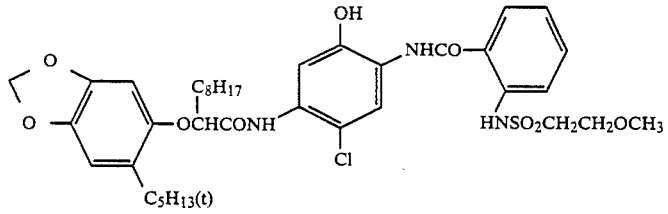
(C-13)
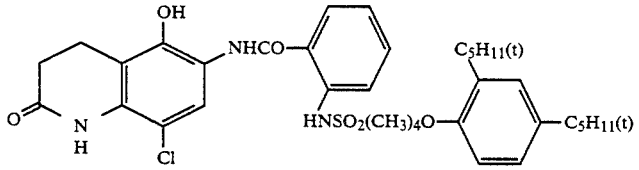
(C-14)
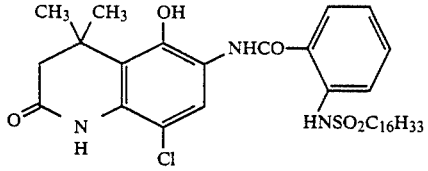
(C-15)
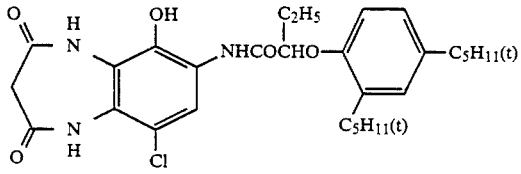
(C-16)
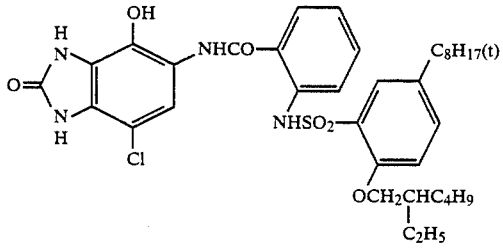
(C-17)
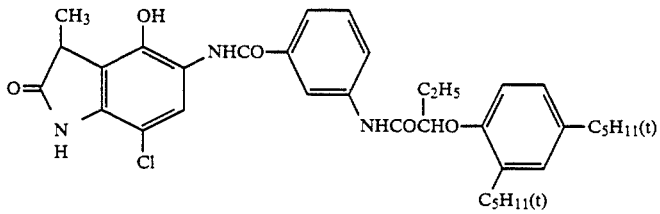

-continued
(C-18)
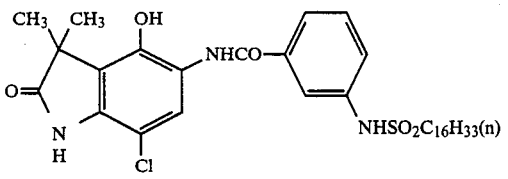
(C-19)
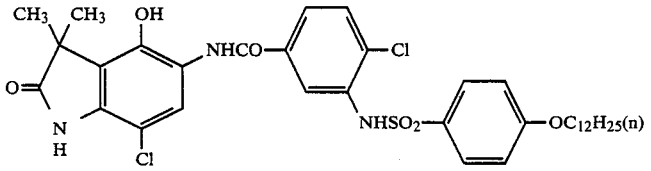
(C-20)
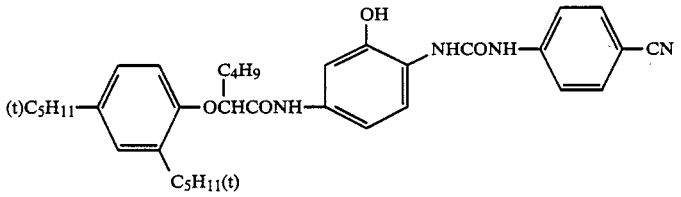
(C-21)
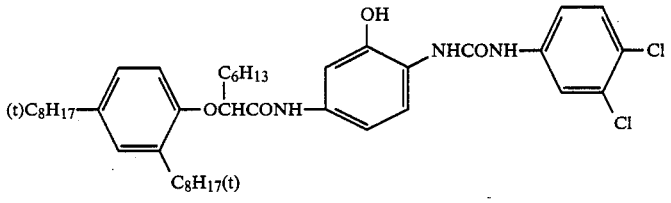
(C-22)
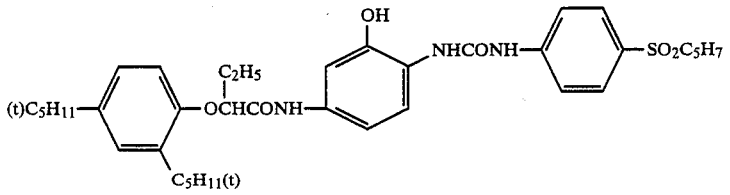
(C-23)
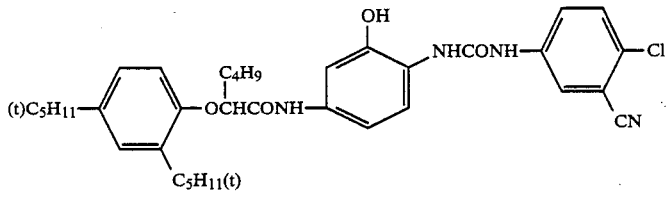
(C-24)
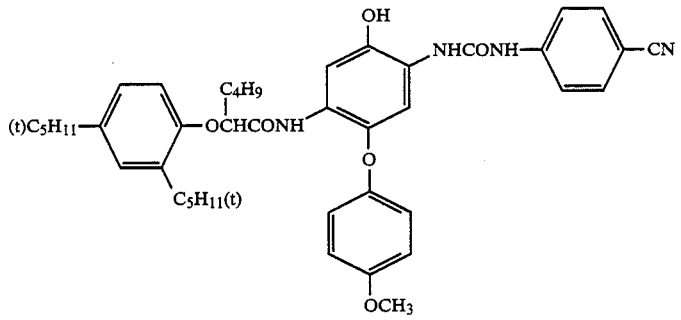

-continued (C-25)

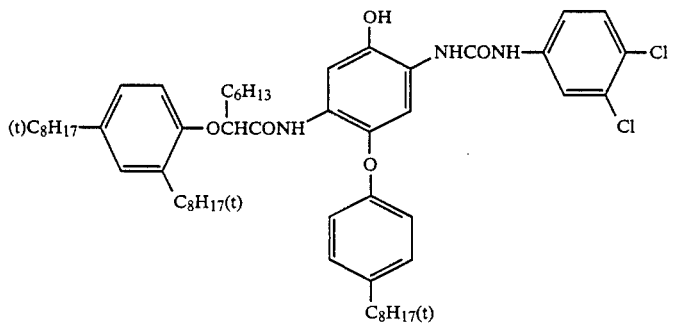

(C-26)

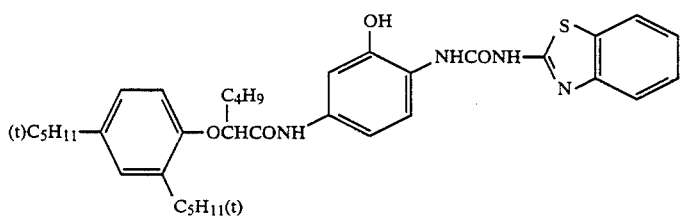

(C-27)

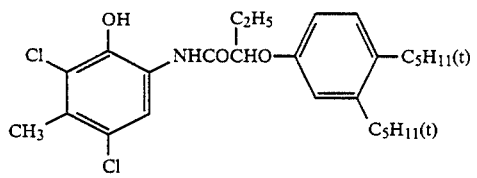

(C-28)

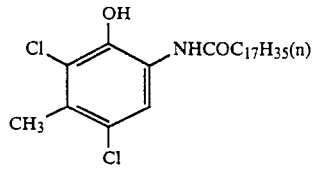

(C-29)

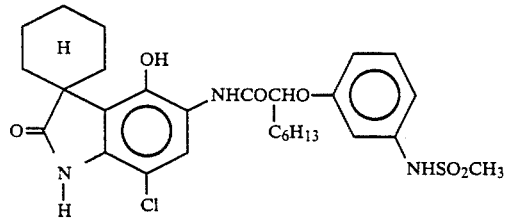

A color developer which can be used in the present invention is described below.

The color developer contains a known aromatic primary amine developing agent. Examples of developing agents which are preferably used are p-phenylenediamine derivatives. Representative examples of such p-phenylenediamine derivatives are cited below. However, the invention is not to be construed as being limited to these examples.

D-1: N,N-Diethyl-p-phenylenediamine

D-2: 2-Amino-5-diethylaminotoluene

D-3: 2-Amino-5-(N-ethyl-N-laurylamino)toluene

D-4: 4-[N-Ethyl-N-(β-hydroxyethyl)amino]aniline

D-5: 2-Methyl-4-[N-ethyl-N-(β-hydroxyethyl)amino]-aniline

D-6: 4-Amino-3-methyl-N-ethyl-N-[β-(methanesulfonamido)ethyl]aniline

D-7: N-(2-Amino-5-diethylaminophenylethyl)methanesulfonamido

D-8: N,N-Dimethyl-p-phenylenediamine

D-9: 4-Amino-3-methyl-N-ethyl-N-methoxyethylaniline

D-10: 4-Amino-3-methyl-N-ethyl-N-β-ethoxyethylaniline

D-11: 4-Amino-3-methyl-N-ethyl-N-β-butoxyethylaniline

Of the above p-phenylenediamine derivatives, 4-amino-3-methyl-N-ethyl-N-β-(methanesulfonamido)ethyl]-aniline (exemplified compound D-6) is particularly preferred.

These p-phenylenediamine derivatives may assume the form of a salt, such as sulfate, hydrochloride, sulfite, p-toluenesulfonate, or so on. A preferred amount of the aromatic primary amine developing agent added to 1 liter of a developer ranges from about 0.1 g to about 20 g, particularly from about 0.5 g to about 10 g.

To the color developer, a sulfite such as potassium sulfite, sodium hydrogen sulfite, potassium hydrogen sulfite, sodium metasulfite, potassium metasulfite, or a carbonyl/sulfinic acid adduct can be added, if needed.

In addition, various hydroxylamines, hydroxamic acids disclosed in JP-A-No. 63-43138, hydrazines and hydrizides disclosed in Japanese Patent Application No. 61-170756, phenols disclosed in JP-A-No. 63-44657 and JP-A-No. 63-58443, α-hydroxyketones and α-aminoketones disclosed in JP-A-No. 63-44656, and/or various sugars disclosed in JP-A-No. 63-36244 may be added for the purpose of directly preserving the above-described color developing agents. Moreover, the combined use of the above-described compounds with monoamines disclosed in JP-A-No. 63-4235, JP-A-No. 63-24254, JP-A-No. 63-21647, Japanese Patent Application No. 1164515/86, JP-A-No. 63-27841 and JP-A-No. 63-25654, diamines disclosed in JP-A-No. 63-30845, Japanese Patent Application No. 61-164515, and JP-A-No. 63-43139, polyamines disclosed in JP-A-No. 63-21647 and JP-A-No. 63-26655, polyamines disclosed in JP-A-No. 63-44655, nitroxy radicals disclosed in JP-A-No. 63-53551, alcohols disclosed in JP-A-No. 63-43140 and JP-A-No. 63-53549, oximes disclosed in JP-A-No. 63-56654, and/or tertiary amines disclosed in Japanese Patent Application No. 61-265149 is advantageous.

As other preservatives, the developer may contain various metals disclosed in JP-A-No. 57-44148 and JP-A-No. 57-53749, salicylic acids disclosed in JP-A-No. 59-180588, alkanolamines disclosed in JP-A-No. 54-3532, polyethyleneimines disclosed in JP-A-No. 56-94349, and aromatic polyhydroxy compounds disclosed in U.S. Pat. No. 3,746,544, if desired. In particular, the addition of the aromatic polyhydroxy compounds is preferred.

The color developer used in the present invention is adjusted to a pH of 9 to 12, preferably a pH of 9 to 11.0. In addition to the above-described ingredients, the color developer can contain other known compounds as developer components.

For the purpose of maintaining the foregoing pH, it is preferred that various buffering agents should be used. Specific examples of buffering agents include sodium carbonate, potassium carbonate, sodium hydrogen carbonate, potassium hydrogen carbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), and potassium 5-sulfo-2-hydroxybenzoate (potassium 5-sulfosalicylate). However, the invention is not to be construed as being limited to these compounds.

The amount of the buffering agents to be added to the color developer is preferably 0.1 mol/l or more, particularly from 0.1 to 0.4 mol/l.

In addition, various kinds of chelating agents may be contained in the color developer in order to prevent calcium and magnesium from precipitating, or in order to enhance the stability thereof.

Specific examples of chelating agents which can be used are cited below, but the invention is not to be construed as being limited to such examples.

Specifically, they include nitrilotriacetic acid, diethylenetriaminepentaacetic acid, ethylenediaminetetraacetic acid, N,N,N-trimethylenephosphonic acid, ethylenediamine-N,N,N',N'-tetramethylenephosphonic acid, transcyclohexanediaminetetraacetic acid, 1,2-diaminopropanetetraacetic acid, glycoletherdiaminetetraacetic acid, ethylenediamine-o-hydroxyphenylacetic acid, 2-phosphonobutane-1,2,4-tricarboxylic acid, 1-hydroxyethylidene-1,1-diphosphonic acid, and N,N'-bis(2-hydroxybenzyl)ethylenediamine-N,N'-diacetic acid.

These chelating agents may be used in a combination of two or more thereof, if needed.

These chelating agents can be added in any amount sufficient to mask metal ions in the color developer. For instance, they may be added in an amount of 0.1 to 10 g per liter of the color developer.

The color developer can contain any development accelerator, if needed.

Development accelerators can produce a particularly remarkable effect in the present invention when a color developer which is substantially free from benzyl alcohol is used.

Specifically, thioether compounds disclosed in JP-B-No. 37-16088, JP-B-No. 37-5987, JP-B-No. 38-7826, JP-B-No. 44-12380, JP-B-No. 45-9019 and U.S. Pat. No. 3,813,247; p-phenylenediamine compounds disclosed in JP-A-No. 52-49829 and JP-A-No. 50-15554; quaternary ammonium salts disclosed in JP-A-No. 50-137726, JP-B-No. 44-30074, JP-A-No. 56-156826 and JP-A-No. 52-43429; amine compounds disclosed in U.S. Pat. Nos. 2,494,903, 3,128,182, 4,230,796 and 3,253,919, JP-B-No. 41-11431, and U.S. Pat. Nos. 2,482,546 and 2,596,926; polyalkyleneoxides disclosed in JP-B-No. 37-16088, JP-B-No. 42-25201, U.S. Pat. No. 3,128,183, JP-B-No. 41-11431, JP-B-No. 42-23883 and U.S. Pat. No. 3,532,501; 1-phenyl-3-pyrazolidones, and imidazoles can be added as a development accelerator, if desired.

The color developer used in the present invention can contain any antifoggant, if desired. Suitable examples of antifoggants which can be used include alkali metal halides such as sodium chloride, potassium bromide and potassium iodide, and organic antifoggants. Typical examples of organic antifoggants include nitrogen-containing heterocyclic compounds such as benzotriazole, 6-nitrobenzimidazole, 5-nitroisoindazole, 5-methylbenzotriazole, 5-nitrobenzotriazole, 5-chloro-benzotriazole, 2-thiazolyl-benzimidazole, 2-thiazolylmethylbenzimidazole, indazole, hydroxyazaindolizine, and adenine.

Further, the color developer to be used in the present invention preferably contains a brightening agent. Suitable brightening agents are 4,4'-diamino-2,2'-disulfostilbene type compounds, and a preferred addition amount thereof ranges from 0 to 5 g/l, particularly from 0.1 to 4 g/l.

Furthermore, the color developer may contain various kinds of surface active agents such as alkylsulfonic acids, arylsulfonic acids, aliphatic carboxylic acids and aromatic carboxylic acids, if desired.

The processing using the color developer of the present invention is performed at a temperature ranging from 20° C. to 50° C., preferably from 30° C. to 40° C. The time of the processing ranges from 20 seconds to 5 minutes, preferably from 30 seconds to 2 minutes. It is preferred that a replenisher is added in a small amount, of from 20 to 600 ml, preferably from 50 to 300 ml, and more preferably from 100 ml to 200 ml, per square meter of the sensitive material processed.

A desilvering step performed in the present invention is described in detail below.

In the desilvering step of the present invention, a bleach-fix bath is used. The effect of the present invention becomes more remarkable the shorter a desilvering time is. More specifically, the desilvering time is 6 minutes or shorter, preferably between 30 seconds and 4 minutes, more preferably between 30 seconds and 60 seconds.

A bleach-fix bath which can be used in the present invention is described in detail below.

Examples of a bleaching agent which can be used in the bleach-fix bath of the present invention include organic complex salts of iron, cobalt, nickel, manganese and chromium. In particular, organic complex salts formed by Fe(III) and aminopolycarboxylic acids, such as ethylenediaminetetraacetic acid, and diethylenetriaminepentaacetic acid, aminopolyphosphonic acids, phosphonocarboxylic acids, organic phosphonic acids, citric acid, tartaric acid, and malic acid, are preferred.

Of these bleaching agents, aminopolycarboxylic acid complex salts of Fe(III) are particularly preferred for rapid processing and prevention of environmental pollution. Examples of useful aminopolycarboxylic acids for forming the organic complex salts include ethylenediaminetetraacetic acid, diethylenetriaminepentaacetic acid, 1,3-diaminopropanetetraacetic acid, propylenediaminetetraacetic acid, nitrilotriacetic acid, cyclohexanediaminetetraacetic acid, methyliminodiacetic acid, iminodiacetic acid, and glycoletherdiaminetetraacetic acid. These compounds may assume the form of a sodium, potassium, lithium or ammonium salt. Of these bleaching agents, (ethylenediaminetetraacetato)iron(III), (diethylenetriaminepentaacetato)iron(III), (cyclohexanediaminetetraacetato)iron(III), (1,3-diaminopropanetetraacetato)iron (III) and (methyliminodiacetato)iron(III) complexes are preferred for high bleaching power.

These ferric ion complexes may be used in the form of complex salts, or may be formed in the bath by adding thereto both ferric salts, such as ferric sulfates, ferric chloride, ammonium ferric sulfate, and ferric phosphate, and chelating agents of aminopolycarboxylic acid type. Moreover, these chelating agents may be used in excess of amounts required for forming the ferric ion complexes. A suitable amount of the foregoing bleaching agent added ranges from 0.01 to 1.0 mole, preferably from 0.05 to 0.50 mole, per liter of the bath.

The bleach-fix bath and/or the pre-bath thereof can contain various compounds as a bleach accelerator. Examples of bleach accelerators which are preferred for great accelerating effect include the compounds containing a mercapto group or a disulfide linkage, described in U.S. Pat. No. 3,893,858, German Patent No. 1,290,812, JP-A-No. 53-95630 and *Research Disclosure,* No. 17129 (July 1978), thiourea compounds disclosed in JP-B-No. 45-8506, JP-A-No. 52-20832, JP-A-No. 53-32735 and U.S. Pat. No. 3,706,561, and halogen ions such as iodide and bromide.

In addition, the bleach-fix bath used in the present invention can contain a rehalogenating agent such as bromides (e.g., potassium bromide, sodium bromide, ammonium bromide), chlorides (e.g., potassium chloride, sodium chloride, ammonium chloride), or iodides (e.g., ammonium iodide). Further, it can contain one or more of an inorganic or organic acid, an alkali metal or ammonium salt thereof, which has a pH buffering ability, such as boric acid, borax, sodium metaborate, acetic acid, sodium acetate, sodium carbonate, potassium carbonate, phosphorous acid, phosphonic acid, sodium phosphate, citric acid, sodium citrate, tartaric acid, and a corrosion inhibitor such as ammonium nitrate, or guanidine.

Fixers which can be preferably used in the bleach-fix bath include known thiosulfates such as sodium thiosulfate, and ammonium thiosulfate. Also, a special bleach-fix bath which contains, e.g., a combination of a fixer with a large amount of a halide such as potassium iodide described in JP-A-No. 55-155354 can be employed. The amount of the fixer added ranges from 0.3 to 2 moles, preferably from 0.5 to 1.0 mole, per liter of the bath.

The bleach-fix bath of the present invention is adjusted to a pH of 3.5 to 6.5, preferably 4 to 5.5. For the purpose of adjusting the pH to the foregoing range, various kinds of organic or inorganic acids, bases and buffering agents can be used. Specific examples of acids include hydrochloric acid, sulfuric acid, nitric acid, phosphoric acid, acetic acid, propionic acid, and citric acid, and alkalis include sodium hydroxide, potassium hydroxide, aqueous ammonia, and various amines. The invention is not to be construed as being limited to these examples.

When the pH of the bleach-fix bath is higher than the above-described range, the bath is inferior in desilvering power and provides images inferior in stability, whereas when the bath has a lower pH than the above-described range it suffers from deterioration of stability, and converts the cyan dyes produced to their corresponding leuco bodies to a considerable extent.

Also, the bleach-fix bath may contain various kinds of brightening agents, defoaming agents, surface active agents, polyvinyl pyrrolidone, and organic solvents such as methanol.

The bleach-fix bath and a fixing bath which can be used in the present invention can contain as a preservative a sulfinic acid ion-releasing compound, such as sulfites (e.g., sodium sulfite, potassium sulfite, ammonium sulfite), hydrogen sulfites (e.g., ammonium hydrogen sulfite, sodium hydrogen sulfite, potassium hydrogen sulfite), and metabisulfites (e.g., potassium metabisulfite, sodium metabisulfite, ammonium metabisulfite). Such a compound is preferably added in an amount of about 0.02 to 0.50 mol/l, particularly 0.04 to 0.40 mol/l, on a sulfinic acid ion basis.

Though sulfites are generally used as preservative, other preservatives such as ascorbic acid, adducts of carbonyl compounds and bisulfites, and carbonyl compounds may be added.

Further, buffering agents, brightening agents, chelating agents, defoaming agents, and antimolds may optionally be added.

After the desilvering step, such as the fixing or the combined bleaching and fixing step, the silver halide color photographic material of the present invention is, in general, subjected to a washing step and/or a stabilizing step.

The volume of washing water required can be determined depending on the characteristics of photosensitive materials to be processed (e.g., the kind of couplers incorporated therein), end-use purposes of photosensitive materials to be processed, the temperature of washing water, the number of washing tanks (stage number), the method of replenishing washing water (e.g., whether a current of water flows in the countercurrent direction, or not), and other conditions. Of these conditions, the relation between the number of washing tanks and the volume of washing water in the multistage countercurrent process can be determined according to the methods described in *Journal of the Society of Motion*

*Picture and Television Engineers,* volume 64, pages 248 to 253 (May 1955). A preferred step number in the multistage countercurrent process is generally from 2 to 6, particularly from 2 to 4.

According to the multistage countercurrent process, the volume of washing water can be sharply reduced. For instance, it becomes feasible to decrease it to 0.5 to 1 liter per square meter of the sensitive material processed. However, the process has disadvantages, e.g., in that bacteria propagate in the tanks because of the increase in staying time of water in the tanks, and suspended matter produced from the bacteria sticks to photosensitive materials processed therein. In the processing of the color photosensitive material of the present invention, the method of reducing the contents of calcium and magnesium, which is disclosed in JP-A-No. 62-288838, can be employed to great advantage for solving the above-described problem. Further, bactericides such as isothiazolone compounds and thiabendazoles disclosed in JP-A-No. 57-8542, chlorine-containing germicides such as a sodium salt of chlorinated isocyanuric acid, benzotriazoles disclosed in JP-A-No. 61-267761, copper ion, and other germicides described in Hiroshi Horiguchi, *Bohkin Bohbai Zai no Kagaku* (which means "Chemistry of Antibacteria and Antimolds"), *Biseibutsu no Mekkin Sakkin Bohbai Gijutsu* (which means "Arts of Sterilizing and Pasteurizing Microbe and Proofing Against Mold"), compiled by Eisei Gijutsu Kai, and *Bohkin-and Bohbai-zai Jiten* (which means "Thesaurus of Antibacteria and Antimolds"), compiled by Nippon Bohkin Bohbai Gakkai.

In addition, the washing water can contain a surface active agent as a draining agent, and a chelating agent represented by EDTA as a water softener.

Washing water to be used in the processing of the photosensitive material of the present invention is adjusted to pH 4 to 9, preferably to pH 5 to 8. The washing temperature and a washing time, though can be chosen varied depending on the characteristics and the intended use of the photosensitive material to be washed, and are generally in a range of 20 sec. to 10 min. at 15° C. to 45° C., preferably 30 sec. to 5 min. at 25° C. to 40° C.

After the above-described washing step, or without any washing step, the photosensitive material of the present invention is processed with a stabilizing bath. To the stabilizing bath are added compounds having an image-stabilizing function, such as aldehyde compounds represented by formaldehyde, buffering compounds for adjusting the film pH to a value suitable for stabilization of the produced dyes, and ammonium compounds. In addition, the stabilizing bath can contain the above-described various bactericides and antimolds for the purposes of prevention of propagation of bacteria in the bath, and imparting an antimolding ability to the sensitive materials processed thereby.

Further, surface active agents, brightening agents and hardeners may be added to the stabilizing bath.

When the sensitive material of the present invention is directly subjected to the stabilization step without experiencing any washing step, any known methods described in JP-A-No. 57-8543, JP-A-No. 58-14834, JP-A-No. 59-184343, JP-A-No. 60-220345, JP-A-No. 60-238832, JP-A-No. 60-239784, JP-A-No. 60-239749, JP-A-No. 61-4054 and JP-A-No. 61-118749, can be applied to the stabilization step of the present invention.

Also, it is preferred to additionally add chelating agents such as 1-hydroxyethylene-1,1-diphosphonic acid, ethylenediaminetetramethylenephosphonic acid, magnesium compounds and bismuth compounds.

Solutions used in the washing and/or the stabilization step can be further used in the pre-step. For instance, washing water overflowing the washing bath, which has been reduced in volume by using a multistage countercurrent process, is conducted into the prebath, that is, the bleach-fix bath, and the bleach-fix bath is replenished with a concentrated solution to achieve the reduction of waste solutions.

The silver halide color photographic material of the present invention can be applied to color paper, color reversal paper, direct-positive color photographic materials, color positive films, color negative films, color reversal films, and so on. In particular, when applied to color paper and color reversal paper, the present invention can produce desirable effects.

In the silver halide emulsions of the sensitive material of the present invention, any silver halide, including silver iodobromide, silver bromide, silver chlorobromide, and silver chloride can be used. More specifically, a silver chlorobromide emulsion having a chloride content of 60 mol % or more, especially 80 mol % or more, and a silver chloride emulsion are preferred in the case of, e.g., color paper, wherein a rapid processing or a low replenishment processing is carried out. On the other hand, a silver chlorobromide emulsion having a bromide content of 50 mol % or more, especially 70 mol % or more, and a silver bromide emulsion (which each may have an iodide content of 3 mol % or less) are preferred when high sensitivity is needed, and it is necessary to suppress the generation of fog at the time of producing, preserving and/or processing the sensitive material. In the case of color photographic materials for photograph-taking use, silver iodobromide emulsions and silver chloroiodobromide emulsions, each having an iodide content of 3 to 15 mol %, are preferably used.

The silver halide grains, may have a multi-phase structure, such that the interior and the surface of the grains may differ or the grains may have a junction structure, or the silver halide grains may be uniform throughout. In particular, a double layer structure is preferred. Also, various structures may be present together.

The size distribution of the silver halide grains to be used in the present invention, may be narrow or broad, and is preferably of "monodisperse". The term "monodisperse" system as used herein refers to a dispersion system in which the value obtained by dividing the standard deviation (from the size distribution curve of the silver halide emulsion grains) by the average grain size (variation coefficient) is below 20%, preferably below 15%. In order to satisfy the desired gradation, two or more monodisperse silver halide emulsions (preferably having their respective variation coefficient in the above-described range), which have substantially the same color sensitivity, but different grain size, or plural kinds of grains having the same size but different sensitivities can be coated as a mixture in the same layer, or separately in superposed layers. In addition, a combination of two or more of polydisperse silver halide emulsions, or a combination of monodisperse and polydisperse emulsions can be used as a mixture, or coated separately in superposed layers.

The silver halide grains to be used in the present invention may have a regular crystal form, such as a cube, an octahedron, a rhombic dodecahedron, or a tetradecahedron. Grains having different regular crystal forms may be present as a mixture. They also may have an irregular crystal form, such as a sphere. Also, the grains may have a composite form of the above-described forms.

Of these crystal forms, a cubic form and a tetradecahedral form are particularly preferred in the present invention.

Moreover, the silver halide emulsion grains may assume a tabular form, particularly having a length/thickness ratio of from 5 to 8. In addition, emulsion wherein 50% or more (on a projection area basis) of the grains assume a tabular form having a length/thickness ratio of 8 or more may be used. Also, a mixture of emulsion grains having these various crystal forms may be used.

These various emulsions may form a latent image predominantly at the surface of the grains, or may mainly form a latent image inside the grains.

The photographic emulsions used in the present invention can be prepared using the methods described in *Research Disclosure,* vol. 176, Item No. 17643 (I, II, III) (Dec. 1978).

The emulsions used in the present invention are generally ripened physically and chemically, and further sensitized spectrally. Additives used in these steps are described in *Research Disclosure,* Vol. 176, No. 17643 (Dec. 1978) and Vol. 187 No. 18716 (Nov. 1979) as set forth in the following table.

Photographic additives which can be used in the present invention are also described in these two publications, as summarized in the following table.

| Additives | RD 17643 | RD 18716 |
|---|---|---|
| 1. Chemical sensitizers | p.23 | p.648, right column |
| 2. Sensitivity-increasing agents | | " |
| 3. Spectral sensitizers | p.23–24 | p.648, right column |
| 4. Supersensitizers | | p.649, right column |
| 5. Brightening agents | p.24 | |
| 6. Antifoggant and Stabilizers | p.24–25 | p.649, right column |
| 7. Couplers | p.25 | |
| 8. Organic solvents | p.25 | |
| 9. Light absorbers, Filter dyes, and UV-ray absorbers | p.25–26 | p.649, right column to p.650, left column |
| 10. Stain inhibitor | p.25, right column | p.650, left column to right column |
| 11. Dye image-stabilizing agents | p.25 | |
| 13. Hardeners | p.26 | p.651, left column |
| 14. Binders | p.26 | " |
| 15. Plasticizers and Lubricants | p.27 | p.650, right column |
| 16. Coating aids and Surface active agents | p.26–27 | " |
| 17. Antistatic agents | p.27 | " |

EXAMPLE 1

On a paper support laminated with a polyethylene film on both sides thereof, were coated the layers described below in this order to prepare a multilayer silver halide light-sensitive material. Coating compositions were prepared in the following manner.

Preparation of Coating Composition for First Layer

To a mixture of 10.2 g of a yellow coupler (ExY-1), 9.1 g of a yellow coupler (ExY-2) and 4.4 g of a color image stabilizer (Cpd-1), were added 27.2 ml of ethyl acetate and 7.7 ml (8.0 g) of a high boiling solvent (Solv-1) to make a solution. The solution was emulsified and dispersed in 185 ml of a 10% aqueous gelatin solution containing 8 ml of a 10% sodium dodecylbenzenesulfonate solution. The resulting emulsified dispersion was mixed homogeneously with the emulsions EM1 and EM2, and further the gelatin concentration therein was adjusted so that the resulting emulsion had the composition described below. Thus, the coating composition for the first layer was prepared.

Coating compositions for the second to the seventh layers were prepared in the same manner as that for the first layer. In each layer, sodium salt of 1-hydroxy-3,5-dichloro-s-triazine was contained as gelatin hardener. In addition, Cpd-2 was used as viscosity increasing agent.

Constituent Layers

The ingredients used and their coverages expressed in terms of g/m$^2$ are described below, with the coverage of silver halide expressed on a silver basis.

| | |
|---|---|
| Support | |
| Polyethylene-laminated paper (containing a white pigment ($TiO_2$) and a bluish dye on the first layer side). | |
| First Layer (Blue-sensitive layer) | |
| Monodisperse silver chlorobromide emulsion (EM1) sensitized spectrally with a blue sensitizing dye (ExS-1) | 0.13 |
| Monodisperse silver chlorobromide emulsion (EM2) sensitized spectrally with a blue sensitizing dye (ExS-1) | 0.13 |
| Gelatin | 1.86 |
| Yellow coupler (ExY-1) | 0.44 |
| Yellow coupler (ExY-2) | 0.39 |
| Color image stabilizer (Cpd-1) | 0.19 |
| Solvent (Solv-1) | 0.35 |
| Second Layer (Color stain inhibiting layer) | |
| Gelatin | 0.99 |
| Color stain inhibitor (Cpd-3) | 0.08 |
| Third Layer (Green-sensitive layer) | |
| Monodisperse silver chlorobromide emulsion (EM3) sensitized spectrally with green sensitizing dyes (ExS-2, ExS-3) | 0.05 |
| Monodisperse silver chlorobromide emulsion (EM4) sensitized spectrally with green sensitizing dyes (ExS-2, ExS-3) | 0.11 |
| Gelatin | 1.80 |
| Magenta coupler (ExM-1) | 0.39 |
| Color image stabilizer (Cpd-5) | 0.01 |
| Color image stabilizer (Cpd-6) | 0.04 |
| Solvent (Solv-2) | 0.12 |
| Solvent (Solv-3) | 0.25 |
| Fourth Layer (Ultraviolet absorbing layer) | |
| Gelatin | 1.60 |
| Ultraviolet absorber (Cpd-7/Cpd-8/Cpd-9 = 3/2/6 by weight) | 0.70 |
| Color mixing inhibitor (Cpd-10) | 0.05 |
| Solvent (Solv-4) | 0.27 |
| Fifth Layer (Red-sensitive layer) | |
| Monodisperse silver chlorobromide emulsion (EM5) sensitized spectrally with red sensitizing dyes (ExS-4, ExS-5) | 0.07 |
| Monodisperse silver chlorobromide emulsion (EM6) sensitized spectrally with red sensitizing dyes (ExS-4, ExS-5) | 0.16 |
| Gelatin | 0.92 |
| Cyan coupler (ExC-1) | 0.32 |
| Color image stabilizer (Cpd-8/Cpd-9/Cpd-12 = 3/4/2 by weight) | 0.17 |
| Polymeric dispersion medium (Cpd-11) | 0.28 |
| Solvent (Solv-2) | 0.20 |
| Sixth Layer (Ultraviolet absorbing layer) | |

-continued

| | |
|---|---|
| Gelatin | 0.54 |
| Ultraviolet absorber (Cpd-7/Cpd-9/Cpd-12 = 1/5/3 by weight) | 0.21 |
| Solvent (Solv-2) | 0.08 |
| Seventh Layer (Protective layer) | |
| Gelatin | 1.33 |
| Acryl-modified copolymer of polyvinyl alcohol (modification degree: 17%) | 0.17 |
| Liquid paraffin | 0.03 |

Therein, Cpd-13 and Cpd-14 were additionally used as irradiation inhibiting dyes. In each layer, Alkanol XC (produced by du Pont), sodium alkylbenzenesulfonate, a succinic acid ester and Megafac F-120 (produced by Dai-Nippon Ink & Chemicals, Inc.) were further added as coating aids for emulsified dispersions. Furthermore, Cpd-15 and Cpd-16 were used as silver halide stabilizing agent.

Details of the emulsions used are illustrated below.

| Emulsion Name | Crystal Form | Grain Size (μm) | Br Content (mol %) | Variation Coefficient |
|---|---|---|---|---|
| EM1 | Cube | 1.0 | 80 | 0.08 |
| EM2 | Cube | 0.75 | 80 | 0.07 |
| EM3 | Cube | 0.5 | 83 | 0.09 |
| EM4 | Cube | 0.4 | 83 | 0.10 |
| EM5 | Cube | 0.5 | 73 | 0.09 |
| EM6 | Cube | 0.4 | 73 | 0.10 |

Then, another light-sensitive material was produced in the same manner as described above, except that the compound represented by formula (III) of the present invention was added to the coating composition for the third layer in a proportion of 30 mol % to the magenta coupler.

The structural formulae of the compounds employed are illustrated below.

ExY-1

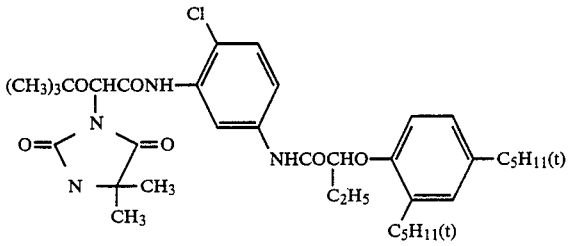

ExY-2

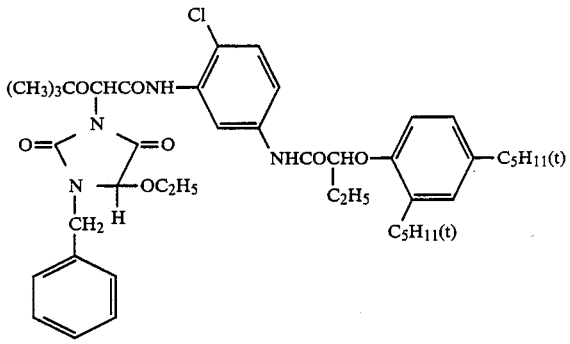

ExM-1

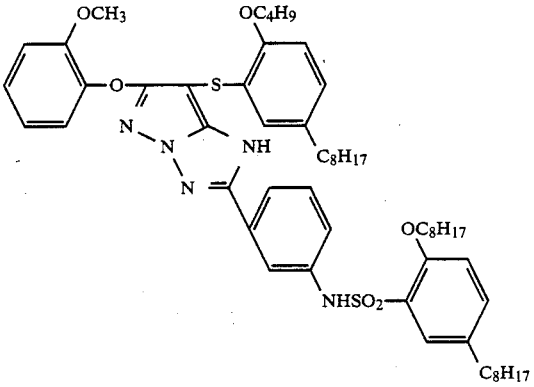

ExC-1

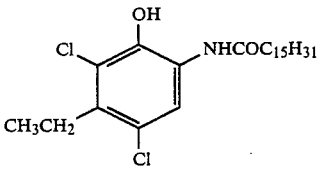

-continued
ExS-1
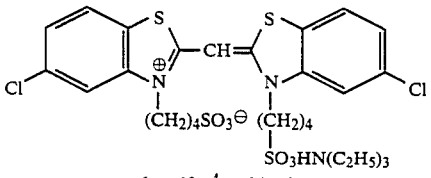
$6 \times 10^{-4}$ mol/mol Ag
ExS-2
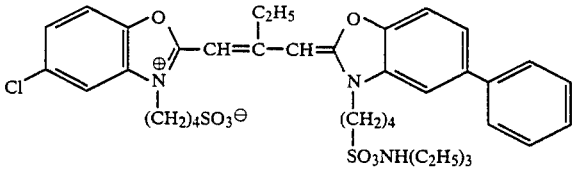
$4 \times 10^{-4}$ mol/mol Ag
ExS-3
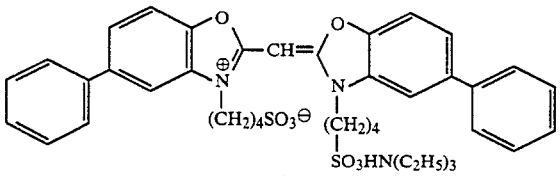
$8 \times 10^{-4}$ mol/mol Ag
ExS-4
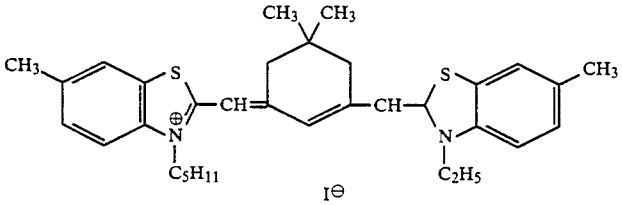
$1.8 \times 10^{-4}$ mol/mol Ag
ExS-5
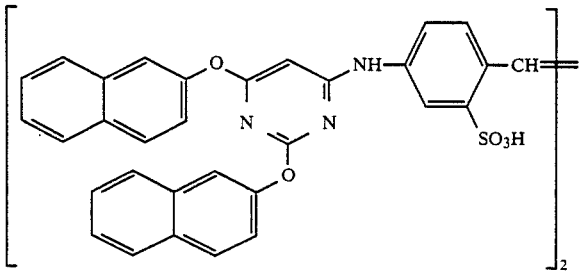
Cpd-1
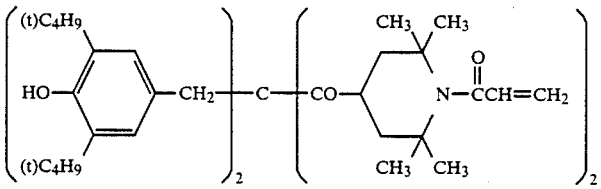
Cpd-2
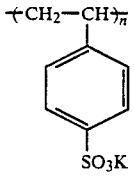
(Molecular Weight: 500,000–2,000,000)

-continued
Cpd-3
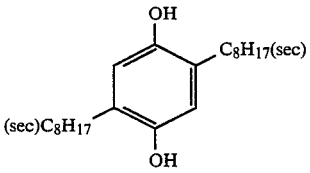
Cpd-5
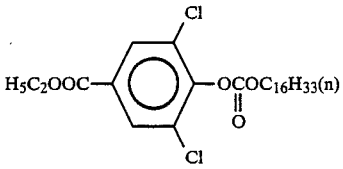
Cpd-6
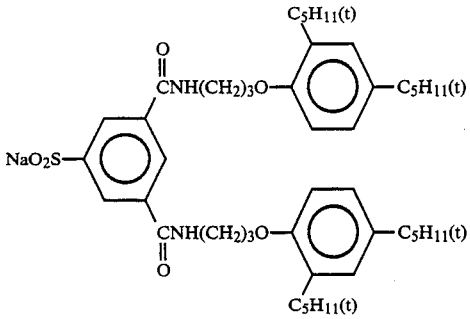
Cpd-7
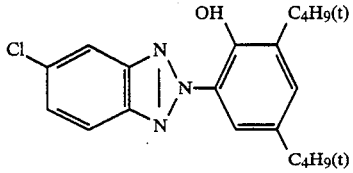
Cpd-8
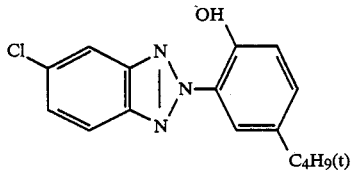
Cpd-9
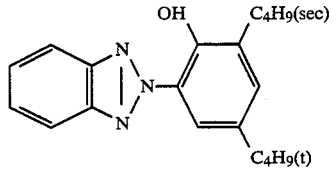
Cpd-10
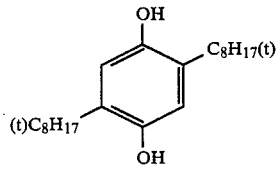
Cpd-11
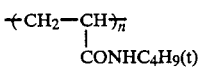
(n = 100~1000)
Cpd-12
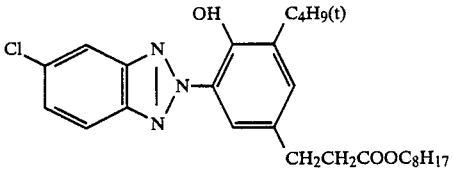

-continued

| | |
|---|---|
| Dibutyl phthalate | Solv-1 |
| Tricresyl phosphate | Solv-2 |
| Trioctyl phosphate | Solv-3 |
| Trinonyl phosphate | Solv-4 |

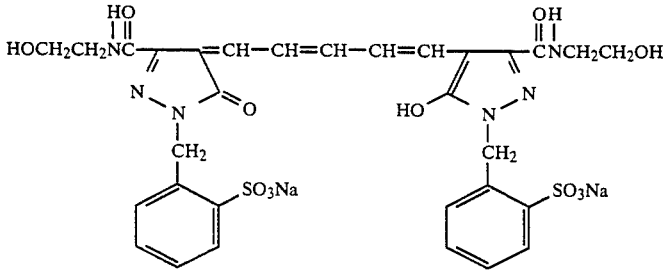

Cpd-13

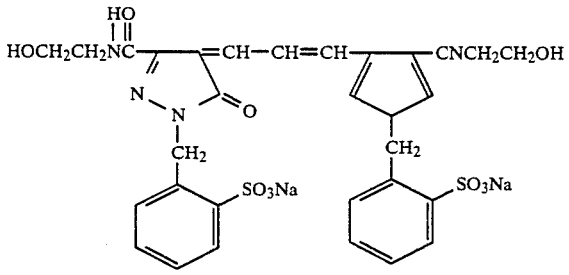

Cpd-14

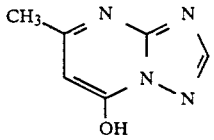

Cpd-15

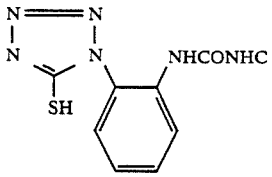

Cpd-16

The above-described light-sensitive materials each was exposed to light through an optical wedge, and subjected to photographic processing including the following steps.

| Processing Step | Temperature | Time |
|---|---|---|
| Color Development | 38° C. | 1 min. 40 sec. |
| Bleach-Fix | 30 to 34° C. | 1 min. 00 sec. |
| Rinsing (1) | 30 to 34° C. | 20 sec. |
| Rinsing (2) | 30 to 34° C. | 20 sec. |
| Rinsing (3) | 30 to 34° C. | 20 sec. |
| Drying | 70 to 80° C. | 50 sec. |

The rinsing steps were performed in accordance with a countercurrent replenishing process, in which the rinsing bath (3) was replenished with a rinsing solution, and the solution overflowing the rinsing bath (3) was introduced into the rinsing bath (2), and the solution overflowing the rinsing bath (2) was introduced into the rinsing bath (1).

The compositions of the processing solutions used were as follows.

Color Developer

-continued

| | |
|---|---|
| Water | 800 ml |
| Diethylenetriaminepentaacetic acid | 1.0 g |
| 1-Hydroxyethylidene-1,1-diphosphonic acid (60%) | 2.0 g |
| Nitrilotriacetic acid | 2.0 g |
| Benzyl alcohol | 16 ml |
| Diethylene glycol | 10 ml |
| Sodium sulfite | 2.0 g |
| Potassium bromide | 0.5 g |
| Potassium carbonate | 30 g |
| N-Ethyl-N-(β-methanesulfonamidoethyl)-3-methyl-4-aminoaniline sulfate | 5.5 g |
| Hydroxylamine sulfate | 3.0 g |
| Brightening agent (WHITEX 4B, produced by Sumitomo Chemical Co., Ltd.) | 1.5 g |
| Water to make | 1,000 ml |
| pH (at 25° C.) | 10.25 |
| Bleach-fix Bath | |
| Water | 400 ml |
| Ammonium thiosulfate (70%) | 200 ml |
| Sodium sulfite | 20 g |
| Ammonium ethylenediaminetetra-acetatoferrate(III) | 60 g |
| Disodium ethylenediaminetetra-acetate | 10 g |
| Water to make | 1,000 ml |
| pH (at 25° C.) | 7.00 |
| Rinsing Solution | |
| Ion exchange water (calcium and magnesium ion | |

-continued concentrations were each below 3 ppm).

Photographic characteristics of these light-sensitive materials were evaluated through measurements of the gradation, the maximum density ($D_{max}$) and the minimum density ($D_{min}$). The gradation was expressed in terms of the difference between the density corresponding to the sensitivity point and the density corresponding to the point greater than the sensitivity point by 0.5 in a logarithmic exposure scale. Simultaneously with these measurements, yellow reflection densities in the unexposed areas were measured. Thereafter, the sensitive materials were allowed to stand for 90 days under conditions of 60° C. and 15% RH. Then yellow reflection densities in the unexposed areas were measured again, and thereby the sensitive materials were examined for increments of stains with time after the photographic processing.

The results obtained are shown in Table 1.

TABLE 1

| Sensitive Material | Compound | Image Stabilizing Agent | Sulfurous Acid Ion Concentration 0.2 (g/l) $D_{min}$ | $D_{max}$ | Gamma | 1.7 (g/l) $D_{min}$ | $D_{max}$ | Gamma | Increment of Stain | Note |
|---|---|---|---|---|---|---|---|---|---|---|
| A*1 | — | — | 0.16 | 2.71 | 3.00 | 0.14 | 2.50 | 2.32 | +0.13 | Comparison |
| B | — | A-18*2 | 0.16 | 2.73 | 3.02 | 0.14 | 2.69 | 2.90 | +0.21 | " |
| C | III-38 | — | 0.16 | 2.72 | 3.01 | 0.14 | 2.68 | 2.91 | +0.11 | Invention |
| D | III-38 | A-18*2 | 0.15 | 2.71 | 2.99 | 0.14 | 2.70 | 2.89 | +0.04 | " |
| E | III-35 | A-18*2 | 0.15 | 2.73 | 3.00 | 0.12 | 2.68 | 2.92 | +0.05 | " |
| G | III-43 | A-18*2 | 0.16 | 2.69 | 3.00 | 0.14 | 2.65 | 2.92 | +0.05 | " |
| H | III-7 | A-12*2 | 0.18 | 2.68 | 2.98 | 0.18 | 2.65 | 2.91 | +0.08 | " |
| I | III-23 | A-10*2 | 0.17 | 2.69 | 2.97 | 0.17 | 2.65 | 2.92 | +0.08 | " |
| J | III-39 | A-16*2 | 0.17 | 2.68 | 3.00 | 0.17 | 2.67 | 2.91 | +0.06 | " |
| K | III-40 | A-18*2 | 0.14 | 2.70 | 2.96 | 0.13 | 2.65 | 2.92 | +0.06 | " |
| L | III-39 | — | 0.16 | 2.71 | 2.98 | 0.13 | 2.66 | 2.96 | +0.13 | " |
| M | III-39 | A-40*3 | 0.15 | 2.71 | 2.99 | 0.12 | 2.67 | 2.93 | +0.10 | " |
| N | III-44 | A-51*3 | 0.16 | 2.69 | 2.97 | 0.13 | 2.67 | 2.91 | +0.10 | " |
| O | III-45 | A-45*3 | 0.16 | 2.72 | 2.98 | 0.12 | 2.63 | 2.92 | +0.11 | " |
| P | III-47 | A-41*3 | 0.16 | 2.71 | 2.91 | 0.12 | 2.67 | 2.91 | +0.10 | " |

*1Comparative compound (R-1) having the following formula was added as a magenta coupler to the third layer.
*2Addition in an equimolar amount to the coupler.
*3Addition in a proportion of 10 mol % to the coupler.

Comparative Compound (R-1)

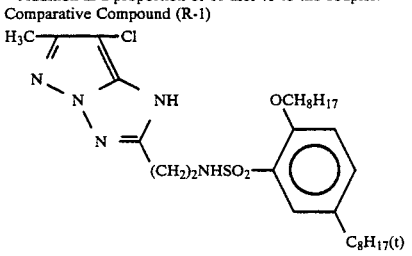

As can be seen from the data in Table 1, not only the processing results obtained using the light-sensitive materials of the present invention showed a considerably reduced dependence on the sulfurous acid ion concentration, but also an increase of stain with time after the processing was remarkably depressed in the light-sensitive materials of the present invention. This depression effect on the generation of stain with time after the processing was more remarkable with the addition of the present compound of formula (III) than the image stabilizing agent of formula (IV) or (V).

EXAMPLE 2

On a paper support laminated with a polyethylene film on both sides thereof, were coated the layers described below in this order to prepare a multilayer silver halide light-sensitive material. Coating compositions were prepared in the following manner.

Preparation of Coating Composition for First Layer

To 19.1 g of a yellow coupler (ExY-1) and 4.4 g of a color image stabilizer (Cpd-1), were added 27.2 ml of ethyl acetate and 7.7 ml (8.0 g) of a high boiling solvent (Solv-1) to make a solution. The solution was emulsified and dispersed in 185 ml of a 10% aqueous gelatin solution containing 8 ml of a 10% sodium dodecylbenzenesulfonate solution. The resulting emulsified dispersion was mixed homogeneously with the emulsions EM7 and EM8, and further the gelatin concentration therein was adjusted so that the resulting emulsion had the composition described below. Thus, the coating composition for the first layer was prepared.

Coating compositions for the second to the seventh layers were prepared in the same manner as for the first layer. In each layer, sodium salt of 1-hydroxy-3,5-dichloro-s-triazine was contained as gelatin hardener. In addition, Cpd-2 was used as viscosity increasing agent.

Constituent Layers

The ingredients used and their coverages expressed in terms of g/m² are described below, with the coverage of silver halide expressed on a silver basis.

| | |
|---|---|
| Support | |
| Polyethylene-laminated paper (containing a white pigment ($TiO_2$) and a bluish dye on the first layer side). | |
| First Layer (Blue-sensitive layer) | |
| Monodisperse silver chlorobromide emulsion (EM7) sensitized spectrally with a blue sensitizing dye (ExS-1) | 0.15 |
| Monodisperse silver chlorobromide emulsion (EM8) sensitized spectrally with a blue sensitizing dye (ExS-1) | 0.15 |
| Gelatin | 1.86 |

-continued

| | |
|---|---|
| Yellow coupler (ExY-1) | 0.82 |
| Color image stabilizer (Cpd-1) | 0.19 |
| Solvent (Solv-1) | 0.35 |
| Second Layer (Color mixing inhibiting layer) | |
| Gelatin | 0.99 |
| Color mixing inhibitor (Cpd-3) | 0.08 |
| Third Layer (Green-sensitive layer) | |
| Monodisperse silver chlorobromide emulsion (EM9) sensitized spectrally with green sensitizing dyes (ExS-2, ExS-3) | 0.12 |
| Monodisperse silver chlorobromide emulsion (EM10) sensitized spectrally with green sensitizing dyes (ExS-2, ExS-3) | 0.24 |
| Gelatin | 1.24 |
| Magenta coupler (ExM-1) | 0.39 |
| Color image stabilizer (Cpd-4) | 0.25 |
| Color image stabilizer (Cpd-5) | 0.12 |
| Solvent (Solv-2) | 0.25 |
| Fourth Layer (Ultraviolet absorbing layer) | |
| Gelatin | 1.60 |
| Ultraviolet absorber (Cpd-6/Cpd-7/ Cpd-8 = 3/2/6 by weight) | 0.70 |
| Color mixing inhibitor (Cpd-9) | 0.05 |
| Solvent (Solv-3) | 0.42 |
| Fifth Layer (Red-sensitive layer) | |
| Monodisperse silver chlorobromide emulsion (EM11) sensitized spectrally with red sensitizing dyes (ExS-4, ExS-5) | 0.07 |
| Monodisperse silver chlorobromide emulsion (EM12) sensitized spectrally with red sensitizing dyes (ExS-4, ExS-5) | 0.16 |
| Gelatin | 0.92 |
| Cyan coupler (ExC-1) | 0.15 |
| Cyan coupler (ExC-2) | 0.18 |
| Color image stabilizer (Cpd-7/Cpd-8/ Cpd-10 = 3/4/2 by weight | 0.17 |
| Polymeric dispersion medium (Cpd-11) | 0.14 |
| Solvent (Solv-1) | 0.20 |

-continued

| | |
|---|---|
| Sixth Layer (Ultraviolet absorbing layer) | |
| Gelatin | 0.54 |
| Ultraviolet absorber (Cpd-6/Cpd-8/ Cpd-12 = 1/5/3 by weight) | 0.21 |
| Solvent (Solv-4) | 0.08 |
| Seventh Layer (Protective layer) | |
| Gelatin | 1.33 |
| Acrylmodified copolymer of polyvinyl alcohol (modification degree: 17%) | 0.17 |
| Liquid paraffin | 0.03 |

Therein, Cpd-12 and Cpd-13 were additionally used as irradiation inhibiting dyes. In each layer, Alkanol XC (produced by du Pont), sodium alkylbenzenesulfonate, a succinic acid ester and Megafac F-120 (produced by Dai-Nippon Ink & Chemicals, Inc.) were further added as coating aids for emulsified dispersions. Furthermore, Cpd-14 and Cpd-15 were used as silver halide stabilizing agent.

Details of the emulsions used are illustrated below.

| Emulsion Name | Crystal Form | Grain Size (μm) | Br Content (mol %) | Variation Coefficient |
|---|---|---|---|---|
| EM7 | Cube | 1.1 | 1.0 | 0.10 |
| EM8 | Cube | 0.8 | 1.0 | 0.10 |
| EM9 | Cube | 0.45 | 1.5 | 0.09 |
| EM10 | Cube | 0.34 | 1.5 | 0.09 |
| EM11 | Cube | 0.45 | 1.5 | 0.09 |
| EM12 | Cube | 0.34 | 1.6 | 0.10 |

(Variation Coefficient = Standard Deviation/Average Size)

The structural formulae of the compounds employed are illustrated below.

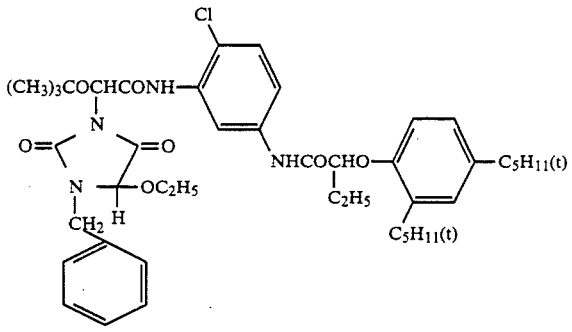

ExY-1

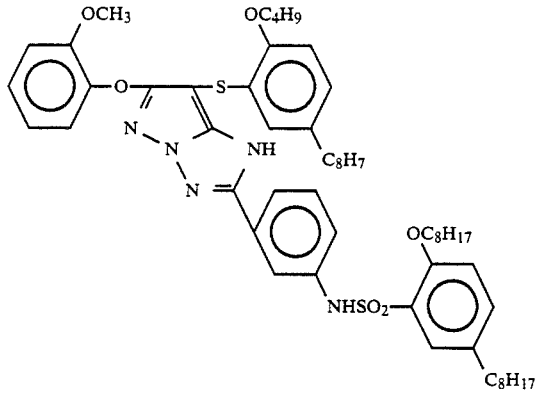

ExM-1

-continued
ExC-1
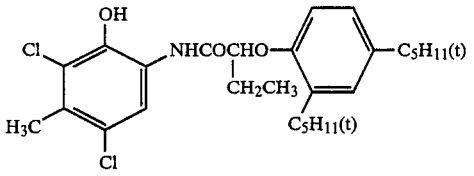
ExC-2
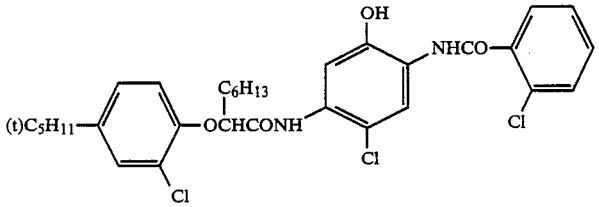
Cpd-1
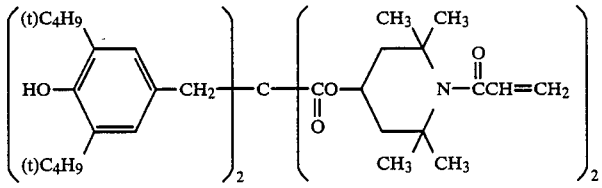
Cpd-2
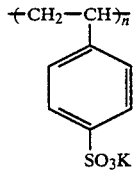
(Molecular Weight: 500,000–2,000,000)
Cpd-3
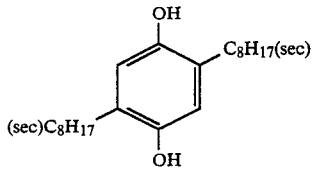
Cpd-4
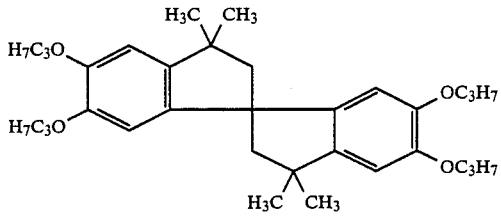
Cpd-5
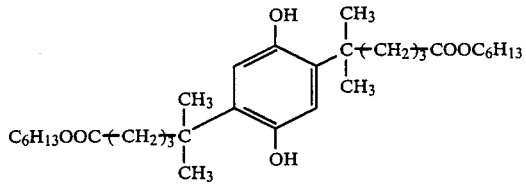
ExS-1
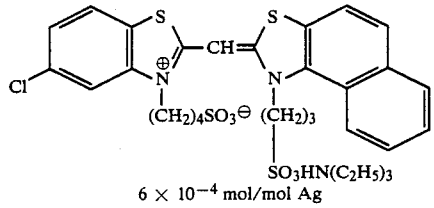
$6 \times 10^{-4}$ mol/mol Ag -continued
ExS-2
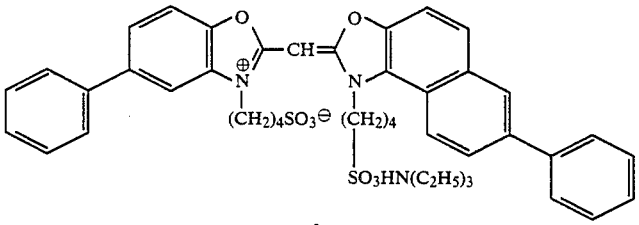
$8 \times 10^{-5}$ mol/mol Ag
ExS-3
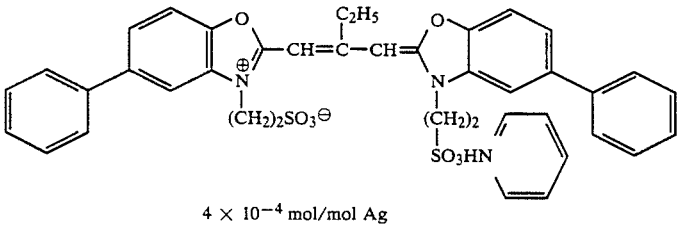
$4 \times 10^{-4}$ mol/mol Ag
ExS-4
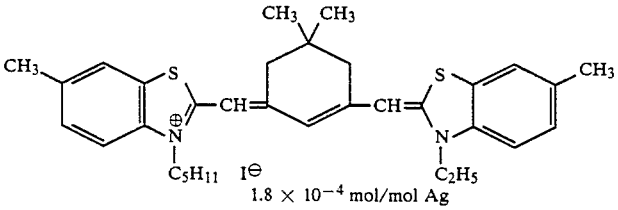
$1.8 \times 10^{-4}$ mol/mol Ag
ExS-5
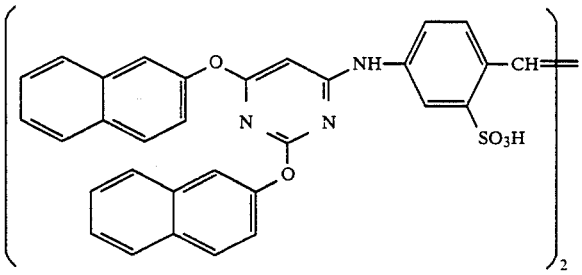
Cpd-6
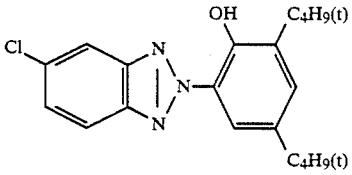
Cpd-7
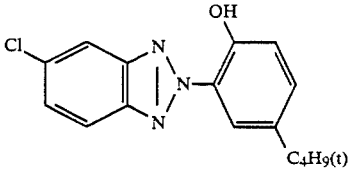
Cpd-8
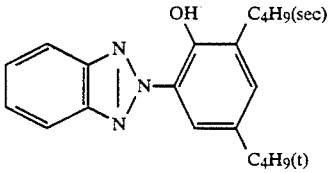

-continued

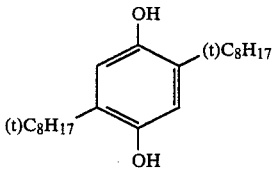

Cpd-9

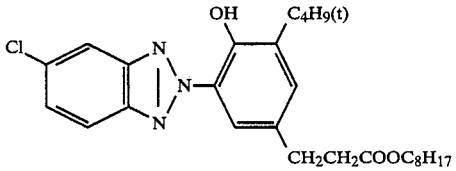

Cpd-10

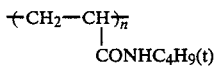

(n = 100~1000)
Molecular weight: 100,000

Cpd-11

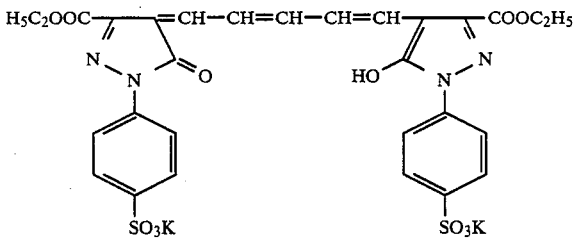

Cpd-12

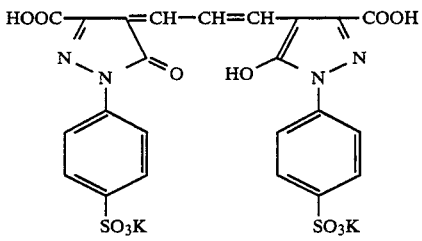

Cpd-13

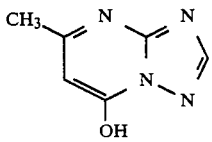

Cpd-14

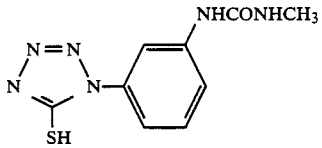

Cpd-15

| | |
|---|---|
| Dibutyl Phthalate | Solv-1 |
| Trioctyl Phosphate | Solv-2 |
| Trinonyl Phosphate | Solv-3 |
| Tricresyl Phosphate | Solv-4 |

The foregoing light-sensitive material was imagewise exposed, and then subjected to a running processing test with a paper processing machine which included the following steps. The running processing test was contained till the color developer was replenished in twice as much amount as the tank volume.

| Processing Step | Temperature (°C.) | Time (sec.) | Amount Replenished* (ml) | Tank Volume (l) |
|---|---|---|---|---|
| Color | 38 | 45 | 161 | 17 |

-continued

| Processing Step | Temperature (°C.) | Time (sec.) | Amount Replenished* (ml) | Tank Volume (l) |
|---|---|---|---|---|
| development | | | | |
| Bleach-Fix | 30 to 36 | 45 | 161 | 17 |
| Rinsing (1) | 30 to 37 | 20 | — | 10 |
| Rinsing (2) | 30 to 37 | 20 | — | 10 |
| Rinsing (3) | 30 to 37 | 20 | — | 10 |
| Rinsing (4) | 30 to 37 | 30 | 248 | 10 |

-continued

| Processing Step | Temperature (°C.) | Time (sec.) | Amount Replenished* (ml) | Tank Volume (l) |
|---|---|---|---|---|
| Drying | 75 to 80 | 60 | | |

*per 1 $m^2$ of the light-sensitive material processed.

The replenishment of the rinsing solution was performed in the direction from the rinsing tank (4) to the rinsing tank (1) according to a four-tank counter replenishing process.

The compositions of the processing solutions used were as follows.

| Color Developer | Tank Solution | Replenisher |
|---|---|---|
| Water | 800 ml | 800 ml |
| Ethylenediamine-N,N,N,N-tetramethylenephosphonic acid | 1.5 g | 1.5 g |
| Triethylenediamine(1,4-diazabicyclo[2,2,2]octane) | 5.0 g | 5.0 g |
| Sodium chloride | 1.4 g | |
| Potassium carbonate | 25 g | 25 g |
| N-Ethyl-N-(β-methanesulfonamidoethyl)-3-methyl-4-aminoaniline sulfate | 5.0 g | 7.0 g |
| Diethylhydroxylamine | 4.2 g | 6.0 g |
| Brightening agent (4,4'-diaminostilbene type) | 2.0 g | 2.5 g |
| Water to make | 1,000 ml | 1,000 ml |
| pH (at 25° C.) | 10.05 | 10.45 |
| Bleach-fix Bath (Tank solution = Replenisher) | | |
| Water | 400 ml | |
| Ammonium thiosulfate (70%) | 100 ml | |
| Sodium sulfite | 17 g | |
| Ammonium ethylenediaminetetraacetatoferrate(III) | 55 g | |
| Disodium ethylenediaminetetraacetate dihydrate | 5 g | |
| Ammonium bromide | 40 g | |
| Glacial acetic acid | 9 g | |
| Water to make | 1,000 ml | |
| pH (at 25° C.) | 5.40 | |
| Rinsing Solution (Tank solution = Replenisher) | | |
| Ion-exchanged water (in which calcium and magnesium ion concentrations were each below 3 ppm). | | |

In addition, light-sensitive materials were prepared in the same manner as for the foregoing material, except that the magenta couplers set forth in Table 2 were employed as the magenta coupler in the third layer, respectively, and the compounds represented by the general formula (III) of the present invention were further added in a proportion of 30 mol % to the couplers, respectively.

Photographic characteristics and an increase of stain with time after the processing were examined by the same methods as in Example 1.

The results are shown in Table 2.

TABLE 2

| Sensitive Material | Coupler in Third Layer | Compound of Invention | Photographic Characteristics: Fresh Developer $D_{min}$ | Fresh Developer $D_{max}$ | Fresh Developer Gamma | Running developer $D_{min}$ | Running developer $D_{max}$ | Running developer Gamma | Increment of Stain | Note |
|---|---|---|---|---|---|---|---|---|---|---|
| II-A | R-1*(1) | — | 0.12 | 2.10 | 2.51 | 0.18 | 1.86 | 2.10 | +0.12 | Comparison |
| II-B | R-1*(1) | III-38 | 0.12 | 1.96 | 2.50 | 0.17 | 1.77 | 2.09 | +0.12 | " |
| II-C | M-6 | — | 0.12 | 2.88 | 2.99 | 0.13 | 2.89 | 2.91 | +0.26 | " |
| II-D | M-6 | III-38 | 0.12 | 2.89 | 3.00 | 0.13 | 2.88 | 3.02 | +0.11 | Invention |
| II-E | M-10 | III-38 | 0.12 | 2.79 | 2.96 | 0.13 | 2.77 | 2.98 | +0.09 | " |
| II-F | M-52 | III-38 | 0.11 | 2.82 | 3.01 | 0.13 | 2.80 | 2.99 | +0.10 | " |
| II-G | M-54 | III-38 | 0.12 | 2.61 | 2.82 | 0.14 | 2.59 | 2.80 | +0.11 | " |
| II-H | M-34 | III-38 | 0.12 | 2.62 | 2.81 | 0.13 | 2.56 | 2.77 | +0.11 | " |
| II-I | M-40 | III-38 | 0.13 | 2.61 | 2.80 | 0.13 | 2.56 | 2.78 | +0.11 | " |
| II-J | M-56 | III-39 | 0.13 | 2.90 | 3.02 | 0.14 | 2.86 | 3.00 | +0.08 | " |
| II-K | M-60 | III-39 | 0.12 | 2.89 | 2.98 | 0.13 | 2.87 | 2.96 | +0.07 | " |
| II-L | M-62 | III-39 | 0.12 | 2.88 | 3.00 | 0.12 | 2.84 | 2.96 | +0.08 | " |
| II-M | M-70 | III-39 | 0.12 | 2.61 | 2.81 | 0.12 | 2.56 | 2.77 | +0.09 | " |
| II-N | M-71 | III-39 | 0.13 | 2.60 | 2.80 | 0.13 | 2.54 | 2.76 | +0.09 | " |

*(1) R-1 was the same as in Example 1.

As can be seen from Table 2, the light-sensitive materials of the present invention showed not only slight changes of photographic characteristics by running processing, but also a considerably depressed increase in stain density with time after the processing.

EXAMPLE 3

On a paper laminated with polyethylene on both sides and subjected to a corona discharge treatment, the layers of from the first layer (the lowest layer) to the seventh layer (the uppermost layer) were coated in this order to prepare a light-sensitive material. Coating compositions for these layers were prepared in the manner described below. The structural formulae and other details of the couplers, the color image stabilizers and other ingredients used therein are described below.

A coating composition for the first layer was prepared as follows: A mixture of 200 g of a yellow coupler, 93.3 g of a discoloration inhibitor, 10 g of a high boiling point solvent (p), 5 g of a solvent (q) was added to 600 ml of ethyl acetate as an auxiliary solvent, and dissolved therein by heating to 60° C. The resulting solution was mixed with 3,300 ml of a 5% aqueous gelatin solution containing 330 ml of a 5% aqueous solution of Alkanol B (trade name of alkylnaphthalenesulfonate produced by du Pont), and emulsified with a colloid mill to prepare a color dispersion. The ethyl acetate was distilled away from the color dispersion under reduced pressure. The resulting dispersion was added to 1,400 g of an emulsion (containing 96.7 g of silver and 170 g of gelatin) to which a sensitizing dye for a blue-sensitive emulsion layer and 1-methyl-2-mercapto-5-acetylamino-1,3,4-triazole had been added, and thereto was further added 2,600 g of a 10% aqueous gelatin solution. Thus, the coating composition was prepared.

Constituent Layers

The ingredients used and their coverages expressed in terms of mg/$m^2$ are described below, with the coverage of silver halide expressed on a silver basis.

| | |
|---|---|
| Support | |
| Paper support laminated by polyethylene on both sides. | |
| First Layer (Blue-sensitive Layer) | |
| Silver chlorobromide emulsion (bromide content: 80 mol %) | 290 |
| Yellow coupler | 600 |
| Discoloration inhibitor (r) | 280 |
| Solvent (p) | 30 |
| Solvent (q) | 15 |
| Gelatin | 1800 |
| Second Layer (Color Mixing Inhibiting Layer) | |
| Silver bromide emulsion (primitive, 0.05 μm grain size) | Silver 10 |
| Color mixing inhibitor (s) | 55 |
| Solvent (p) | 30 |
| Solvent (q) | 15 |
| Gelatin | 800 |
| Third Layer (Green-sensitive Layer) | |
| Silver chlorobromide emulsion (bromide content: 70 mol %) | 305 |
| Magenta coupler | 670 |
| Discoloration inhibitor (t) | 150 |
| Compound of invention (III-38) | 30 |
| Discolorationn inhibitor (u) | 10 |
| Solvent (p) | 200 |
| Solvent (g) | 10 |
| Gelatin | 1400 |
| Fourth Layer (Color Mixing Inhibiting Layer) | |
| Color mixing inhibitor (s) | 65 |
| Ultraviolet absorber (n) | 450 |
| Ultraviolet absorber (o) | 230 |
| Solvent (p) | 50 |
| Solvent (q) | 50 |
| Gelatin | 1700 |
| Fifth Layer (Red-sensitive Layer) | |
| Silver chlorobromide emulsion (bromide content: 70 mol %) | 210 |
| Cyan coupler | 380 |
| Discoloration inhibitor (r) | 250 |
| Solvent (p) | 160 |
| Solvent (q) | 100 |

-continued

| | |
|---|---|
| Gelatin | 1800 |
| Sixth Layer (Ultraviolet Absorbing Layer) | |
| Ultraviolet absorber (n) | 260 |
| Ultraviolet absorber (o) | 70 |
| Solvent (p) | 300 |
| Solvent (q) | 100 |
| Gelatin | 700 |
| Seventh Layer (Protective Layer) | |
| Gelatin | 620 |

(n) 2-(2-Hydroxy-3,5-di-tert-amylphenyl)benzo-triazole
(o) 2-(2-Hydroxy-3,5-di-tert-butylphenyl)benzo-triazole
(p) Di(2-ethylhexyl)phthalate
(q) Dibutyl phthalate
(r) 2,5-Di-tert-amylphenyl-3,5-di-tert-butyl-hydroxybenzoate
(s) 2,5-Di-tert-octylhydroquinone
(t) 1,4-Di-tert-amyl-2,5-dioctyloxybenzene The following compounds were used as sensitizing dye for each emulsion layer.

Blue-sensitive emulsion layer: Anhydro-5-methoxy-5'-methyl-3,3-disulfopropylselenacyanine hydroxide Green sensitive emulsion layer: Anhydro-9-ethyl-5,5'-di-phenyl-3,3'-disulfoethyloxacarbocyanine hydroxide Red-sensitive emulsion layer: 3,3'-Diethyl-5-methoxy-9,9'-(2,2-dimethyl-1,3-propano)thiadicarbocyanine iodide In addition, 1-methyl-2-mercapto-5-acetylamino-1,3,4-triazole was used as a stabilizer for each layer. Further, dipotassium 4-(3-carboxy-5-hydroxy-4-(3-carboxy-5-oxo-1-(4-sulfonatophenyl)-pyrazoline-4-ylidene)-1-propenyl)-1-pyrazolyl)benzenesulfonate, and tetrasodium N,N'-(4,8-dihydroxy-9,10-di-oxo-3,7-di-sulfonatoanthracene-1,5-diyl)bis(aminomethanesulfonate) were used as irradiation preventing dyes. Furthermore, 1,2-bis(vinylsulfonyl)ethane was used as hardener.

The couplers used and the discoloration inhibitor (u) used are illustrated below.

Yellow Coupler

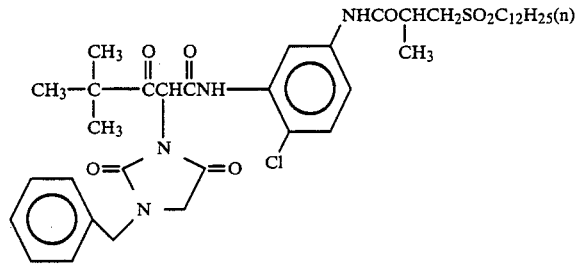

Magenta Coupler

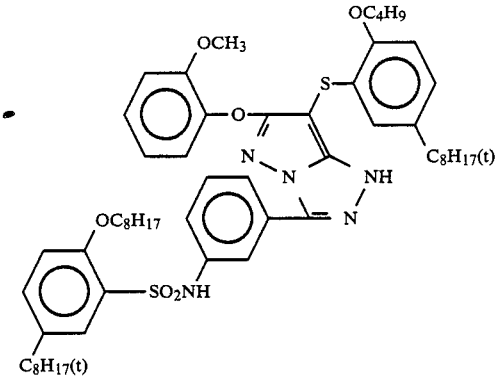

-continued

Cyan Coupler

Equimolar amount of

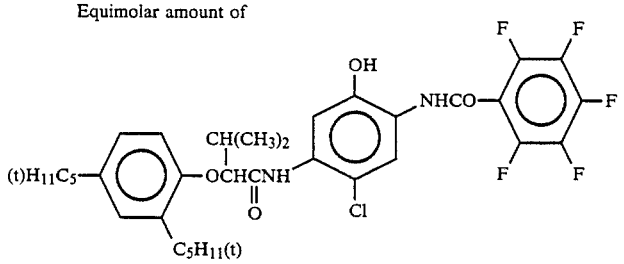

and

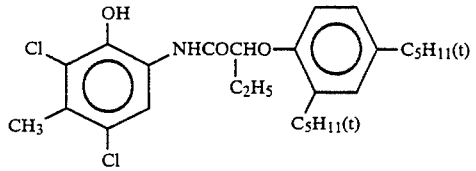

Discoloration Inhibitor (u)

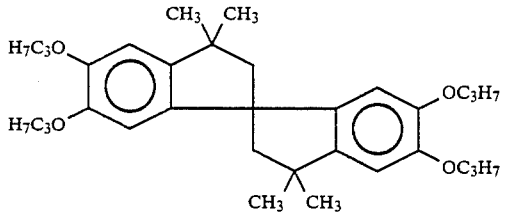

After the processing, the photographic characteristics were evaluated by the same procedures as in Example 1, and the same results as in Example 1 were obtained.

EXAMPLE 4

The following layers from the first to the eleventh were coated on a paper support laminated by polyethylene on both sides thereof to prepare a light-sensitive material. The polyethylene laminated on the first layer side contained titanium white as a white pigment and a trace amount of ultramarine blue as a bluish dye.

The ingredients used and their coverages expressed in terms of g/m$^2$ are described below, with the coverage of silver halide represented on a silver basis.

| Constituent Layers | |
|---|---|
| First Layer (Antihalation Layer): | |
| Black colloidal silver | 0.10 |
| Gelatin | 2.00 |
| Second Layer (Slow Red-sensitive Layer): | |
| Silver iodobromide (having an iodide content of 3.5 mol %, and an average grain size of 0.5 μm) sensitized spectrally with red sensitizing dyes (ExS-1 and ExS-2) | 0.15 |
| Gelatin | 1.00 |
| Cyan coupler (ExC-1) | 0.30 |
| Discoloration inhibitor (Cpd-1, Cpd-2 and Cpd-3, 4:4:2 by weight) | 0.15 |
| Coupler solvent (Solv-1 and Solv-2, 1:1 by weight) | 0.06 |
| Third Layer (High-speed Red-sensitive Layer): | |
| Silver iodobromide (having an iodide content of 8.0 mol %, and an average grain size of 0.60 μm) sensitized spectrally with red sensitizing dyes (ExS-1 and ExS-2) | 0.11 |
| Gelatin | 0.50 |
| Cyan coupler (ExC-1) | 0.10 |
| Discoloration inhibitor (Cpd-1, Cpd-2 and Cpd-3, 4:4:2 by weight) | 0.05 |
| Coupler solvent (Solv-1 and Solv-2, 1:1 by weight) | 0.04 |
| Fourth Layer (Interlayer): | |
| Yellow colloidal silver | 0.02 |
| Gelatin | 1.00 |
| Color mixing inhibitor (Cpd-4) | 0.08 |
| Color mixing inhibitor solvent (Solv-3 and Solv-4, 1:1 by weight) | 0.16 |
| Polymer latex (Cpd-5) | 0.10 |
| Fifth Layer (Slow Green-sensitive Layer): | |
| Silver iodobromide (having an iodide content of 2.5 mol %, and an average grain size of 0.4 μm) sensitized spectrally with green sensitizing dye (ExS-3) | 0.20 |
| Gelatin | 0.70 |
| Magenta coupler (ExM-1) | 0.40 |
| Discolortion inhibitor (Cpd-6) | 0.05 |
| Discoloration inhibitor (Cpd-7) | 0.05 |
| Discoloration inhibitor (Cpd-8) | 0.02 |
| Compound of invention (III-38) | 0.06 |
| Coupler solvent (Solv-3 and Solv-5, 1:1 by weight) | 0.15 |
| Sixth Layer (High-speed Green-sensitive Layer): | |
| Silver iodobromide (having an iodide content of 3.5 mol %, and an average grain size of 0.9 μm) sensitized spectrally with green sensitizing dye (ExS-3) | 0.20 |
| Gelatin | 0.70 |
| Magenta coupler (ExM-1) | 0.40 |

-continued

| Constituent Layers | |
|---|---|
| Discoloration inhibitor (Cpd-6) | 0.05 |
| Discoloration inhibitor (Cpd-7) | 0.05 |
| Discoloration inhibitor (Cpd-8) | 0.02 |
| Compound of invention (III-38) | 0.06 |
| Coupler solvent (Solv-3 and Solv-5, 1:1 by weight) | 0.15 |
| Seventh Layer (Yellow Filter Layer): | |
| Yellow colloidal silver | 0.20 |
| Gelatin | 1.00 |
| Color mixing inhibitor (Cpd-4) | 0.06 |
| Color mixing inhibitor solvent (Solv-3 and Solv-5, 1:1 by weight) | 0.15 |
| Polymer latex (Cpd-8) | 0.10 |
| Eighth Layer (Slow Blue-sensitive Layer): | |
| Silver iodobromide (having an iodide content of 2.5 mol %, and an average grain size of 0.5 μm) sensitized spectrally with blue sensitizing dye (ExS-4) | 0.15 |
| Gelatin | 0.50 |
| Yellow coupler (ExY-1) | 0.20 |
| Stain inhibitor (Cpd-8) | 0.001 |
| Coupler solvent (Solv-2) | 0.05 |
| Ninth Layer (High-speed Blue-sensitive Layer): | |

-continued

| Constituent Layers | |
|---|---|
| Silver iodobromide (having an iodide content of 2.5 mol %, and an average grain size of 1.4 μm) sensitized spectrally with green sensitizing dye (ExS-4) | 0.20 |
| Gelatin | 0.50 |
| Yellow coupler (ExY-1) | 0.20 |
| Stain inhibitor (Cpd-8) | 0.001 |
| Coupler solvent (Solv-2) | 0.05 |
| Tenth Layer (Ultraviolet Absorbing Layer): | |
| Gelatin | 1.50 |
| Ultraviolet absorber (Cpd-9, Cpd-1 and Cpd-3, 4:4:2 by weight) | 1.00 |
| Color mixing inhibitor (Cpd-10) | 0.08 |
| Ultraviolet absorber solvent (Solv-2) | 0.30 |
| Irradiation preventing dye (Cpd-11) | 0.04 |
| Irradiation preventing dye (Cpd-12) | 0.04 |
| Eleventh Layer (Protective Layer): | |
| Fine-grained silver chlorobromide (having a chloride content of 97 mol % and an average grain size of 0.2 μm) | 0.07 |
| Gelatin | 1.00 |
| Gelatin hardener (H-1) | 0.17 |

ExS-1

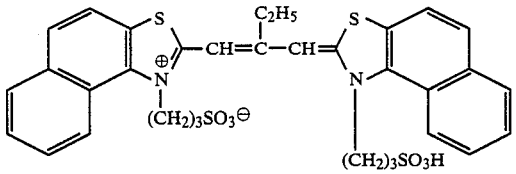

ExS-2

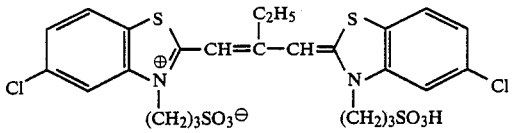

ExS-3

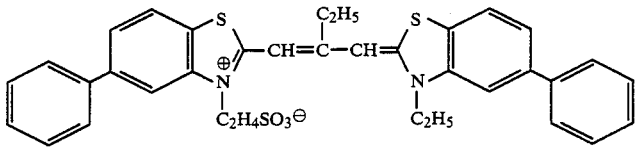

ExS-4

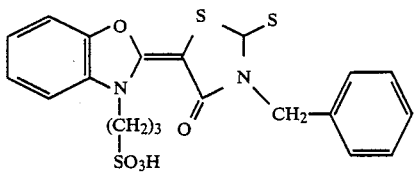

Cpd-1

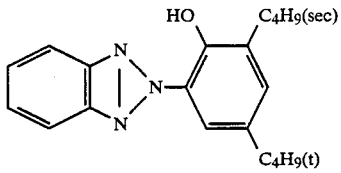

Cpd-2

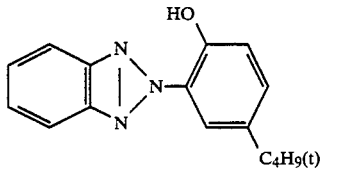

-continued
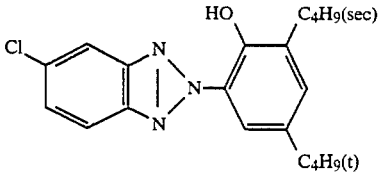
Cpd-3
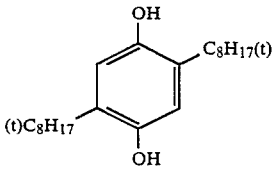
Cpd-4
Polyethyl acrylate
Cpd-5
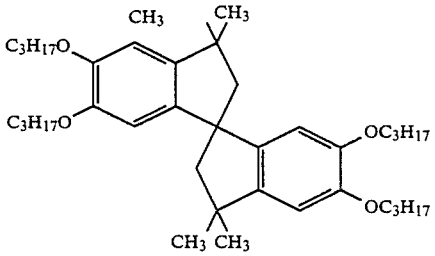
Cpd-6
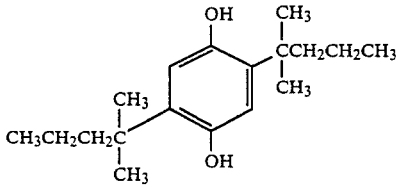
Cpd-7
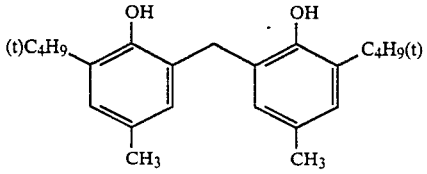
Cpd-8
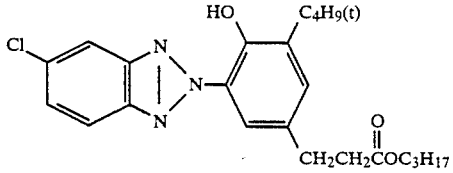
Cpd-9
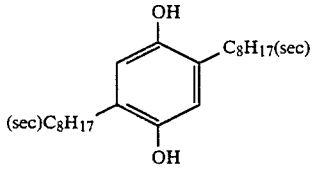
Cpd-10
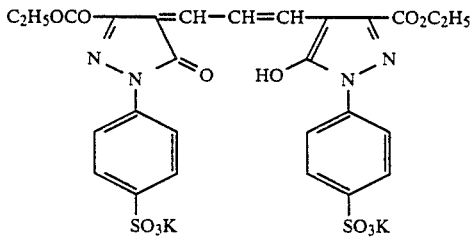
Cpd-11

-continued

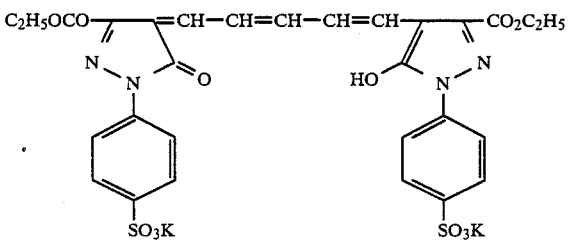

Cpd-12

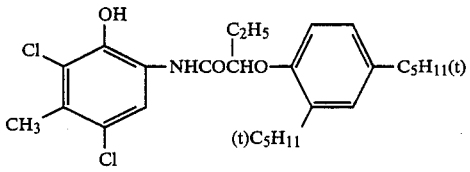

ExC-1

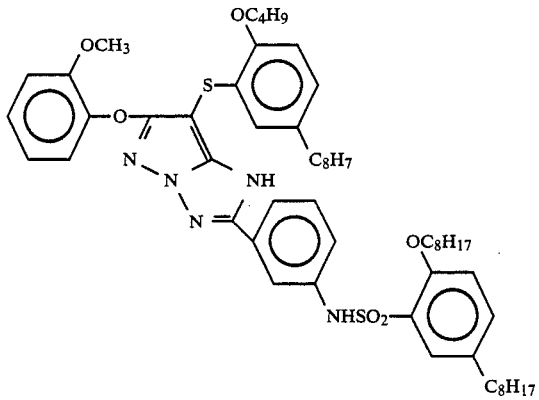

ExM-1

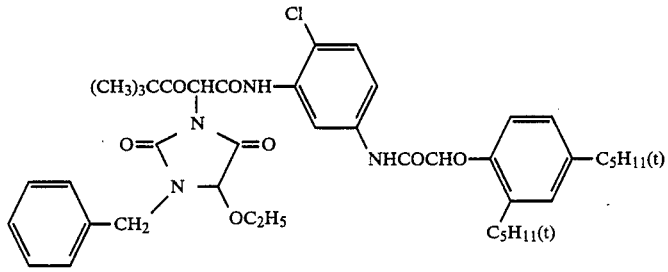

ExY-1

| | |
|---|---|
| Di(2-ethylhexyl)phthalate | Solv-1 |
| Trinonyl phosphate | Solv-2 |
| Tricresyl phosphate | Solv-3 |
| Dibutyl phthalate | Solv-4 |
| Trioctyl phosphate | Solv-5 |
| 1,2-Bis(vinylsulfonylacetamido)ethane | H-1 |

The thus prepared silver halide color photographic material was exposed to light, and then processed with an automatic developing machine in which the following steps were continued until total replenished amount of each processing solution became three times the corresponding tank volume. The results obtained were similar to those obtained in Example 1.

| Processing Steps | Time | Tempera-ture | Tank Solution | Amount replenished |
|---|---|---|---|---|
| First development | 75 sec. | 38° C. | 8 l | 330 ml/m$^2$ |
| First Water Washing (1) | 45 sec. | 33° C. | 5 l | — |
| First Water Washing (2) | 45 sec. | 33° C. | 5 l | 5000 ml/m$^2$ |
| Reversal Exposure | 15 sec. | 100 lux. | | |
| Color Development | 135 sec. | 38° C. | 15 l | 330 ml/m$^2$ |

-continued

| Processing Steps | Time | Tempera-ture | Tank Solution | Amount replenished |
|---|---|---|---|---|
| Second Water Washing | 45 sec. | 33° C. | 5 l | 1000 ml/m$^2$ |
| Bleach-Fix (1) | 60 sec. | 38° C. | 7 l | — |
| Bleach-Fix (2) | 60 sec. | 38° C. | 7 l | 220 ml/m$^2$ |
| Third Water Washing (1) | 45 sec. | 33° C. | 5 l | — |
| Third Water Washing (2) | 45 sec. | 33° C. | 5 l | — |
| Third Water Washing (3) | 45 sec. | 33° C. | 5 l | 5000 ml/m$^2$ |
| Drying | 45 sec. | 75° C. | | |

The replenishment in the first and the third water washing steps was performed in accordance with a countercurrent replenishing process, wherein the washing bath of the first water washing (2) was supplied with washing water, the overflowing solution therefrom introduced into the washing bath of the first water washing (1), the washing bath of the third water washing (3) was supplied with washing water, the overflowing solution therefrom was introduced into the washing bath of the third water washing(2), and the overflowing solution therefrom was introduced into the washing bath of the third water washing (1).

The compositions of the processing solutions used were as follows.

| First Developer | Tank Solution | Replenisher |
|---|---|---|
| Pentasodium nitrilo-N,N,N-trimethylenephosphonate | 1.0 g | 1.0 g |
| Pentasodium diethylenetriaminepentaacetate | 3.0 g | 3.0 g |
| Potassium sulfite | 30.0 g | 30.0 g |
| Potassium thiocyanate | 1.2 g | 1.2 g |
| Potassium carbonate | 35.0 g | 35.0 g |
| Potassium hydroquinone-monosulfonate | 25.0 g | 25.0 g |
| 1-Phenyl-4-hydroxymethyl-4-methyl-3-pyrazolidone | 2.0 g | 2.0 g |
| Potassium bromide | 0.5 g | — |
| Potassium iodide | 5.0 mg | — |
| Water to make | 1000 ml | 1000 ml |
| pH | 9.60 | 9.70 |

PH was adjusted with hydrochloric acid or potassium hydroxide.

| Color Development | Tank Solution | Replenisher |
|---|---|---|
| Benzyl alcohol | 15.0 ml | 18.0 ml |
| Diethylene glycol | 12.0 ml | 14.0 ml |
| 3,6-Dithia-1,8-octanediol | 0.20 g | 0.25 g |
| Pentasodium nitrilo-N,N,N-trimethylenephosphonate | 0.5 g | 0.5 g |
| Pentasodium diethylenetriaminepentaacetate | 2.0 g | 2.0 g |
| Sodium sulfite | 2.0 g | 2.5 g |
| Hydroxylamine sulfate | 3.0 g | 3.6 g |
| N-Ethyl-N-(β-methanesulfonamidoethyl)-3-methyl-4-aminoaniline sulfate | 5.0 g | 8.0 g |

EXAMPLE 5

A multilayer color photosensitive material having the layer structure shown below on a paper support laminated with polyethylene on both sides thereof was prepared.

E9 Layer: Protective layer
E8 Layer: Ultraviolet absorbing layer
E7 Layer: Blue-sensitive emulsion layer
E6 Layer: Interlayer
E5 Layer: Yellow filter layer
E4 Layer: Interlayer
E3 Layer: Green-sensitive emulsion layer
E2 Layer: Interlayer
E1 Layer: Red-sensitive emulsion layer Support B1 Layer: Backing layer
B2 Layer: Protective layer Compositions of these layers are described below. The coverages are expressed in g/m$^2$, and the coverages of silver halide emulsions and colloidal silvers are those based on silver. The amounts of spectral sensitizing dyes are addition amounts expressed in mol per mol of silver halide in the same layer.

Support

Polyethylene-laminated paper (the polyethylene laminate on the E1 layer side contained a white pigment ($TiO_2$) and a bluish dye (ultramarine)).

| | |
|---|---|
| E1 Layer | |
| Internal latent-image type direct positive core/shell silver bromide emulsion | 0.26 |
| Spectral sensitizing dye (ExSS-1) | $1.0 \times 10^{-4}$ |
| Spectral sensitizing dye (ExSS-2) | $6.1 \times 10^{-5}$ |
| Gelatin | 1.11 |
| Cyan coupler (ExCC-1) | 0.21 |
| Cyan coupler (ExCC-2) | 0.26 |
| Ultraviolet absorber (ExUV-1) | 0.17 |
| Solvent (ExS-1) | 0.23 |
| Development modifier (ExGC-1) | 0.02 |
| Stabilizer (ExA-1) | 0.006 |
| Nucleation accelerator (ExZS-1) | $3.0 \times 10^{-4}$ |
| Nucleating agent (ExZK-1) | $8.0 \times 10^{-6}$ |
| E2 Layer | |
| Gelatin | 1.41 |
| Color mixing inhibitor (ExKB-1) | 0.09 |
| Solvent (ExS-1) | 0.10 |
| Solvent (ExS-2) | 0.10 |
| E3 Layer | |
| Internal latent-image type direct positive core/shell silver bromide emulsion | 0.23 |
| Spectral sensitizing dye (ExSS-3) | $3.0 \times 10^{-4}$ |
| Gelatin | 1.05 |
| Magenta coupler (ExMC-1) | 0.16 |
| Color image stabilizer (ExSA-1) | 0.20 |
| Compound of the Invention (III-38) | 0.03 |
| Solvent (ExS-3) | 0.25 |
| Development modifier (ExGC-1) | 0.02 |
| Stabilizer (ExA-1) | 0.006 |
| Nucleation accelerator (ExZS-1) | $2.7 \times 10^{-4}$ |
| Nucleating agent (ExZK-1) | $1.4 \times 10^{-5}$ |
| E4 Layer | |
| Gelatin | 0.47 |
| Color mixing inhibitor (ExKB-1) | 0.03 |
| Solvent (ExS-1) | 0.03 |
| Solvent (ExS-2) | 0.03 |
| E5 layer | |
| Colloidal silver | 0.09 |
| Gelatin | 0.49 |
| Color mixing inhibitor (ExKB-1) | 0.03 |
| Solvent (ExS-1) | 0.03 |
| Solvent (ExS-2) | 0.03 |
| E6 layer | |
| The same as E4 layer. | |
| E7 Layer | |
| Internal latent-image type direct positive core/shell silver bromide emulsion | 0.40 |
| Spectral sensitizing dye (ExSS-3) | $4.2 \times 10^{-4}$ |
| Gelatin | 2.17 |
| Yellow coupler (ExYC-1) | 0.51 |
| Solvent (ExS-2) | 0.20 |
| Solvent (ExS-4) | 0.20 |
| Development modifier (ExGC-1) | 0.06 |
| Stabilizer (ExA-1) | 0.001 |
| Nucleation accelerator (ExZS-1) | $5.0 \times 10^{-4}$ |
| Nucleating agent (ExZK-1) | $1.2 \times 10^{-6}$ |
| E8 layer | |
| Gelatin | 0.54 |
| Ultraviolet absorber (ExUV-2) | 0.21 |
| Solvent (ExS-4) | 0.08 |
| E9 layer | |
| Gelatin | 1.28 |
| Acrylmodified copolymer of polyvinyl alcohol (modification degree: 17%) | 0.17 |
| Liquid paraffin | 0.03 |
| Latex particles of polymethyl | 0.05 |

-continued

| | |
|---|---|
| methacrylate (average particle size: 2.8 μm) | |
| B1 Layer | |
| Gelatin | 8.70 |
| B2 Layer | |

-continued

| |
|---|
| The same as E9 layer. |

To each of the foregoing layers, a gelatin hardener ExGK-1 and a surface active agent were further added.

The compounds used for preparing the samples are illustrated below.

(ExCC-1) Cyan coupler

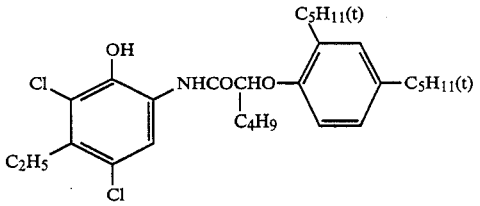

(ExCC-2) Cyan coupler

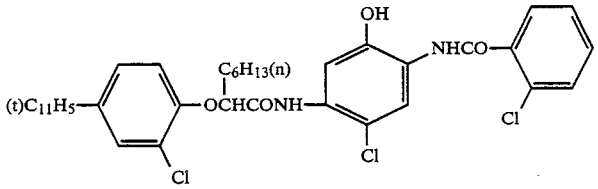

(ExMC-1) Magenta coupler

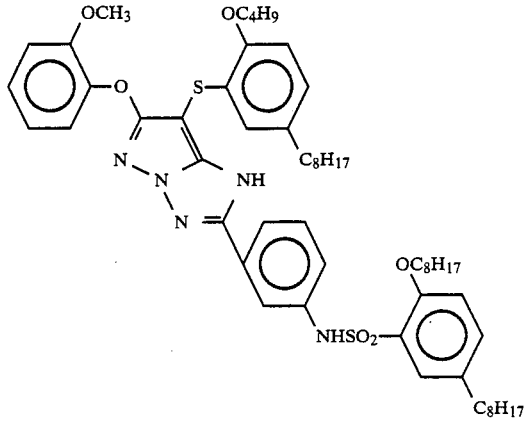

(ExYC-1) Yellow coupler

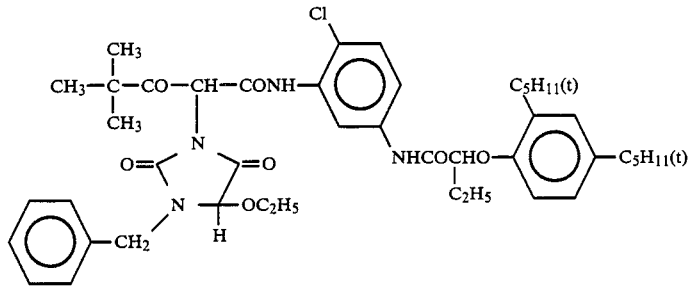

(ExKB-1) Color mixing inhibitor

-continued

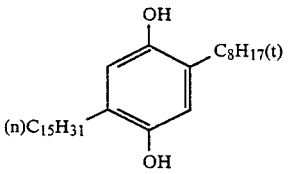

(ExGC-1) Development modifier

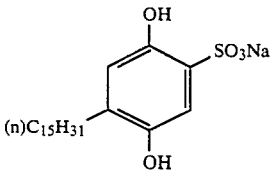

(ExA-1) Stabilizer

4-Hydroxy-5,6-trimethylene-1,3,3a,7-tetraazaindene (ExZS-1) Nucleation accelerator 2-(3-Dimethylaminopropylthio)-5-mercapto-1,3,4-thiadiazole hydrochloride (ExZK-1) Nucleating agent 6-Ethoxythiocarbonylamino-2-methyl-1-propargyl-quinoliniumtrifluoromethanesulfonate (ExGC-1) Gelatin hardener Sodium salt of 1-hydroxy-3,5-dichloro-s-triazine (ExUV-1) Ultraviolet absorber 5:8:9 (by weight) of (1), (2) and (3).

(1)

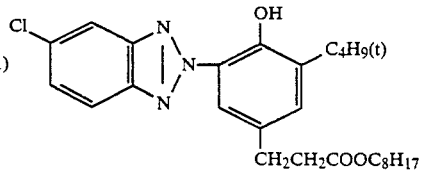

(2)

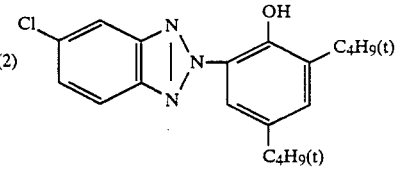

(3)

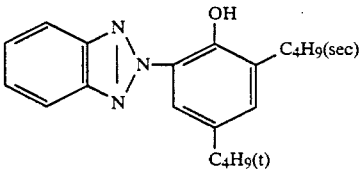

(ExUV-2) Ultraviolet absorber

2:9:8 (by weight) mixture of the foregoing (1), (2) and (3).

(ExSA-1) Color image stabilizer

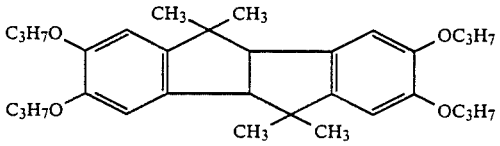

-continued
(ExS-1) Solvent
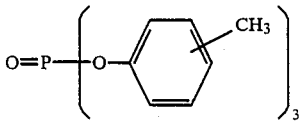
(ExS-2) Solvent
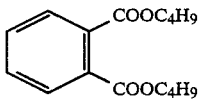
(ExS-3) Solvent
1:1 (by volume) mixture of
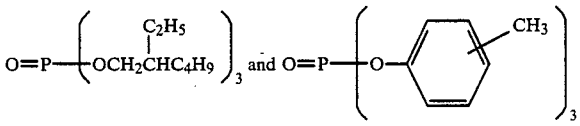
(ExS-4) Solvent
$O{=}P{+}O{-}C_9H_{19}(ISO)]_3$
(ExSS-1) Spectral sensitizing dye
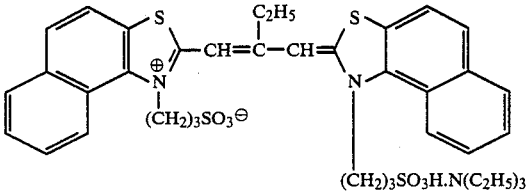
(ExSS-2) Spectral sensitizing dye
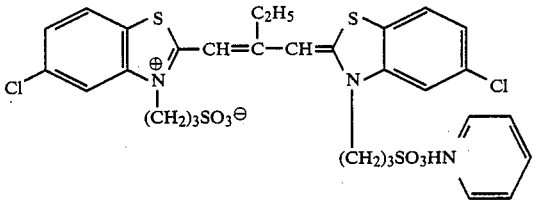
(ExSS-3) Spectral sensitizing dye
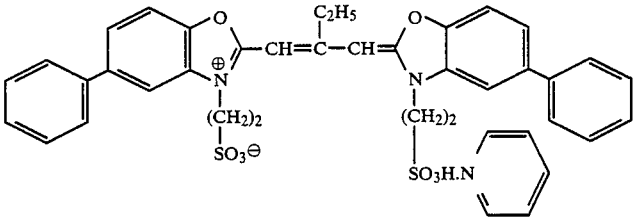
(ExSS-4) Spectral sensitizing dye -continued

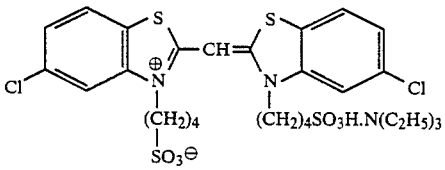

Thus prepared color photographic material was processed by the following steps. The results obtained were similar to those obtained in Example 1.

| Step | Photographic Processing A: Time | Temperature | Amount replenished |
|---|---|---|---|
| Color Development | 90 sec. | 38° C. | 300 ml/m$^2$ |
| Bleach-Fix | 40 sec. | 35° C. | 300 ml/m$^2$ |
| Water Washing (1) | 40 sec. | 30°–36° C. | |
| Water Washing (2) | 40 sec. | 30°–36° C. | |
| Water Washing (3) | 15 sec. | | 320 ml/m$^2$ |
| Drying | 30 sec. | 75°–80° C. | |

The replenishment of washing water was performed in accordance with a countercurrent replenishing process, wherein the washing bath (3) was replenished with washing solution, and the solution overflowing the washing bath (3) was introduced into the washing bath (2), and the solution overflowing the washing bath (2) was introduced into the washing bath (1). The amount of the processing solution carried by the photosensitive material from the prebath was 35 ml/m$^2$. Accordingly, the replenishing factor was 9.1.

The composition of the processing solutions used were as follows.

| Color Developer | Tank Solution | Replenisher |
|---|---|---|
| Ethylenediaminetetrakismethylenephosphonic acid | 0.5 g | 0.5 g |
| Diethylene glycol | 8.0 g | 13.0 g |
| Benzyl alcohol | 12.0 g | 18.5 g |
| Sodium bromide | 0.7 g | — |
| Sodium chloride | 0.5 g | — |
| Sodium sulfite | 2.0 g | 2.5 g |
| N,N-diethylhydroxylamine | 3.5 g | 4.5 g |
| Triethylenediamine(1,4-diazabicyclo[2,2,2]octane) | 3.5 g | 4.5 g |
| 3-Methyl-4-amino-N-ethyl-N-(β-methanesulfonamidoethyl)-aniline | 5.5 g | 8.0 g |
| Potassium carbonate | 30.0 g | 30.0 g |
| Brightening agent (stilbene type) | 1.0 g | 1.3 g |
| Pure water to make | 1,000 ml | 1,000 ml |
| pH | 10.50 | 10.90 |

The pH was adjusted with potassium hydroxide or hydrochloric acid.

| Bleach-fix Bath | Solution = Replenisher |
|---|---|
| Ammonium thiosulfate | 100 g |
| Sodium hydrogen sulfite | 21.0 g |
| Ammonium ethylenediaminetetraacetatoferrate(III) dihydrate | 50.0 g |
| Disodium ethylenediaminetetraacetate dihydrate | 5.0 g |

-continued

| Bleach-fix Bath | Solution = Replenisher |
|---|---|
| Pure water to make | 1,000 ml |
| pH | 6.3 |

The pH was adjusted with aqueous ammonia or hydrochloric acid.

Washing water

Pure water was used as both tank solution and replenisher. The term "pure water" as used herein refers to water obtained by performing an ion exchange treatment for removing all cations other than $H^+$ and all anions other than $OH^-$ from city water until all ion concentrations were reduced to 1 ppm or less.

Incorporation of both specified magenta coupler represented by the general formula (I) or (II) and the compound of the general formula (III) in the same layer ensures sufficient color developability and excellent color reproducibility, and remarkably suppresses generation of stain in unexposed areas with the lapse of time after photographic processing.

EXAMPLE 6

On a paper support laminated by polyethylene on both sides, were coated the layers described below in this order to prepare a multilayer milticolor photographic paper.

Coating compositions were prepared in the following manners.

Preparation of Coating Composition for First Layer

To a mixture of 19.1 g of the yellow coupler (ExY), 4.4 g of the color image stabilizer (Cpd-1) and 0.7 g of the color image stabilizer (Cpd-7), were added 27.2 ml of ethyl acetate and 8.2 g of the solvent (Solv-3) to dissolve the mixture therein. The resulting solution was emulsified and dispersed into 185 ml of a 10% aqueous gelatin solution containing 8 ml of a 10% sodium dodecylbenzenesulfonate solution. Separately, a silver chlorobromide emulsion (having a cubic crystal form, an average grain size of 0.88 μm and a variation coefficient of 0.08 in the grain size distribution, and containing bromide at the grain surface in a proportion of 0.2 mol % in the grain as a whole) was prepared, and thereto were added the blue-sensitive spectral sensitizing dyes illustrated below in equal amounts of $2.0\times10^{-4}$ mole per mole of silver. Thereafter, the emulsion was subjected to sulfur sensitization. The foregoing emulsified dispersion and this emulsion were mixed and dissolved, and adjusted to have the coating composition for the first layer described below. Coating compositions for the second to the seventh layers were prepared in the same manner as for the first layer. In each layer, sodium salt of 1-hydroxy-3,5-dichloro-s-triazine was used as gelatin hardener.

The following compounds were used as spectral sensitizing dyes in the respective layers.

Blue-sensitive Emulsion Layer

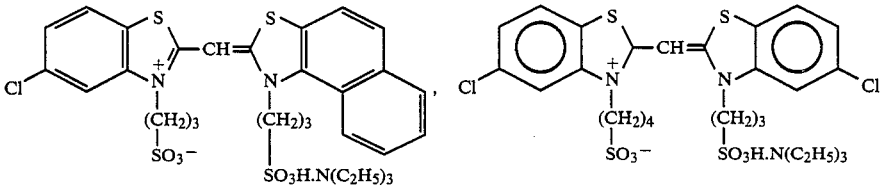

(2.0 × $10^{-4}$ mole of each compound per mole of silver halide)

Green-sensitive Emulsion Layer

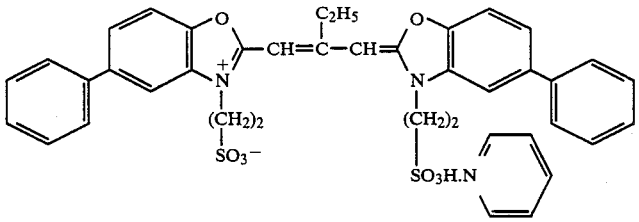

(4.0 × $10^{-4}$ mole per mole of silver halide)

and

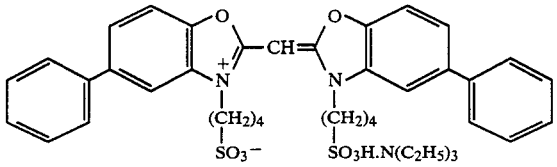

(7.0 × $10^{-5}$ mole per mole of silver halide)

Red-sensitive Emulsion Layer

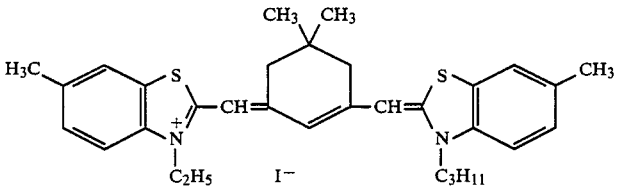

(0.9 × $10^{-4}$ mole per mole of silver halide)

In the red-sensitive emulsion layer, the following compound was additionally incorporated in an amount of $2.6\times10^{-3}$ mole per mole of silver halide.

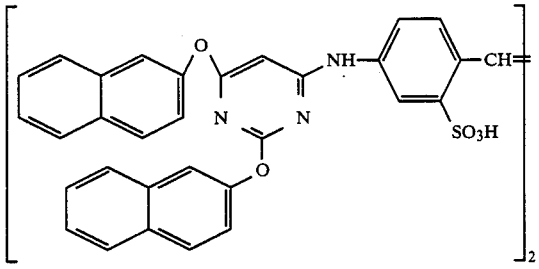

In addition to the ingredients described above, the blue-sensitive emulsion layer, the green-sensitive emulsion layer and the red-sensitive emulsion layer contained 1-(5-methylureidophenyl)-5-mercaptotetrazole in amounts of $8.5\times10^{-5}$ mole, $7.7\times10^{-4}$ mole and $2.5\times10^{-4}$ mole, respectively, per mole of silver halide.

Moreover, the following dyes were added to the emulsion layers in order to prevent the irradiation.

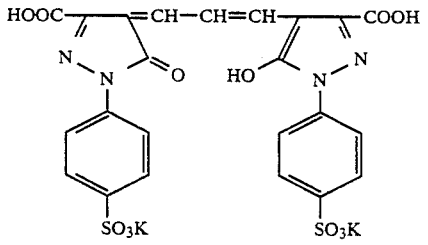

and

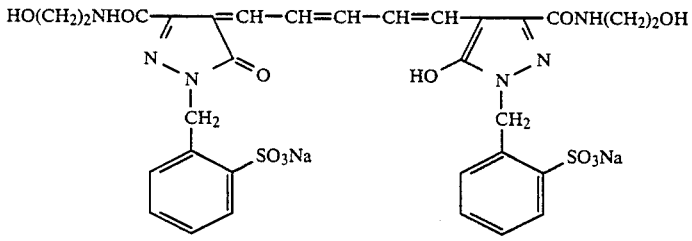

Layer Structure

Compositions of the constituent layers are described below. The coverages of the ingredients used are expressed in terms of g/m$^2$, with the coverages of silver halides expressed on a silver basis.

| | | |
|---|---|---|
| (1) | Support: | |
| | Polyethylene-laminated paper (which contained a white pigment ($TiO_2$) and a bluish dye (ultramarine) in the polyethylene on the first layer side). | |
| (2) | First layer (Blue-sensitive layer): | |
| | The foregoing silver chlorobromide emulsion | 0.30 |
| | Gelatin | 1.86 |
| | Yellow coupler (ExY) | 0.82 |
| | Color image stabilizer (Cpd-1) | 0.19 |
| | Color image stabilizer (Cpd-7) | 0.06 |
| | Solvent (Solv-3) | 0.35 |
| (3) | Second layer (Color stain inhibiting layer): | |
| | Gelatin | 0.99 |
| | Color mixing inhibitor (Cpd-5) | 0.08 |
| | Solvent (Solv-1) | 0.16 |
| | Solvent (Solv-4) | 0.08 |
| (4) | Third layer (Green-sensitive layer): | |
| | Silver chlorobromide emulsion (a cubic crystal form; a 1:3 (by mole, based on Ag) mixture of grains having an average grain size of 0.55 μm and a variation coefficient of 0.10 in size distribution and those having an average grain size of 0.39 μm and a variation coefficient of 0.08 in size distribution; 0.8 mole % bromide, contained in individual grains as a whole, but present locally at the grain surface) | 0.12 |
| | Gelatin | 1.24 |
| | Magenta coupler (ExM) | 0.20 |
| | Color image stabilizer (Cpd-3) | 0.15 |
| | Color image stabilizer (III-1) | 0.02 |
| | Color image stabilizer (I-31) | 0.03 |
| | Solvent (Solv-2) | 0.54 |
| (5) | Fourth layer (Ultraviolet absorbing layer): | |
| | Gelatin | 1.58 |
| | Ultraviolet absorber (UV-1) | 0.47 |
| | Color mixing inhibitor (Cpd-5) | 0.05 |
| | Solvent (Solv-5) | 0.24 |
| (6) | Fifth layer (Red-sensitive layer): | |
| | Silver chlorobromide emulsion (a cubic crystal form; a 1:4 (by mole, based on Ag) mixture of grains having an average grain size of 0.58 μm and a variation coefficient of 0.09 in size distribution and those having an average grain size of 0.45 μm and a variation coefficient of 0.11 in size distribution; 0.6 mole % bromide, contained | 0.23 |

-continued

| | | |
|---|---|---|
| | in individual grains as a whole, but present locally at the grain surface) | |
| | Gelatin | 1.34 |
| | Cyan coupler (ExC) | 0.32 |
| | Color image stabilizer (Cpd-6) | 0.17 |
| | Color image stabilizer (Cpd-7) | 0.40 |
| | Color image stabilizer (Cpd-10) | 0.04 |
| | solvent (Solv-6) | 0.15 |
| (7) | Sixth layer (Ultraviolet absorbing layer): | |
| | Gelatin | 0.53 |
| | Ultraviolet absorber (UV-1) | 0.16 |
| | Color mixing inhibitor (Cpd-5) | 0.02 |
| | solvent (Solv-5) | 0.08 |
| (8) | Seventh layer (Protective layer): | |
| | Gelatin | 1.33 |
| | Acryl-modified copolymer of polyvinyl alcohol (modification degree: 17%) | 0.17 |
| | Liquid paraffin | 0.03 |

(ExY) Yellow Coupler

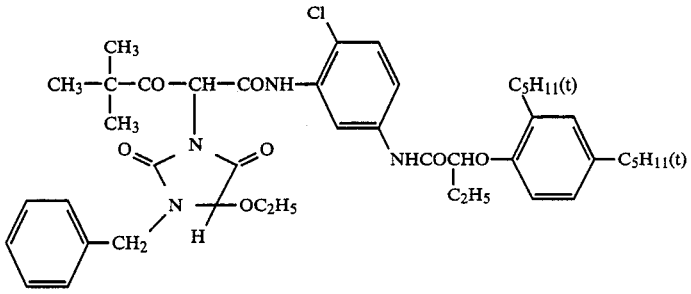

(ExM) Magenta Coupler

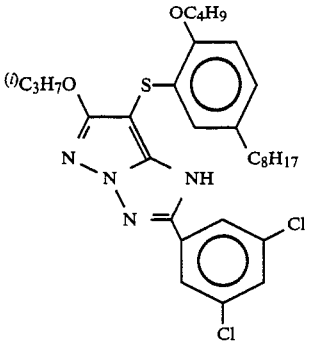

(ExC) Cyan Coupler

2:4:4 (by weight) mixture of

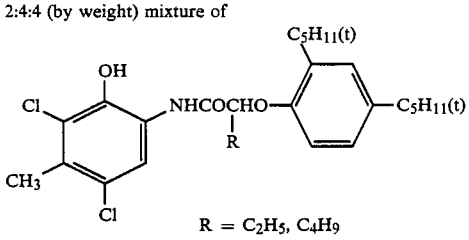

and

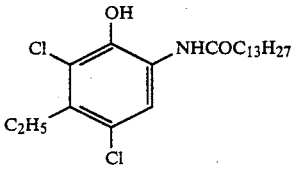

(Cpd-1) Color Image Stabilizer

-continued
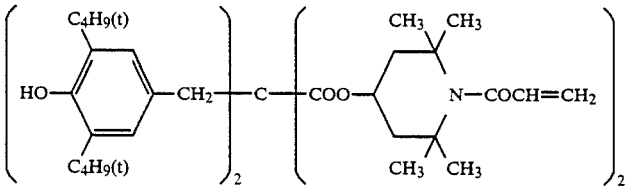
(Cpd-3) Color Image Stabilizer
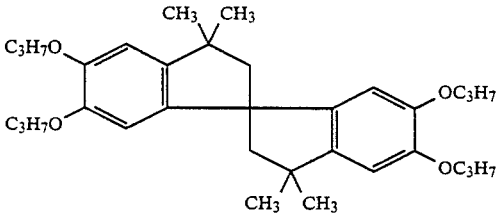
(Cpd-5) Color Mixing Inhibitor
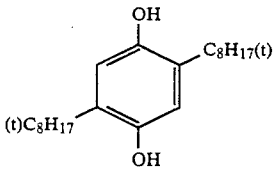
(Cpd-6) Color Image Stabilizer
2:4:4 (by weight) mixture of
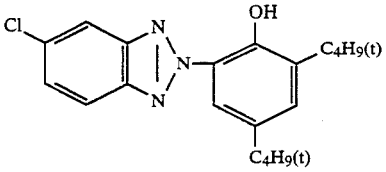
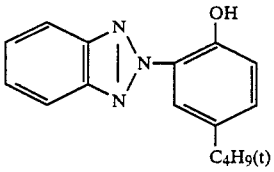
and
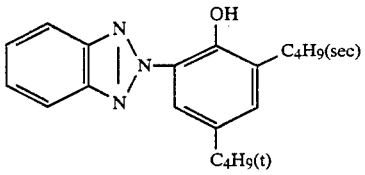
(Cpd-7) Color Image Stabilizer
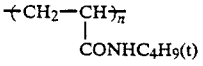
Mean molecular weight: 60,000
(Cpd-10) Color Image Stabilizer
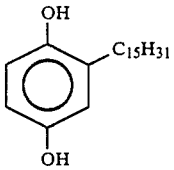
(UV-1) Ultraviolet Absorber
4:2:4 (by weight) mixture of -continued

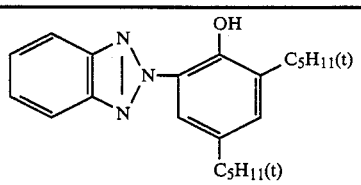

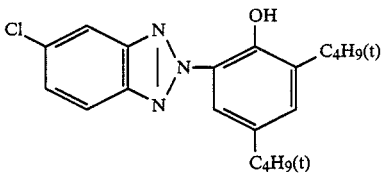

and

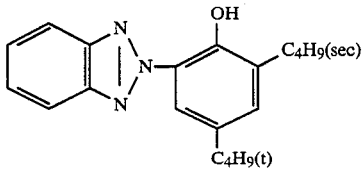

(Solv-1) Solvent

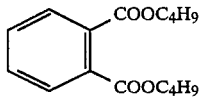

(Solv-2) Solvent
2:1 (by weight) mixture of

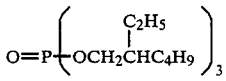

and

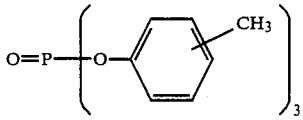

(Solv-3) Solvent
$O{=}P{\leftarrow}O{-}C_9H_{19}(iso))_3$ (Solv-4) Solvent

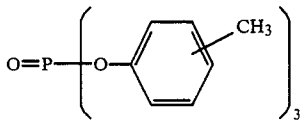

(Solv-5) Solvent

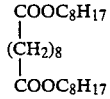

(Solv-6) Solvent

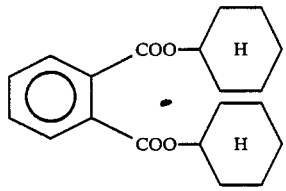

Other photosensitive materials were prepared in the same manner as the above-described one, except that the compounds of the present invention in a proportion of 10 mol % to the coupler, or/and image stabilizers were incorporated in the third layer, or the green-sensitive layer, as shown in Table 3, respectively, and subjected to the following photographic processing.

| Step | Temperature | Processing Time |
|---|---|---|
| Color Development | 35° C. | 45 sec. |
| Bleach-Fix | 35° C. | 45 sec. |
| Water Washing (1) | 35° C. | 30 sec. |
| Water Washing (2) | 35° C. | 30 sec. |
| Water Washing (3) | 35° C. | 30 sec. |
| Drying | 75° C. | 60 sec. |
| Color Developer | | |
| Water | | 800 ml |
| Ethylenediamine-N,N.N'N'-tetra-methylenephosphonic acid | | 3.0 g |
| Triethanol amine | | 8.0 g |
| Sodium chloride | | 1.4 g |
| Potassium carbonate | | 25 g |
| N-ethyl-N-(β-methanesulfonamidoethyl)-3-methyl-4-aminoaniline sulfate | | 5.0 g |
| N,N-bis(carboxymethyl)hydrazine | | 5.0 g |
| Brightening agent (WHITE X4B, produced by Sumitomo Chemical Co., Ltd) | | 1.0 g |
| Water to make | | 1,000 ml |
| pH (25° C.) | | 10.05 |
| Bleach-Fix Bath | | |
| Water | | 700 m |
| Ammonium thiosulfate solution (700 g/1) | | 100 ml |
| Ammonium sulfite | | 18 g |
| Ammonium ethylenediaminetetraacetato-ferrate(III) dihydrate | | 55 g |
| Disodium ethylenediaminetetraacetate | | 3 g |
| Ammonium bromide | | 40 g |
| Glacial acetic acid | | 8 g |
| Water to make | | 1,000 ml |
| pH (25° C.) | | 5.5 |

Washing Solution

City water treated with ion exchange resins till calcium and magnesium concentrations were each reduced to below 3 ppm (electric conductivity at 25° C.: 5 μs/cm) was used.

Immediately after the photographic processing, each sensitive material was examined for yellow reflection density in the unexposed area (stain), and then allowed to stand for 20 days under the condition of 80° C. and 15% RH. Thereupon, the yellow reflection densities of the unexposed areas were measured again, and thereby increases in stain with the lapse of time after the processing were determined.

The results are shown in Table 3.

TABLE 3

| Sensitive Material | Compound of the Invention | Discoloration Inhibitor | Increment of Stain ($\Delta D_B$) | Note |
|---|---|---|---|---|
| 6A | — | — | +0.34 | Comparison |
| 6B | — | A-3 | +0.35 | " |
| 6C | — | A-10 | +0.34 | " |
| 6D | — | A-12 | +0.34 | " |
| 6E | — | A-18 | +0.34 | " |
| 6F | — | A-23 | +0.35 | " |
| 6G | — | A-45 | +0.34 | " |
| 6H | III-39 | — | +0.09 | Invention |
| 6I | III-49 | — | +0.12 | " |
| 6J | III-50 | — | +0.15 | " |
| 6K | III-51 | — | +0.15 | " |
| 6L | III-52 | — | +0.13 | " |
| 6M | III-38 | — | +0.08 | " |
| 6N | III-48 | — | +0.10 | " |
| 6O | III-38 | A-3 | +0.07 | " |
| 6P | III-38 | A-10 | +0.06 | " |
| 6Q | III-38 | A-12 | +0.05 | " |
| 6R | III-38 | A-18 | +0.03 | " |
| 6S | III-38 | A-23 | +0.05 | " |
| 6T | III-38 | A-45 | +0.06 | " |

As can be seen from Table 3, the increment of stain with time after the photographic processing was considerably depressed by the compounds of the present invention. This depressing effect was particularly remarkable in the case of R=H in the general formula (III) (see the comparisons of 6H with 6I, 6J and 6K, and of 6M with 6L and 6N), and became greater by the combined use of the present compounds and various image stabilizers. The most remarkable effects upon depression of stain were accomplished by the combined use of the present compounds and the compounds represented by the general formula (IV-5).

While the invention has been described in detail and with reference to specific embodiments thereof, it will be apparent to one skilled in the art that various changes and modifications can be made therein without departing from the spirit and scope thereof.

What is claimed is:

1. A silver halide color photographic material which contains at least one coupler represented by the general formula (I) or (II-A) and at least one compound represented by the following general formula (III) in the same light-sensitive silver halide layer:

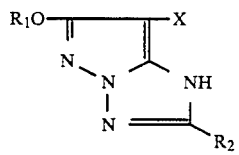

(I)

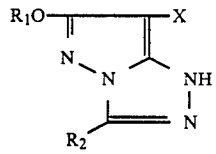

(II-A)

wherein $R_1$ represents an alkyl group, an aryl group, or a heterocyclic group; $R_2$ represents a hydrogen atom, or a substituent group; and X represents a hydrogen atom, or a coupling-off group:

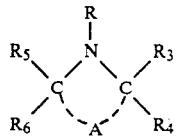

(III)

wherein R represents a hydrogen atom, an alkyl group, an alkenyl group, an alkynyl group, an oxy radical, or a hydroxyl group; $R_3$, $R_4$, $R_5$ and $R_6$, which may be the same or different, each represents a hydrogen atom, or an alkyl group; and A represents a nonmetalic atomic group necessary for forming a 5-, 6- or 7-membered ring; provided that $R_3$ may be linked with $R_4$, $R_5$ may be linked with $R_6$, R may be linked with $R_3$, or $R_3$ may be linked with A to form a 5- or 6-membered ring.

2. The silver halide color photographic material as claimed in claim 1, wherein at least one light-sensitive silver halide layer contains at least one coupler represented by formula (I) or (II-B) in combination with at least one compound represented by formula (III) above:

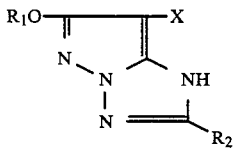

(I)

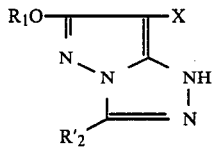

(II-B)

wherein $R_1$ represents an alkyl group, an aryl group or a heterocyclic group; $R_2$ represents hydrogen, a halogen, an alkyl group, an aryl group, a heterocyclic group, a cyano group, an alkoxy group, an aryloxy group, an acylamino group, an anilino group, a ureido group, a sulfamoylamino group, an alkylthio group, an arylthio group, an alkoxycarbonylamino group, a sulfonamido group, a carbamoyl group, a sulfamoyl group, a sulfonyl group, or an alkoxycarbonyl group; X represents hydrogen or a coupling-off group; when $R_1$ represents an alkyl group, $R'_2$ represents an alkyl group, an aryl group, an alkylthio group, an arylthio group or a heterocyclic thio group; and when $R_1$ represents an aryl group or a heterocyclic group, $R'_2$ represents hydrogen or an alkyl group, an aryl group, an alkylthio group, an arylthio group, a heterocyclic thio group, an alkoxycarbonyl group, a sulfinyl group, or a carbonyl group; and

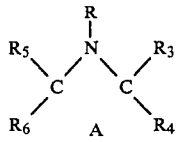

(III)

wherein R represents a hydrogen atom, an alkyl group, an alkenyl group, an alkynyl group, an oxy group, or a hydroxyl group; $R_3$, $R_4$, $R_5$ and $R_6$, which may be the same or different, each represents a hydrogen or an alkyl group; and A represents a nonmetallic atomic group necessary for forming a 5-, 6- or 7-membered ring; provided that $R_3$ may be linked with $R_4$, $R_5$ may be linked with $R_6$, R may be linked with $R_3$, or $R_3$ may be linked with A to form a 5- or 6-membered ring.

3. The silver halide color photographic material as claimed in claim 2, wherein said alkyl group represented by $R_2$ is a substituted alkyl group substituted with a substituent selected from a sulfonamido group, an acylamino group, a sulfonamidophenylalkyl group, an acylaminophenylalkyl group, an alkylsulfonylalkyl group and a phenylsulfonylalkyl group; said alkyl group represented by $R'_2$ is a substituted alkyl group substituted with a substituent selected from the group consisting of a sulfonamidoalkyl group, an acylaminoalkyl group, a sulfonamidophenylalkyl group, an acylaminophenylalkyl group, an alkylsulfonylalkyl group, and a phenylsulfonylalkyl group.

4. The silver halide color photographic material as claimed in claim 3, wherein $R_2$ represents an alkyl group, an aryl group, an alkylthio group, or an arylthio group; and $R'_2$ represents a substituted alkyl group or a substituted aryl group.

5. The silver halide color photographic material as claimed in claim 4, wherein $R_2$ represents an alkyl group or an aryl group and $R'_2$ represents a substituted alkyl group.

6. The silver halide color photographic material as claimed in claim 1, wherein X represents a coupling-off group selected from a halogen atom, a carboxyl group, and a group connected to the coupling active site by an atom selected from an oxygen atom, a nitrogen atom, and a sulfur atom.

7. The silver halide color photographic material as claimed in claim 6, wherein said coupling-off group is a group connected to the coupling active site by a sulfur atom.

8. The silver halide color photographic material as claimed in claim 1, wherein at least one of $R_1$ and $R_2$ is a divalent linking group connecting said coupler to a vinyl monomer contained in a homopolymer or copolymer.

9. The silver halide color photographic material as claimed in claim 8, wherein said homopolymer or copolymer is a latex.

10. The silver halide color photographic material as claimed in claim 1, wherein said light-sensitive silver halide layer contains at least one coupler represented by formula (I) in combination with at least one compound represented by formula (III).

11. The silver halide color photographic material as claimed in claim 1, wherein said light-sensitive silver halide layer contains at least one coupler represented by formula (II-A) in combination with at least one compound represented by formula (III).

12. The silver halide color photographic material as claimed in claim 1, wherein $R_1$ represents a phenyl group substituted by an alkoxy group at the ortho position.

13. The silver halide color photographic material as claimed in claim 1, wherein A in formula (III) represents

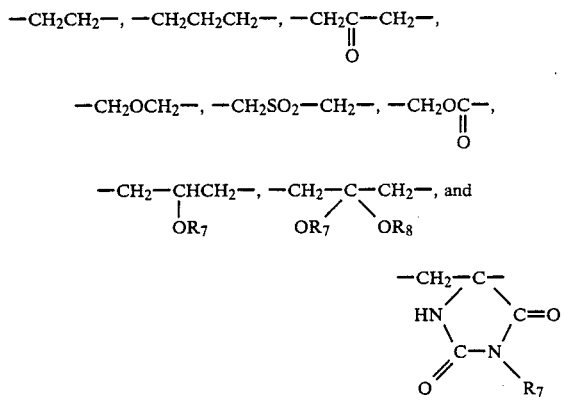

wherein $R_7$ and $R_8$, which may be the same or different, each represents hydrogen, an alkyl group, an acyl group, a sulfonyl group, a sulfinyl group, or an alkoxycarbonyl group.

14. The silver halide color photographic material as claimed in claim 13, wherein at least one of $R_3$ and $R_4$, $R_5$ and $R_6$, R and $R_3$, or $R_3$ and A is linked to form a 5-membered to 6-membered ring selected from cyclohexane, cyclohexene, pyran, piperazine, piperidine and morpholine.

15. The silver halide color photographic material as claimed in claim 13, wherein said ring formed by A is a piperidine ring; at least two of $R_3$, $R_4$, $R_5$ and $R_6$ represent an alkyl group; and R represents hydrogen or an alkyl group.

16. The silver halide color photographic material as claimed in claim 15, wherein R represents hydrogen and each of $R_3$, $R_4$, $R_5$ and $R_6$ represents an alkyl group.

17. The silver halide color photographic material as claimed in claim 1, wherein said light-sensitive silver halide layer comprises from about $2\times10^{-3}$ to 1 mol/Agmol of said coupler represented by formula (I) or (II-A) and from 5 to 200 mol % of said compound represented by formula (III) based on the total amount of said coupler.

18. The silver halide color photographic material as claimed in claim 17, wherein said light-sensitive silver halide layer comprises from about $1\times10^{-2}$ to $5\times10^{-1}$ mol/Agmol of said coupler represented by formula (I) or (II-A) and from 10 to 50 mol % of said compound represented by formula (III) based on the total amount of said coupler.

19. The silver halide color photographic material as claimed in claim 1, wherein said light-sensitive silver halide layer further comprises at least one image stabilizer represented by (IV):

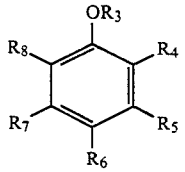

(IV)

wherein $R_3$ represents hydrogen, an alkyl group, an alkenyl group, an aryl group, a heterocyclic group, or

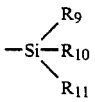

wherein $R_9$, $R_{10}$ and $R_{11}$ may be the same or different, and each represents an alkyl group, an alkenyl group, an aryl group, an alkoxy group, an alkenoxy group or an aryloxy group and $R_4$, $R_5$, $R_6$, $R_7$ and $R_8$, which may be the same or different, each represents hydrogen, an alkyl group, an alkenyl group, an aryl group, an acylamino group, an alkylamino group, an alkylthio group, an arylthio group, an alkoxycarbonyl group, an aryloxycarbonyl group, a halogen atom or —O—$R_3'$, wherein $R_3'$ has the same definition as $R_3$.

20. The silver halide color photographic material as claimed in claim 19, wherein said image stabilizer represented by formula (IV) is represented by formulae (IV-1), (IV-2), (IV-3), (IV-4) or (IV-5):

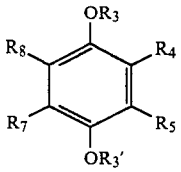

(IV-1)

-continued

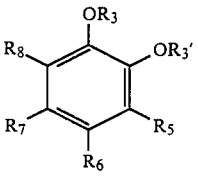

(IV-2)

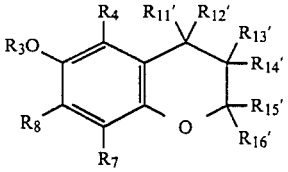

(IV-3)

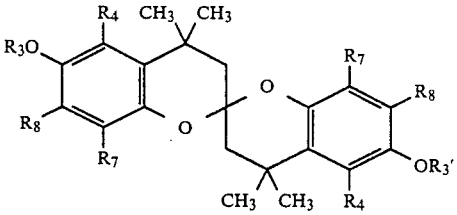

(IV-4)

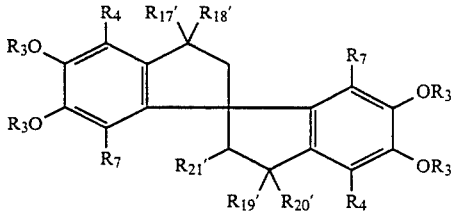

(IV-5)

wherein $R_3$, $R_3'$, $R_4$, $R_5$, $R_6$, $R_7$ and $R_8$ each is defined as in formula (IV); $R_{11}'$ through $R_{21}'$, which may be the same or different, each represents hydrogen, an alkyl group or an aryl group.

21. The silver halide color photographic material as claimed in claim 1, wherein said light-sensitive silver halide layer further comprises at least one image stabilizer selected from a metal complex represented by formulae (V-1), (V-2), (V-3) or (V-4):

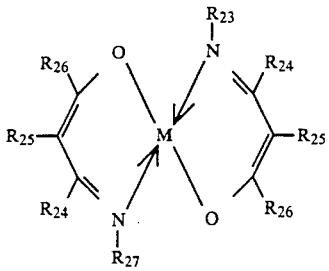

(V-1)

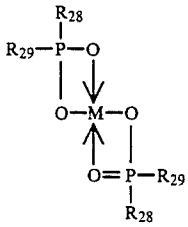

(V-2)

-continued (V-3)

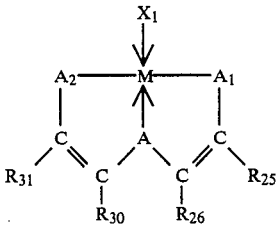

-continued (V-4)

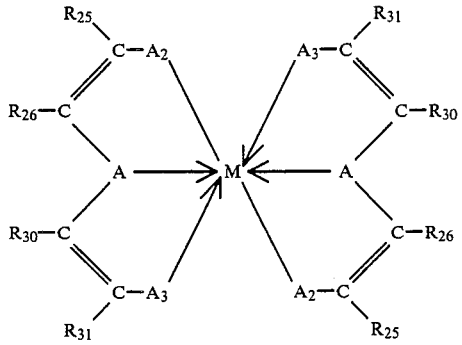

wherein M represents Cu, Co, Ni, Pd, or Pt; $R_{23}$ and $R_{27}$, which may be the same or different, each represents hydrogen, an alkyl group, an aryl group, or a hydroxyl group; $R_{23}$, $R_{24}$, $R_{26}$, $R_{30}$ and $R_{31}$, which may be the same or different, each represents hydrogen, an alkyl group, or an aryl group; $R_{28}$ and $R_{29}$, which may be the same or different, each represents an alkyl group, an aryl group, an alkylthio group, an arylthio group, an alkoxy group, an aryloxy group, an alkylamino group, or an arylamino group; $X_1$ represents $H_2O$ or organic or inorganic amines coordinately bonded to M; A represents oxygen, sulfur or —$NR_{110}$—, wherein $R_{110}$ represents hydrogen, an alkyl group, an aryl group, a hydroxyl group, or an alkoxy group; $A_1$ and $A_2$, which may be the same or different, each represents oxygen, sulfur, or an amino group; and $A_3$ represents a hydroxyl group, an alkoxy group, an alkylthio group, or —$NR_{120}R_{130}$, wherein $R_{120}$ and $R_{130}$, which may be the same or different, each represents hydrogen or an alkyl group.

* * * * *